US006651306B1

(12) United States Patent
LePoire et al.

(10) Patent No.: US 6,651,306 B1
(45) Date of Patent: Nov. 25, 2003

(54) APPARATUS AND METHOD FOR FABRICATING FLAT TRUSSES

(75) Inventors: Robert A. LePoire, Chesterfield, MO (US); Douglas S. Hanneken, St. Louis, MO (US); Randall S. Mabery, O'Fallon, MO (US); Louis A. Fanty, Jr., Palm Harbor, FL (US); Du Kim, St. Louis, MO (US)

(73) Assignee: MiTek Holdings, Inc., Wilmington, DE (US)

( * ) Notice: Subject to any disclaimer, the term of this patent is extended or adjusted under 35 U.S.C. 154(b) by 382 days.

(21) Appl. No.: 09/596,138

(22) Filed: Jun. 16, 2000

Related U.S. Application Data

(60) Provisional application No. 60/145,516, filed on Jul. 23, 1999.

(51) Int. Cl.[7] .................................................. B23P 11/00

(52) U.S. Cl. ........................ 29/430; 29/525.01; 29/771; 29/429

(58) Field of Search .......................... 29/430, 429, 432, 29/525.01, 525.05, 771, 772, 783, 787, 791, 795, 796, 822; 100/193, 53, 100, 218

(56) References Cited

U.S. PATENT DOCUMENTS 3,490,188 A 1/1970 Troutner ...................... 52/644
3,651,612 A 3/1972 Schmitt ....................... 52/693
3,849,963 A 11/1974 Harmon ....................... 52/729
3,866,530 A 2/1975 Moehlenpah ................ 100/53
3,978,783 A 9/1976 Moehlenpah ................ 100/53
4,005,520 A 2/1977 Sanford
4,014,201 A 3/1977 Troutner et al.
4,024,809 A 5/1977 Moehlenpah ............... 100/100
4,047,282 A 9/1977 Jureit et al.
4,078,352 A 3/1978 Knowles ...................... 52/693
4,084,499 A 4/1978 Moehlenpah ............... 100/231
4,129,933 A * 12/1978 Jureit et al. .................... 29/417
4,148,471 A 4/1979 Werner ....................... 269/321
4,334,346 A 6/1982 Jensen
4,336,678 A 6/1982 Peters ......................... 52/729
4,379,426 A 4/1983 Thompson et al. ......... 100/100
4,384,515 A 5/1983 Matlock ..................... 100/100
4,435,929 A 3/1984 Bussell .......................... 52/93
4,479,600 A 10/1984 Albright
4,501,102 A 2/1985 Knowles ...................... 52/690
4,637,194 A 1/1987 Knowles ...................... 52/690
4,840,207 A 6/1989 Lines .......................... 144/41
4,846,923 A 7/1989 Lines ......................... 156/353
4,852,322 A 8/1989 McDermid ................... 52/404
4,862,662 A 9/1989 Eberle et al. ................. 52/299
5,111,861 A 5/1992 Gore et al.
5,361,495 A 11/1994 Pyle et al.
5,592,800 A 1/1997 Koo et al. .................... 52/692
5,761,872 A 6/1998 Sanford et al.
6,058,601 A 5/2000 DeKoning
6,112,968 A 9/2000 Jin et al. ....................... 227/2

* cited by examiner

*Primary Examiner*—Gregory Vidovich
*Assistant Examiner*—Stephen Kenny
(74) *Attorney, Agent, or Firm*—Senniger, Powers, Leavitt & Roedel

(57) ABSTRACT

A truss manufacturing apparatus and method. The apparatus includes a conveyor for moving upper and lower chords thru a series of assembly stations of the apparatus. A board is inserted between the chords at one station and secured in place forming a trimmable end of a truss. One or more web boards can be inserted between the chords at a second station and secured in place by connector nail plates forming a opening in the truss for ductwork or the like. Metal web members are secured to opposite side edges of the truss at a third station to form a web between the chords. The chords are positioned in a generally vertical plane with one above the other in the apparatus and the board, web boards and web members are moved into position from one or both sides of the chords.

73 Claims, 42 Drawing Sheets

CONTINUES TO PAGE 38B

CONTINUES FROM 38A

CONTINUES TO 38C

CONTINUES FROM 38B

CONTINUES TO 38D

CONTINUES FROM 38C

CONTINUES TO 38E

CONTINUES FROM 38D

CONTINUES TO 38F

CONTINUES FROM 38E

CONTINUES TO 38G

CONTINUES FROM 38F

APPARATUS AND METHOD FOR FABRICATING FLAT TRUSSES

This application claims priority from U.S. provisional application Ser. No. 60/145,516, filed on Jul. 23, 1999.

BACKGROUND OF THE INVENTION

This invention relates to apparatus for fabricating flat trusses, and more particularly to apparatus for fabricating composite wood and metal flat trusses.

The invention is especially concerned with apparatus for fabricating composite wood and metal flat trusses such as shown in the co-assigned U.S. Pat. No. 5,833,222 issued Nov. 10, 1998. Flat trusses in general and flat trusses such as disclosed in said patent are typically used as floor joists in place of solid wood 2×10s, 2×12s, etc. The flat truss disclosed in said patent has parallel top and bottom chords, each comprising a length of lumber (e.g., a 2×4) and generally V-shaped metal web members having integral teeth fastening them to the chords, with said members in inverted relation. It also has vertical wooden web members providing rectangular openings in the truss, as for passage of ductwork through the truss. It is formed to provide on-site flexibility, being capable of being trimmed off at one or both ends to reduce its length to fit the job. This is accomplished by providing a board between the chords at one or both ends, the arrangement being such that the chords and board or boards may be sawn through for the trimming of the truss without sacrificing the structural stability of the truss.

As disclosed in said U.S. Pat. No. 5,833,222, the assembly of the flat trusses having the features above described is carried out manually, by placement of the chords, web members (metal and wooden), and the boards in a jig on a table. The truss is assembled flat, i.e., so that the upper and lower chords are in a horizontal plane. The metal web members are placed both under and on top of the chords so that they will be secured on both sides of the chords in the finished truss. A press is moved over the table (or vice versa) to press the teeth of the metal web members into the chords. Assembling the components is labor intensive. The size of the truss, and hence the jig, make manual assembly difficult and time consuming.

SUMMARY OF THE INVENTION

Among the several objects and features of the present invention may be noted the provision of an apparatus for fabricating flat trusses which automatically assembles a completed truss from its base components; the provision of such an apparatus which can build trusses rapidly; the provision of such an apparatus which requires minimal manual labor; and the provision of such an apparatus which can build trusses of different sizes.

The invention involves apparatus for fabricating composite wood and metal flat trusses with each truss having generally parallel top and bottom chords, and a first and a second series of metal web members, the first series on one side and the second on the other side of the truss. The web members of each series are spaced at intervals along the length of the truss. The apparatus includes a conveyor comprising an upper chord conveying run for the feeding endwise in a forward direction the upper chords of trusses to be fabricated, and a lower chord conveying run for the feeding endwise in the forward direction corresponding lower chords of trusses to be fabricated. Each upper chord is paired in lengthwise registry with a lower chord thereby constituting a pair serving as the upper and lower chords of a truss. The upper chord and lower chords are of generally rectangular cross-section having top, bottom, and side surfaces. The conveyor is operable intermittently to feed each pair of chords forward a distance corresponding to the intervals to and past a station for application of web members to opposite side surfaces of the pair at the intervals, the pair dwelling at the station for a dwell period between each forward feed of said pair. A first web member applicator at the station for applying a web member to each pair of chords on one side thereof during a dwell period of the pair at the station, a second web member applicator at the station for applying a web member to each pair on the other side thereof during a dwell period of the pair at the station. Each web member applicator comprises a holder on the respective side of the conveyor for holding a supply of web members, and mechanism for transferring a web member from the supply into position on the respective side of the pair at the station. The web members have fasteners for being driven into the sides of each of the chords constituting the pair. Each applicator has a driver for effecting driving of the fasteners into each of the chords constituting the pair on opposite sides thereof to fasten the web members to the pair.

An aspect of the invention involves the provision of an apparatus for fabricating composite flat trusses with each truss having parallel top and bottom chords, a first and a second series of metal first web members, the first series on one side and the second series on the other side of the truss, the first web members of each series being spaced at intervals along the length of the truss, each truss further comprising at least at one end thereof a trimmable second web member comprising material which may be sawn through for trimming of the truss at the one end thereof thereby to shorten its length, the second web member being secured at the top to the upper chord and at the bottom to the lower chord. The apparatus includes a conveyor comprising an upper chord conveying run and a lower chord conveying run for the feeding endwise in a forward direction the upper and lower chords of trusses to be fabricated with the chords in a predetermined plane. Each upper chord is paired in lengthwise registry with a lower chord and to constitute a pair serving as the upper and lower chords of a truss. Each of the upper and lower chords are of generally rectangular cross-section having top, bottom, and side surfaces. The conveyor is operable to feed a pair of the chords to and past a second web member applying station where there is a second web member transfer device for transferring a second web member from a supply of second web members to a position in the plane for being engaged by the chords as they are fed forward. The apparatus has first devices for effecting securement of the second web member to the chords. The conveyor is operable intermittently to feed the lengths of lumber with the second web member in place between them forward a distance corresponding to the intervals to and past a first web member applying station for application of first web members to opposite side surfaces of the pair at the intervals, the pair dwelling at the first web member applying station for a dwell period between each forward feed of the pair. A first web member first applicator at the station for applying a first web member to each pair of chords on one side thereof during a dwell period of the pair at the station. A first web member second applicator is at the station for applying a first web member to each pair on the other side thereof during a dwell period of each pair at the station. Each applicator includes a holder on the respective side of the conveyor for holding a supply of first web members, and mechanism for transferring a first web member from the supply into position on the respective side of the pair at the station. The first web members have fasteners for being driven into the sides of each of the chords constituting the pair. Each applicator has a driver for effecting driving of the fasteners into each of the chords constituting the pair on opposite sides thereof to fasten the first web members to the pair.

A further aspect of the invention involves the provision of an apparatus for fabricating composite flat trusses with each truss having generally parallel top and bottom chords, and a first and a second series of metal first web members, the first series on one side and the second series on the other side of the truss, the first web members of each said series being spaced at intervals along the length of the truss, and generally vertical second web members each extending generally vertically between the upper and lower chords and fastened thereto, the second web members being spaced at intervals along the length of the truss. The apparatus includes a conveyor comprising an upper chord conveying run for the feeding endwise in a forward direction the upper chords of trusses to be fabricated, and a lower chord conveying run for the feeding endwise in the forward direction corresponding lower chords of trusses to be fabricated. Each upper chord is paired in lengthwise registry with a lower chord thereby constituting a pair serving as the upper and lower chords of a truss. Each of the upper and lower chords are of generally rectangular cross-section having top, bottom, and the surface. The conveyor is operable intermittently to feed a pair forward a distance corresponding to the first web member and second web member intervals first to and past a station for application of second web members between the chords of the pair, then to and past a station for fastening the inserted second web members to the chords, and subsequently to and past a station for application of first web members to opposite side surfaces of the pair at the said intervals, the pair dwelling at the stations for a dwell period between each forward feed of the pair. A pair of first applicators at the first web member station with one first applicator being positioned for applying a first web member to the pair on one side thereof during a dwell period of the pair thereat, and the other first applicator being positioned for applying a first web member to the pair on the other side thereof during a dwell period of a pair at the station. Each first applicator includes a holder on the respective side of the conveyor for holding a supply of first web members, and mechanism for transferring a first web member from the supply thereof into position on the respective side of the pair at the station. The first web members have fasteners for being driven into the sides of each of the chords constituting the pair, each first applicator having a driver for effecting driving of the fasteners into each of the chords constituting the pair on opposite sides thereof to fasten the first web members to the pair. A second applicator for second web members at the second web member applying station for taking second web members from a supply and inserting them between the chords. First devices are at the fastening station on opposite sides of the conveyor for fastening the second web members to the chords.

The invention also involves an apparatus for fabricating composite flat trusses with each truss having generally parallel top and bottom chords, each of the chords comprising a length of lumber, a first and a second series of metal first web members, the first series on one side and the second series on the other side of the truss, the first web members of each series being spaced at intervals along the length of the truss, each truss further comprising at least at one end thereof a trimmable second web member which may be sawn through for trimming of the truss at the one end thereof thereby to shorten its length, the second web member being secured at the top to the upper chord and at the bottom to the lower chord, and generally vertical third web members extending generally vertically between the upper and lower chords and fastened thereto and being spaced at intervals along the length of the truss. The apparatus includes a conveyor comprising an upper chord conveying run and a lower chord conveying run for the feeding endwise in a forward direction in a predetermined plane the upper and lower chords of trusses to be fabricated with the chords. Each upper chord is paired in lengthwise registry with a lower chord and thereby constituting a pair serving as the upper and lower chords of a truss. Each of the upper and lower chords are of generally rectangular cross-section having top, bottom, and side surfaces. The conveyor is operable to feed a pair of the chords to and past a second web member applying station where there is a transfer device for transferring a second web member from a supply of second web members to a position in the plane for being engaged by the chords as they are fed forward. The apparatus has devices for effecting securement of the second web member to a pair of chords. The conveyor is operable intermittently to feed a pair with the second web member in place in the pair forward a distance corresponding to the first web member and third web member intervals to and past a station for application of third web members between the lengths of lumber of the pair then to and past a station for fastening the inserted third web members to the chords, and subsequently to and past a station for application of first web members to opposite side surfaces of the pair at the intervals, the pair dwelling at the stations for a dwell period between each forward feed of the pair. A first applicator for third web members is at the station for application thereof for taking the third web members from a supply and inserting them between the chords so they are generally vertical. Devices are at the fastening station on opposite sides of the conveyor for fastening the third web members to the chords. A pair of second applicators is at the station for application of first web members each comprising a holder on the respective side of the conveyor for holding a supply of first web members, and mechanism for transferring a first web member from the supply thereof into position on the respective side of the pair at the station, the first web members having fasteners for being driven into each of the chords constituting the pair, each second applicator having a driver for effecting driving of the fasteners into the chords constituting the pair on opposite sides thereof to fasten the first web members to the pair.

The invention also involves an apparatus for fabricating truss components each comprising generally parallel top and bottom chords, each of the chords being of generally rectangular cross-section thereby having top, bottom, and side surfaces, with at least at one end of each truss a trimmable first web member which may be sawn through for trimming of the truss ultimately formed thereby to shorten the length of the truss, the first web member being secured at the top to the upper chord and at the bottom to the lower chord. The apparatus includes a conveyor comprising an upper chord conveying run and a lower chord conveying run for the feeding endwise in a forward direction chords constituting the upper and lower chords of trusses to be fabricated with the chords in a predetermined plane, each upper chord being paired in lengthwise registry with a lower chord and thereby being a pair constituting the upper and lower chords of a truss. Each of the upper and lower chords are of generally rectangular cross-section having top, bottom, and side surfaces. The conveyor is operable to feed a pair of the chords to and past a board applying station where there is a first web member transfer device for transferring a first web member from a supply of first web members to a position in the plane for being engaged by a pair of chords as the pair is fed forward. The apparatus has devices for effecting securement of the first web member to the pair of chords.

A further aspect of the invention involves the provision of an apparatus for fabricating composite flat trusses with each truss having generally parallel top and bottom chords, a first and a second series of metal first web members, the first series on one side and the second on the other side of the truss, the first web members of each series being spaced at intervals along the length of the truss, at least at one end of the truss a trimmable second web member comprised of material which may be sawn through for trimming of the truss at the one end thereof thereby to shorten its length, the second web member being fastened at its top to the upper chord and at its bottom to the lower chord said truss also having generally vertical third web members each extending generally vertically between the upper and lower chords and fastened thereto, the third web members being spaced at intervals along the length of the truss. The apparatus includes a conveyor comprising an upper chord conveying run and a lower chord conveying run for the feeding endwise in a forward direction the upper and lower chords of trusses to be fabricated with the chords in a predetermined plane. Each upper chord is paired in lengthwise registry with a lower chord and thereby being a pair constituting the upper and lower chords of a truss. The conveyor has a first section constituting an infeed section where the runs are spaced a distance greater than the truss height, a second section constituting a chord preparation section where the runs are spaced as in the infeed section, a third section constituting a tapering section where the runs converge to truss height, a fourth section constituting a third web member applying section, a fifth section constituting a staging section, and a sixth section constituting an exit section. The runs are generally parallel and spaced a distance corresponding to the truss height in the fourth, fifth, and sixth sections. A set of first devices is in the second section for preparing the chords fed therethrough for reception of a second web member. A second web member transfer device is provided for transferring a second web member from a supply thereof to a position in the third section for being engaged by the chords as they are fed forward and converge in the third section. There is an applicator for taking third web members from a supply thereof and inserting them between the chords during a dwell in the fourth section. There is also a set of applicators between the fifth and sixth sections for applying first web members to opposite sides of the chords during dwell therein.

An additional aspect of the invention is an apparatus for fabricating flat trusses having generally parallel top and bottom chords, with at least one generally vertical web member between the chords and fastened thereto. The apparatus includes a conveyor comprising an upper chord conveying run for endwise feeding in a forward direction the upper chords of trusses to be fabricated, and a lower chord conveying run for the feeding endwise in the forward direction corresponding lower chords of trusses to be fabricated. Each upper chord is paired in lengthwise registry with a lower chord thereby constituting a pair which ultimately become chords of a truss, each of the upper chord and lower chords being of generally rectangular cross-section having top, bottom, and side surfaces. An applicator for web members is at a station along the length of the conveyor for taking web members from a supply thereof and inserting them between the chords during dwell of the chords at the station whereby the web members are generally vertical between the chords.

The invention also provides for an apparatus for fabricating trusses each comprising parallel upper and lower chords with a plurality of web members secured to and extending between the chords. The apparatus includes a conveyor comprising an upper chord conveying run and a lower chord conveying run for the feeding endwise in a forward direction the upper and lower chords of trusses to be fabricated, each chord traveling in a generally horizontal plane with the upper chords being above the lower chords in a generally vertical plane, each upper chord being paired in lengthwise registry with a respective lower chord and thereby being a pair constituting the upper and lower chords of a truss. The conveyor is operable to feed a pair of the chords to and past a web applying station where there is a web transfer device for transferring a web from a supply of webs to a position in a plane generally parallel to the generally vertical plane for being secured to the chords at the web applying station. A device is at the web applying station for effecting securement of webs to said chords.

An apparatus is provided for fabricating trusses each comprising first and second chords with a plurality of web members secured to and extending between the chords, each chord having first and second opposite sides. The apparatus includes a conveyor comprising a first chord conveying run and a second chord conveying run for the feeding endwise in a forward direction the first and second chords of trusses to be fabricated. The conveyor is operable to feed a pair of the chords along respective paths of movement to and past a web applying station where there is a web transfer device for transferring a web from a supply of webs for being secured to the chords at the web applying station. A device is at the web applying station for effecting securement of webs to the chords. A drive mechanism is operable to engage the opposite sides of at least one of the chords to feed the engaged chord forward thru at least a portion of the apparatus and includes, a side drive mechanism including a pair of wheels mounted on opposite side of the respective path of movement for engaging a respective side of the chord, a drive motor connected to at least one of the wheels to effect rotation thereof, the wheels being mounted to move toward and away from the path in response to a signal indicative of a chord being present between the wheels.

The invention also involves an apparatus for fabricating trusses each comprising first and second chords with a plurality of web members secured to and extending between the chords, each chord having first and second opposite sides. The apparatus includes a conveyor comprising a first chord conveying run and a second chord conveying run for the feeding endwise in a forward direction the first and second chords of trusses to be fabricated. The conveyor is operable to feed a pair of the chords along respective paths of movement to and past a web applying station where there is a web transfer device for transferring a web from a supply of webs for being secured to the chords at the web applying station. A device at the web applying station for effecting securement of webs to the chords. A chord centering mechanism is operable to engage the opposite sides of at least one of the chords to position the engaged chord in thge path of movement whereby the chord is generally centered at a centerline of the path of movement. The centering mechanism includes a pair of followers mounted on opposite sides of the respective path of movement for engaging a respective side of the chord, the followers being mounted to move toward and away from the path in response to a signal indicative of a chord being present between the followers. A device is connected to the followers to effect the movement of the followers toward and away from one another and to retain the followers in engagement with a chord therebetween during movement of the chord between the followers.

Another aspect of the invention involves the provision of a method of assembling a truss having generally parallel upper and lower chords with webs secured to the chords and extending therebetween, the truss being formed in an apparatus having a conveyor with upper and lower conveyor runs. The method includes placing an upper chord and a lower chord in a plane where the upper chord is above the lower chord in a generally vertical plane with longitudinal axes of the chords being generally parallel. The chords are moved intermittently along a conveyor thru at least one web application station and pausing the chords at the station and applying a web to the chords during the pause and thereafter moving the chords with the applied web forward. The chords are paused again at the station after the subsequent forward movement and a second web is applied to the chords and thereafter the chords and applied webs are moved forward. The applied webs are secured to the chords to form a truss with generally parallel upper and lower chords with the webs secured to and extending therebetween. The formed truss is discharged from the conveyor.

Other objects and features will be in part apparent and in part pointed out hereinafter.

DETAILED DESCRIPTION OF THE PREFERRED EMBODIMENT

Figure 1:
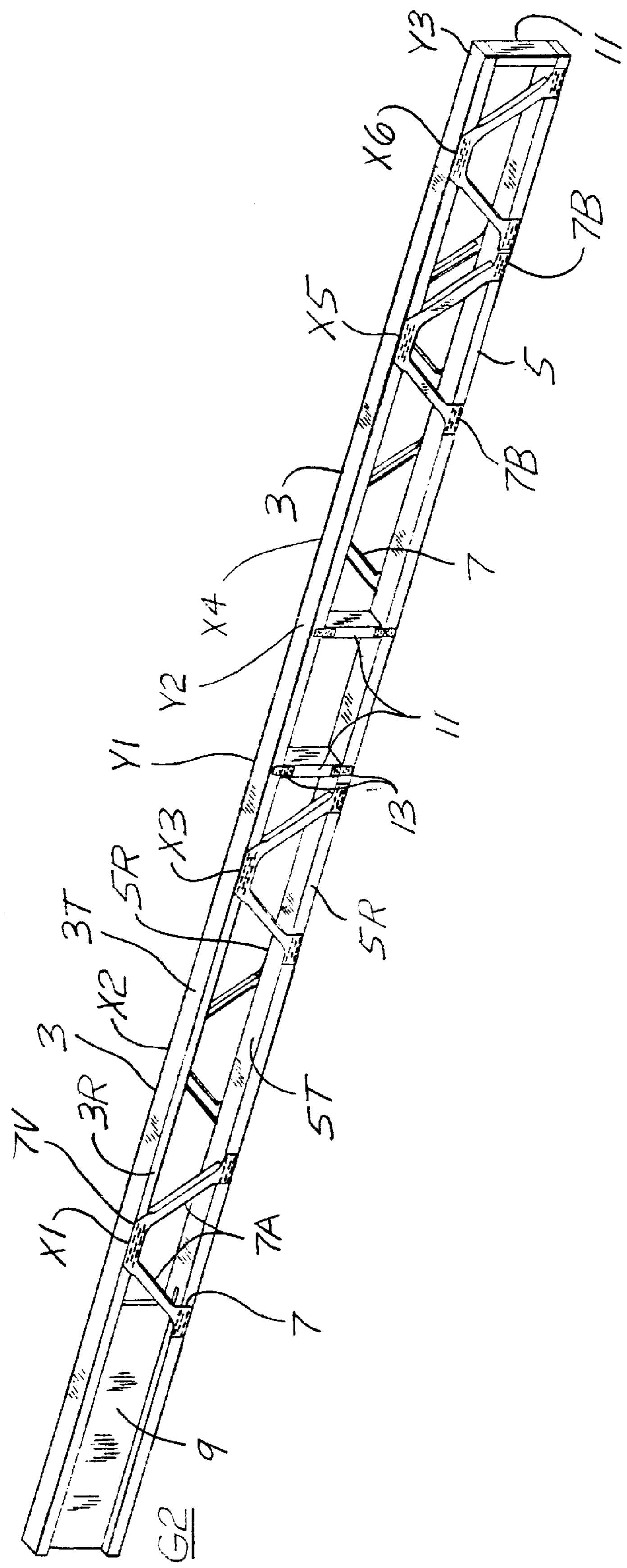
FIG. 1, is a view in elevation of one side of a truss such as is fabricated by means of the apparatus of this invention, the truss having a single trimmable board.
Figure 2:
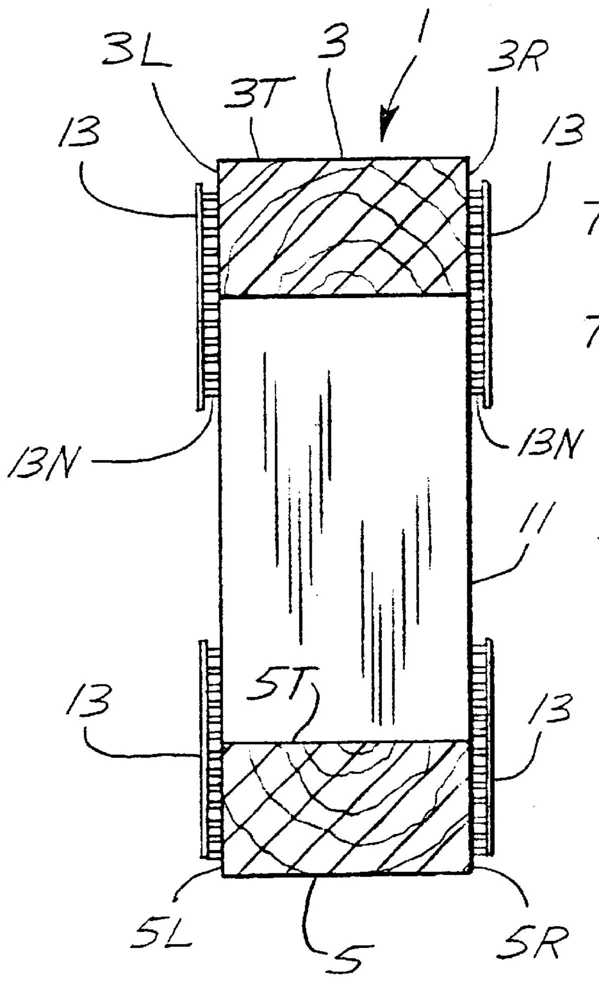
FIG. 2 is an enlarged vertical section taken generally on line 2—2 of FIG. 1.
Figure 3:
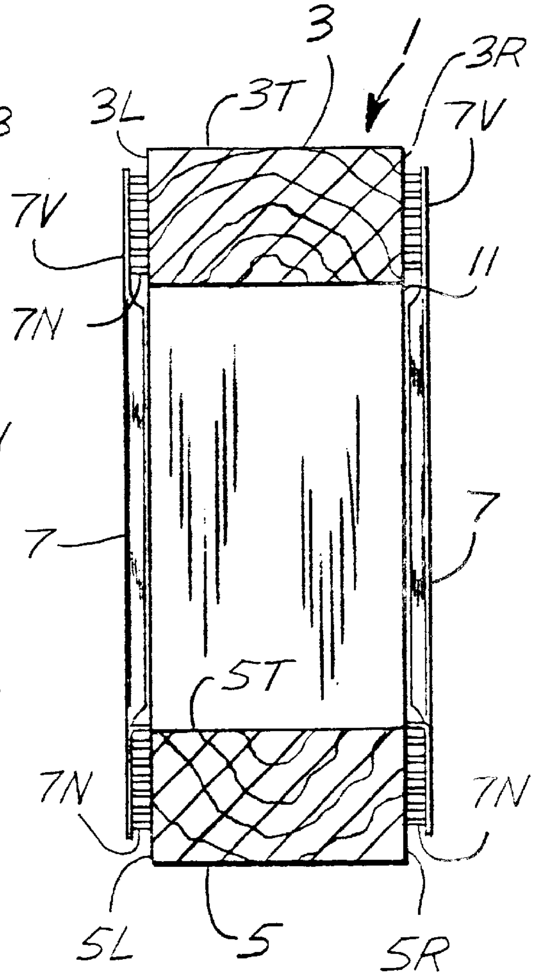
FIG. 3 is an enlarged vertical section taken generally on line 3—3 of FIG. 1.

Referring first to FIGS. 1–3 of the drawings, a composite wood and metal truss of the type fabricated by the apparatus of this invention designated in its entirety by the reference numeral 1 is shown to comprise parallel top and bottom chords 3 and 5, each of said chords comprising a length of lumber (e.g., a nominal 2×4). Each chord is of rectangular cross section, having a top surface (3T for the top chord, 5T for the bottom chord) and side surfaces (3L and 3R for the top chord, 5L and 5R for the bottom chord). The top and bottom surfaces are the wider surfaces, i.e., the nominal 4-inch surface, in the case of use of 2×4s. A first series of metal web members each designated in its entirety by the reference numeral 7 is located on one side of the truss (arbitrarily designated as the left side) and a second series of the metal web members 7 is located on the other side (the right side). The metal web members on each side are spaced at intervals along the length of the truss. The spacing on the one side may be and is shown in FIG. 1 as different from the spacing on the other. Thus, the showing is of four members 7 on one side (the near side) spaced along the length of the truss at four positions as indicated at X1, X3, X5 and X6, and three members on the other side spaced along the length of the truss at positions X2, X4 and X5.

A trimmable web member 9, such as a board, is provided at one end of the truss. This board is of material which may be sawn through for trimming the truss at said one end to shorten its length. It may be a wood board or a board of oriented strand material; in the latter case, it is referred to as an oriented strand board (OSB). It is secured at the top to the top chord 3 and at the bottom to the bottom chord 5 by being glued in grooves G1, G2 in the chords. The truss 1 is shown as further comprising vertical web members each designated 11 and each comprising a short length of lumber (e.g., a length of 2×4) extending vertically between the upper and lower chords 3 and 5 and fastened thereto with press in nail plates 13, these vertical wooden web members being spaced at intervals along the length of the truss. In the illustrated embodiment, two vertical members 11 are provided at spaced apart locations near the middle of the truss to define an opening for receiving ductwork or the like. A third member 11 is shown at the opposite end of the truss 1 from the board 9. The vertical web members 11 are spaced along the length of the truss at positions such as indicated at Y1, Y2 and Y3. While only one board 9 is shown, it will be understood that the truss may be made to have another board like the board 9 at the other end, e.g., the chords may be made longer than shown in FIG. 1 and the aforementioned third vertical member eliminated.

The metal web members 7 are conventional generally V-shaped metal (steel) web members having integrally formed nailing teeth or nails 7N at the apex 7V of the V and at the ends of the branches or arms 7A of the V, applied in inverted position to the sides of the chords 3 and 5. Reference may be made to the co-assigned U.S. Pat. No. 4,346,850 for an example of such a metal web member. The nails are driven into the sides 3L, 3R, 5L and SR of the chords. The four generally V-shaped metal web members 7 on the one side of the upper and lower chords 3 and 5 are fastened thereto at the intervals X1–X3, X3–X5 and X5–X6 which occur between the aforesaid positions and the five V-shaped metal web members on the other side are fastened thereto at the intervals X2–X4 and X4–X5 which occur between the aforesaid positions. The vertical wooden web members 11 are fastened in between the chords at the intervals Y1–Y2 and Y2–Y3. The spacing of and intervals between the V-shaped members 7 is in reference to the apices thereof (or stated another way, in reference to center lines bisecting the V). The significance of the stated intervals will become apparent further on in the ensuing description of the apparatus of this invention for fabricating the trusses.

Figure 4:
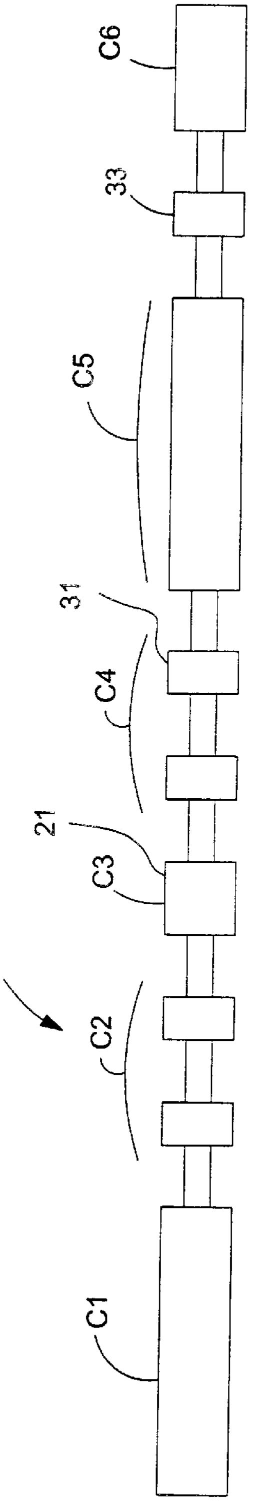
FIG. 4 is a schematic plan view of an apparatus for manufacturing the truss of FIG. 1.
Figure 5:
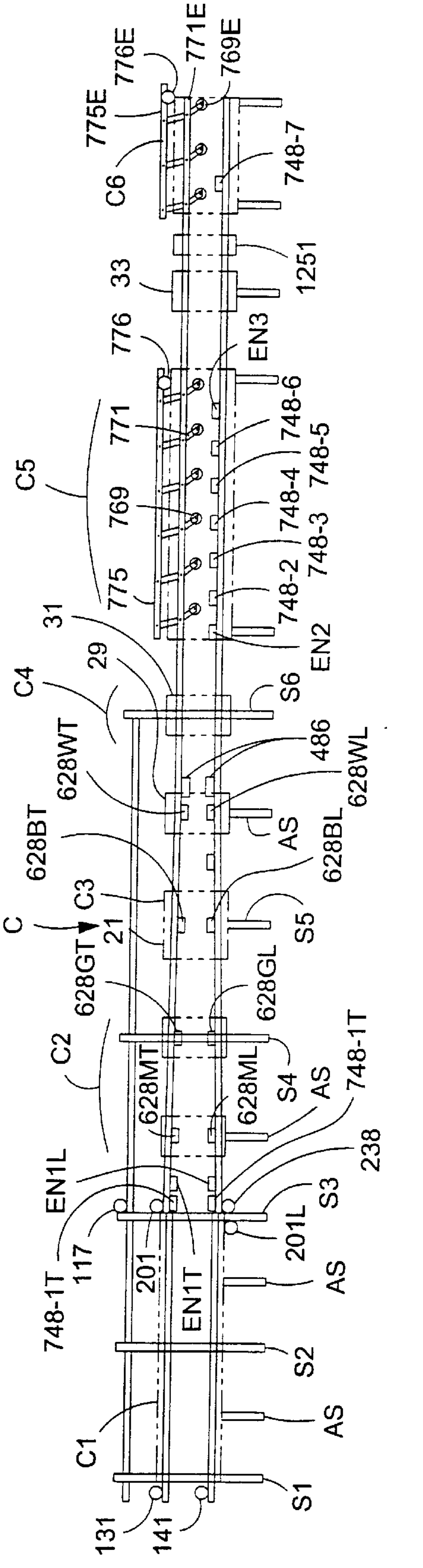
FIG. 5 is a schematic elevation view of the apparatus of FIG. 4.

Now referring first to FIGS. 4 and 5, apparatus of this invention for fabricating trusses of the type illustrated in FIGS. 1–3 is shown diagrammatically to comprise a conveyor line designated in its entirety by the reference character C comprising a plurality of individual conveyors or conveyor sections C1–C6 in line one after another (i.e., in tandem). The entire line comprising the stated sections may be simply referred to overall as the conveyor C since essentially it functions to convey chords for a truss down the line (from left to right as viewed in FIGS. 4 and 5). The conveyor C comprises an upper chord conveying run 17 and a lower chord conveying run 19 for feeding endwise in a forward direction (which is left to right as viewed in said Figures), lengths of lumber constituting the upper and lower chords 3 and 5 of the trusses such as the truss 1 to be fabricated. The upper chord conveying run 17 contacts the upper chord 3 and the lower chord conveying run 19 contacts the lower chord 5 in the operation of the apparatus. The runs effect feeding of the chords endwise in forward direction in a predetermined plane, which is a generally vertical plane in the case of the illustrated embodiment of the apparatus. Each upper chord length of lumber 3 so fed forward is paired generally in lengthwise registry with a lower chord length of lumber 5 and thereby constitutes a pair serving as the upper and lower chords 3, 5 of a truss, such as the truss 1.

Figure 14:
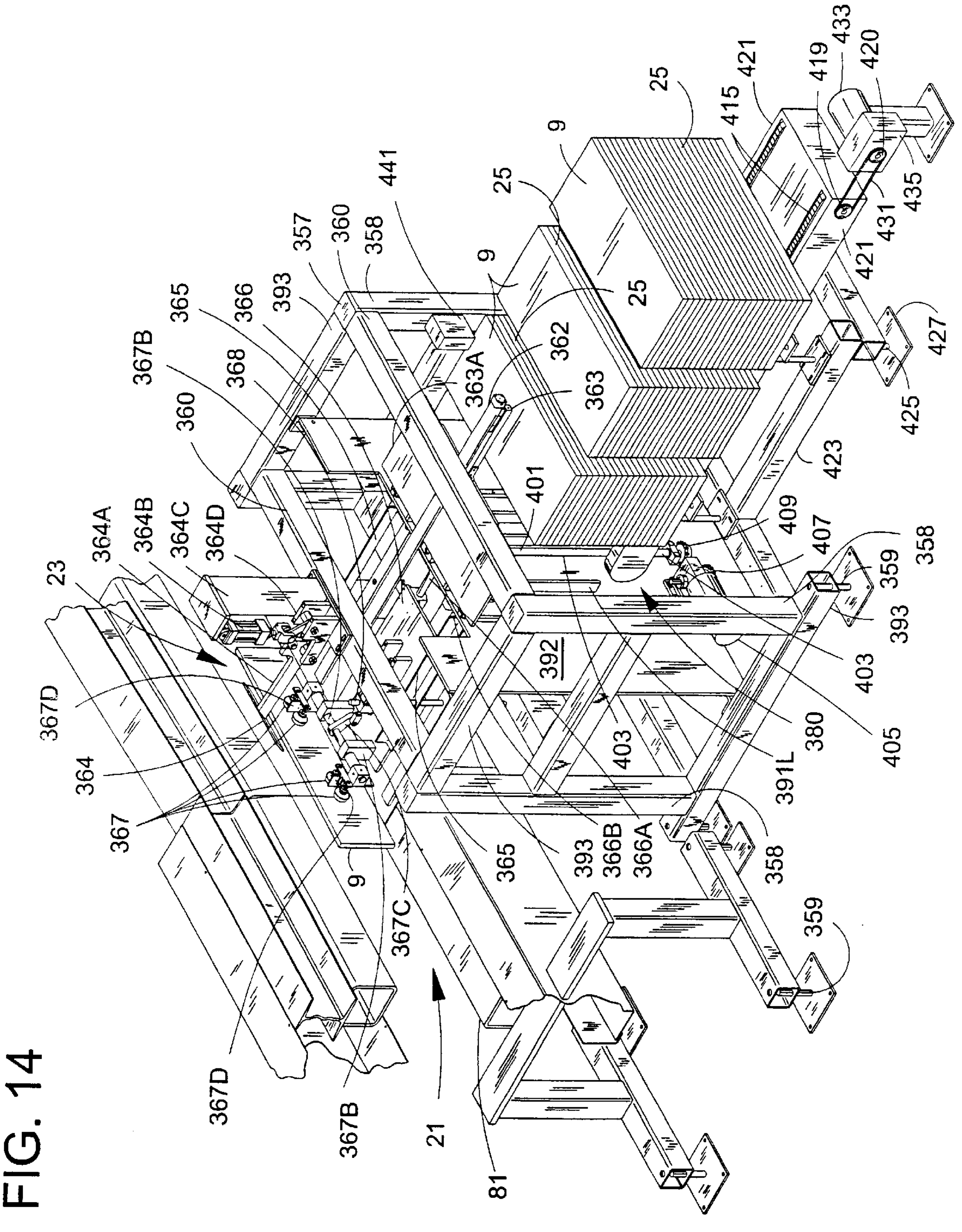
FIG. 14 is a perspective view of a device for feeding boards for insertion between truss chords at the board inserting station as seen in FIG. 11.

The conveyor C is operable to feed a pair of the chord lengths 3, 5 to and past a board applying station indicated generally at 21 where there is a board transfer device 23 for transferring a board 9 from a supply of boards at 25 (FIG. 14) to a position in the vertical plane of the conveyor for being engaged (captured) by said chord lengths 3, 5 as they are fed forward. Downstream of the transfer device 23 the board 9 is secured to the chord lengths. The conveyor is operable in a manner intermittently to feed the pair of chord lengths 3, 5 with the board 9 in place in said pair forward a distance in accordance with the above-noted intervals to and then past a station generally designated 29 for application of vertical web members 11 between the chord members 3, 5 of the pair, then to and past a station generally designated 31 for effecting the fastening of the inserted vertical web members 11 to the chord lengths of lumber, and subsequently to and then past a station generally designated 33 for application of metal web members 7 to opposite side surfaces 3L, 3R, 5L, 5R of the pair 3, 5 at the stated intervals therefor, the pair dwelling at the stations for a dwell period between the forward feed of the pair. At station 29, there is an applicator 35 for taking vertical web members 11 from a supply at 37 (see FIGS. 22–26) and inserting them between the chord members 3, 5. At station 31, there is a device generally designated 39 for effecting the fastening of the vertical web members in place on the chord members by means of the fasteners 13. And at station 33, there is a first metal web member applicator 41L on the left side of the conveyor (left as viewed in forward, i.e. downstream, direction of feed by the conveyor C) for applying a metal web member 7 to the pair of chord lengths of lumber 3, 5 on that side during a dwell period of said pair at station 33 and there is a second metal web applicator 41R on the other (right) side of the conveyor for applying a metal web member 7 on said other (right) side during said dwell period. The metal web member applicators 41L, 41R are essentially identical, each having a holder 43 (see FIG. 30) for holding a supply of the members 7, a transfer device 45 for transferring a member 7 into position on the respective side of said pair at station 33, and a driver 47 for effecting driving of the nails (the fasteners) into the lengths of lumber constituting said pair on the opposite (left and right) sides of said pair to fasten the metal web members 7 to said pair.

The conveyor sections C1–C6 are as follows, in the order stated:

C1. An initial or infeed section in which the upper and lower runs 17 and 19 are generally parallel, spaced apart a distance somewhat greater than the height of trusses to be fabricated.

C2. A second section which may be referred to as the chord preparation section (for preparing the chord lengths for assembly therewith and securement thereto of a board 9), the set 27 of devices for effecting securement of the board to the chord lengths being in this section.

C3. A third section passing through station 21 in which the runs 17 and 19 taper toward one another (i.e., converge) to the point where they are spaced a distance corresponding to the height of trusses to be fabricated. This third section may be referred to as the tapering conveyor section.

C4. A fourth section passing through the stations 29 and 31 (where the vertical web members 11 are applied and fastened), the runs 17 and 19 extending generally parallel to one another at truss height in this section.

C5. A fifth section which may be referred to as the staging section, this section being about twice as long as the longest truss length to be fabricated C6. An exit section.

In sections C5 and C6, the runs 17 and 19 are constructed and spaced as will be subsequently described for handling various truss heights without adjustment.

Figure 6:
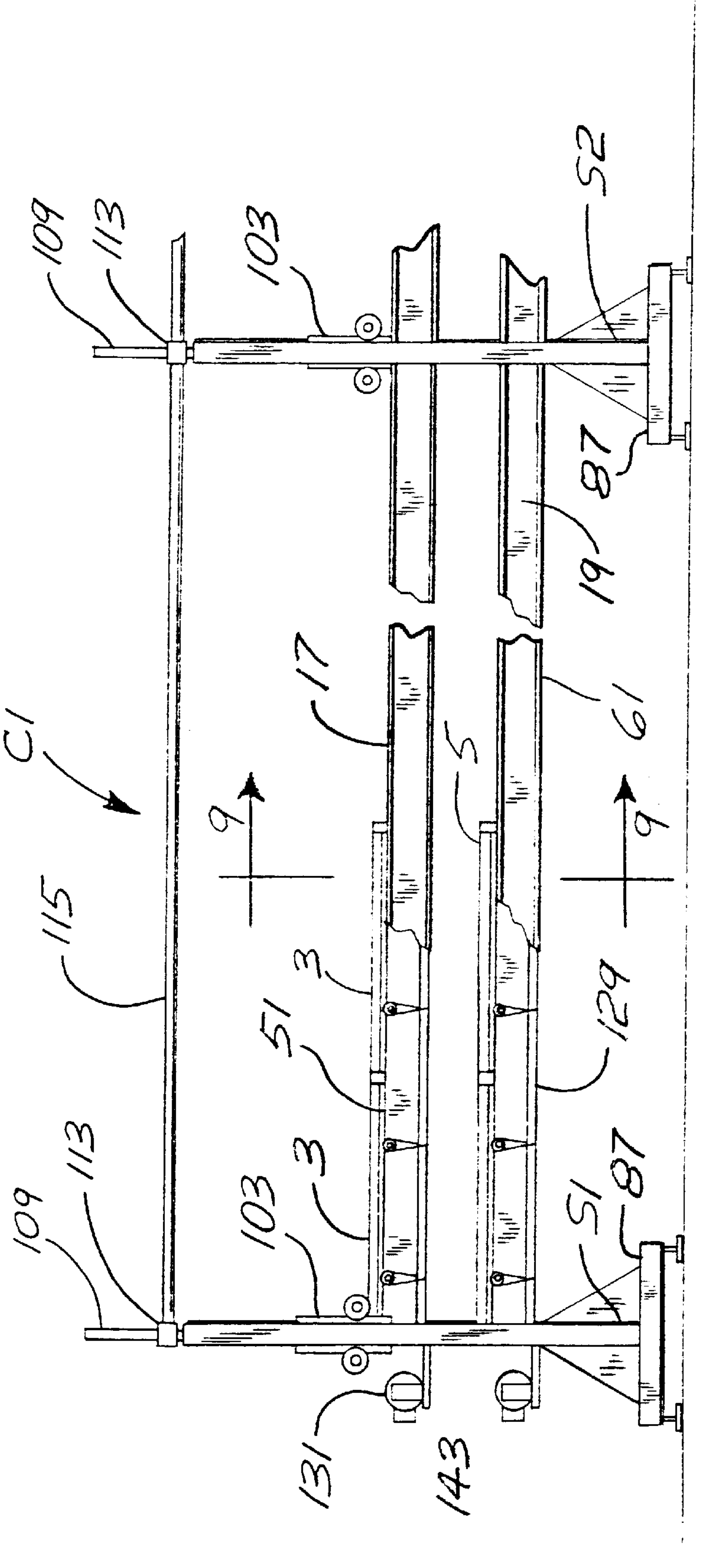
FIG. 6 is a view in side elevation, with parts broken away and parts omitted, of an infeed section of the conveyor of the apparatus for feeding chords for fabricating trusses down the line, being in part an enlarged version of FIG. 5.
Figure 7:
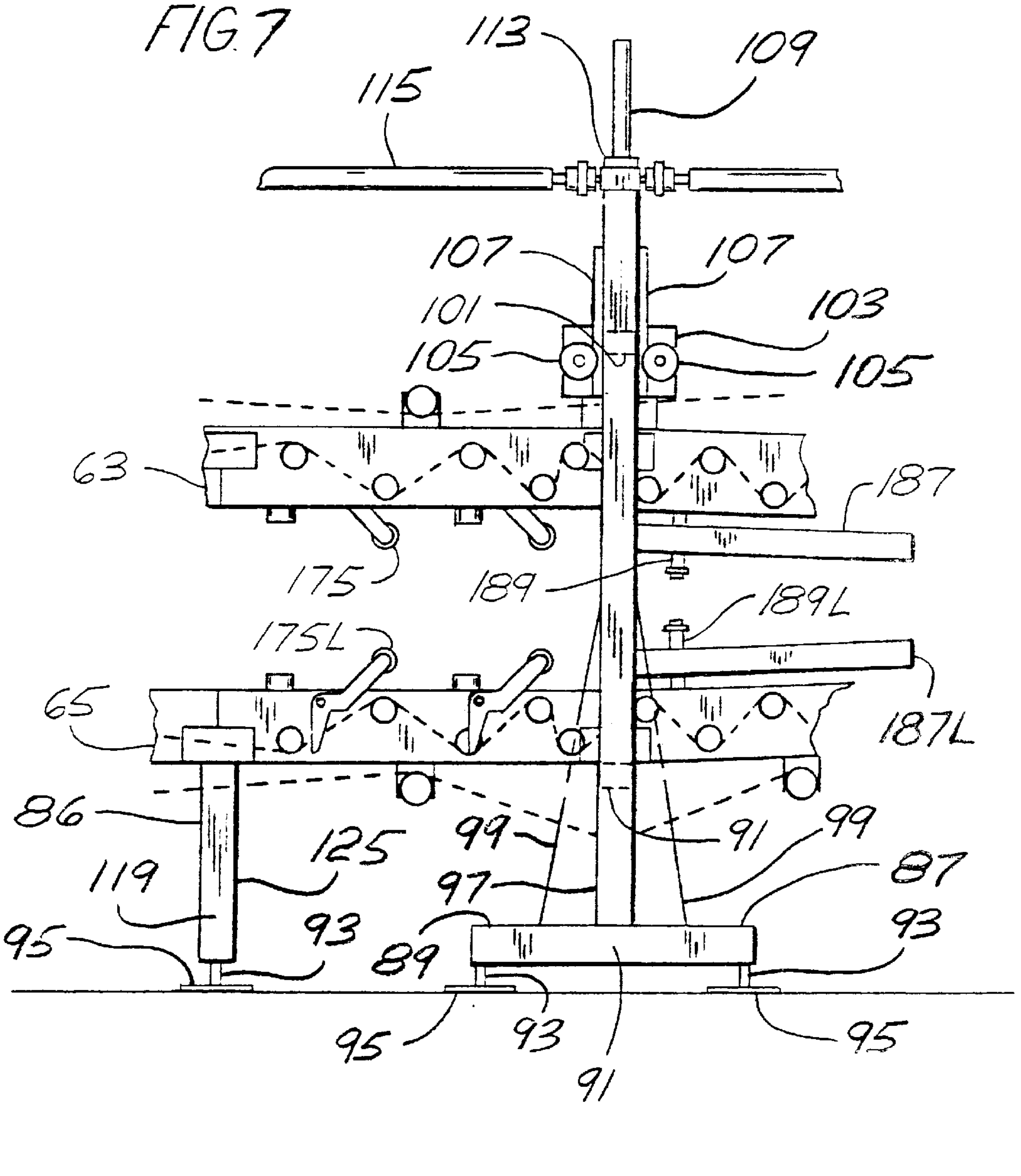
FIG. 7 is a view in side elevation, with parts omitted, of the end of the infeed section and the beginning of the milling section, being in part an enlarged version of FIG. 5.
Figure 8:
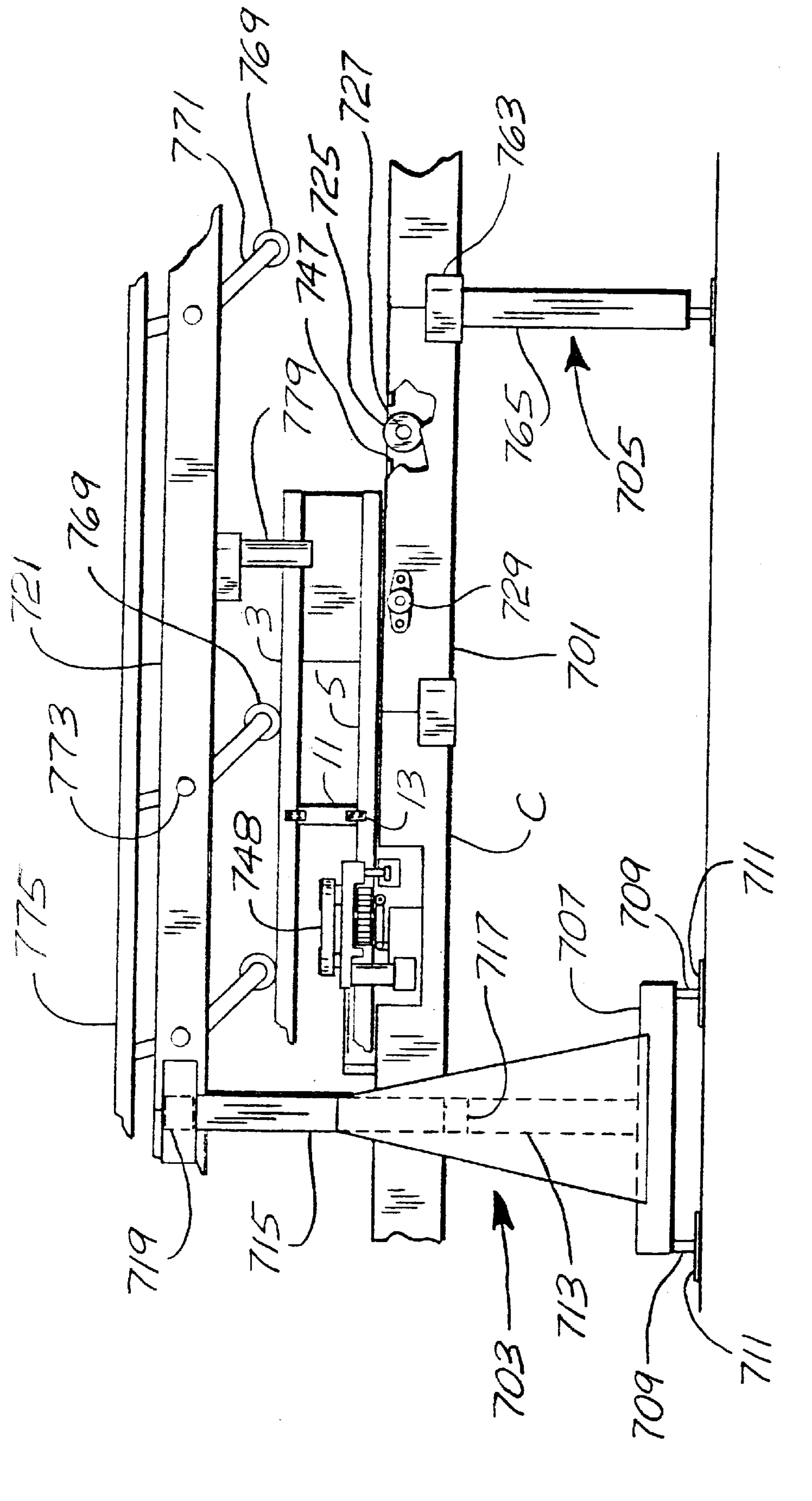
FIG. 8 is a view in side elevation, with parts omitted, of a portion of a staging conveyor, being in part an enlarged version of FIG. 5.
Figure 9:
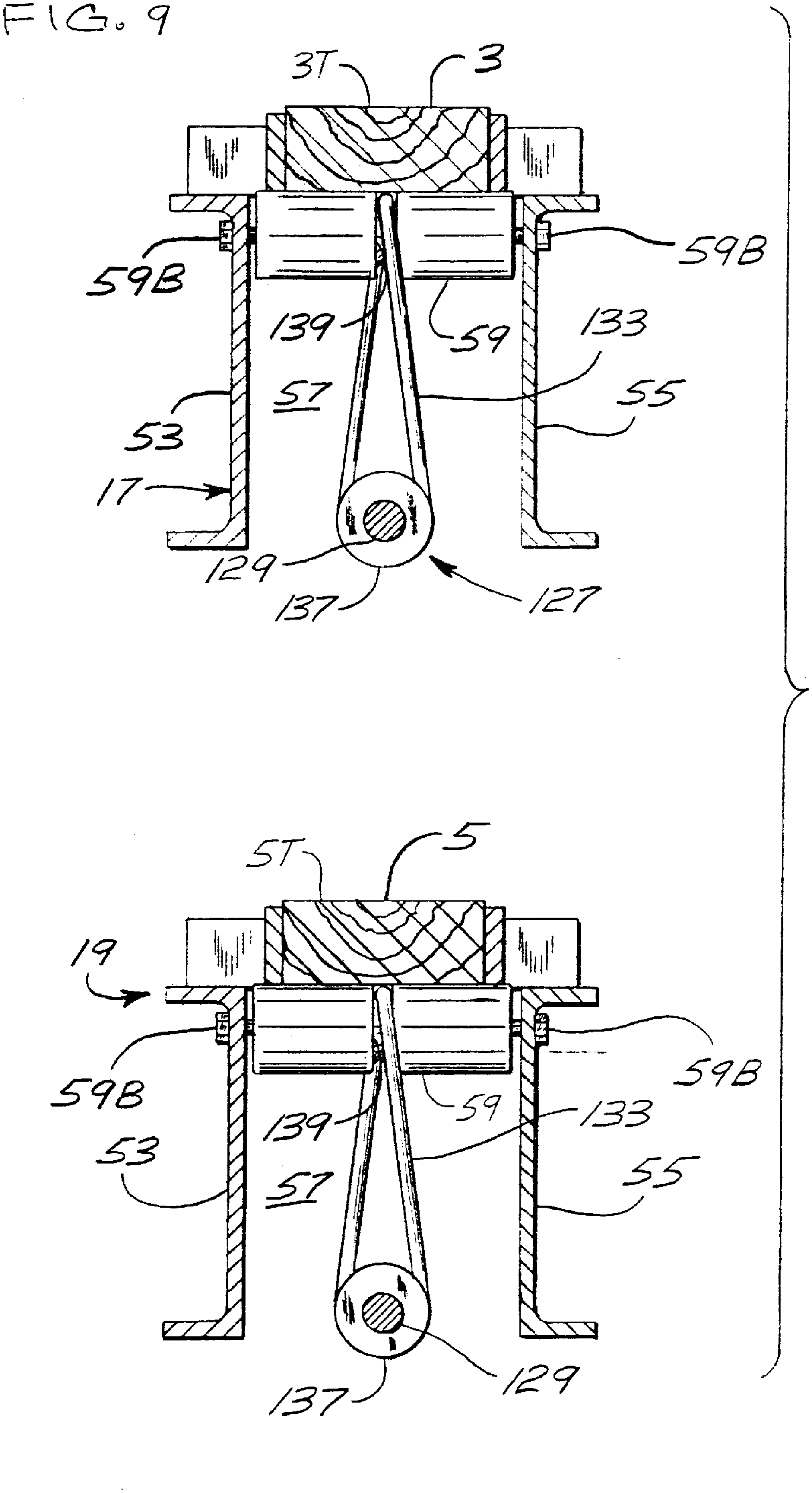
FIG. 9 is an enlarged fragmentary vertical section taken along the line 9—9 of FIG. 6.
Figure 10:
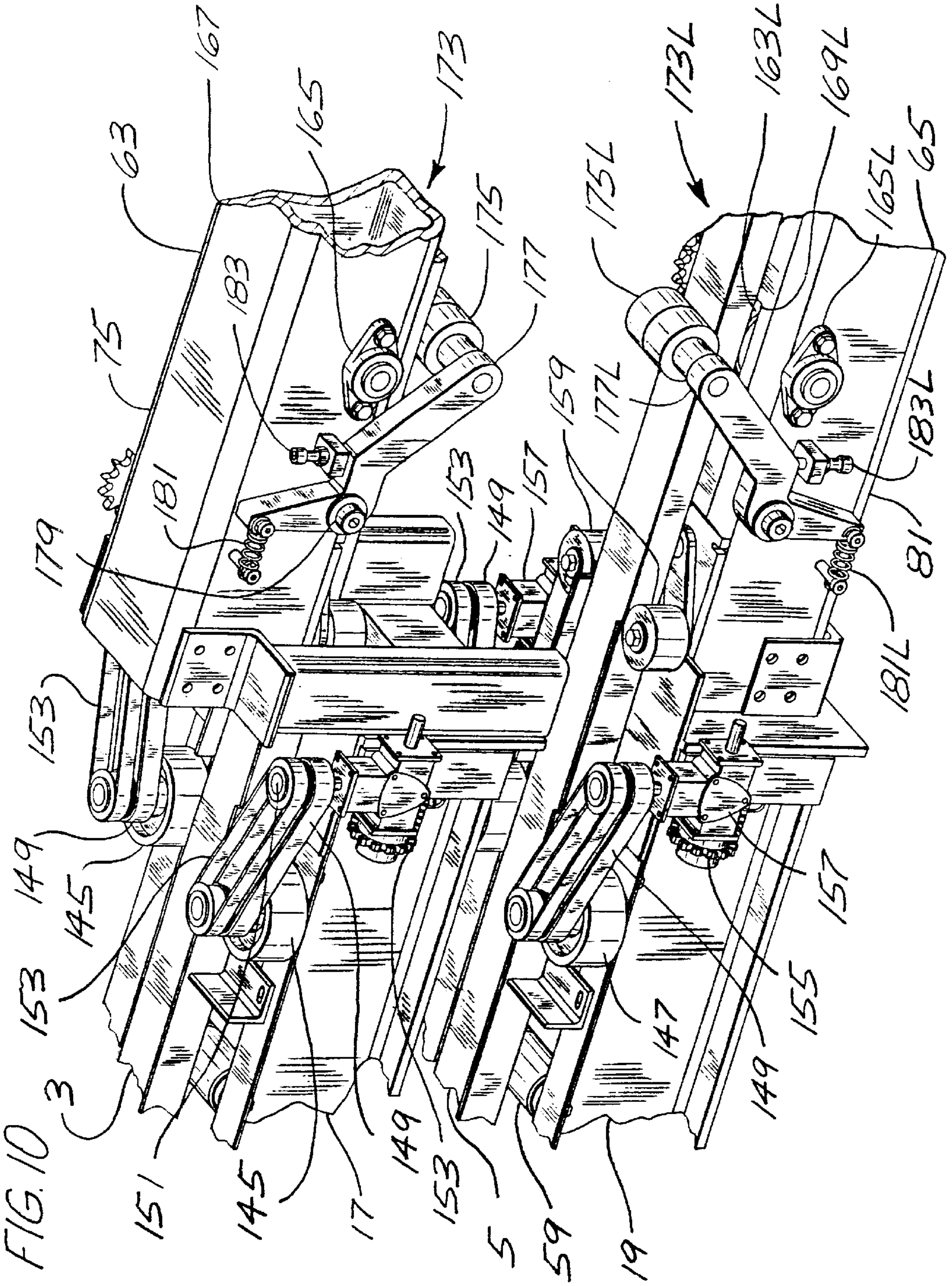
FIG. 10 is an enlarged fragmentary perspective view of the discharge end of the infeed conveyor.

Referring to FIGS. 6, 9 and 10, lumber for the chords 3, 5 of the trusses to be fabricated is placed in the infeed conveyor section C1 of the conveyor C by hand being arranged in pairs for being fed down the line for assembly with a board 9 (or two boards 9), the three vertical web members 11 and inverted V-shape metal web members 7 in the proper sequence. Referring to FIGS. 6–11, the infeed conveyor section C1 is shown to comprise an infeed section of the upper run 15 designated in its entirety by the reference numeral 51 comprising a pair of elongate side rails 53 and 55 extending parallel to one another longitudinally of section C1 having a space 57 between them and a series of rollers 59 in said space journalled in bearings 59B on the bottom of the rails. The rollers are rotatable on horizontal axes extending transversely with respect to the conveyor line in said space 57, their diameter being such that they project up above the rails for supporting the upper chord lengths of lumber 3 in section C1, the lengths lying on top of the rollers. The infeed conveyor section C1 further comprises, directly below the infeed section 51 of the upper run 15, an infeed section of the lower run 17 designated in its entirety by the reference numeral 61 and generally of construction identical to that of section 51 having rails 53, 55 and rollers 59 for supporting the lower chord lengths of lumber 5 on top of the rollers. The rollers of infeed section 51 of the upper run lie in an upper horizontal plane; the rollers of infeed section 61 of the lower run lie in a lower horizontal plane, these planes being so spaced that the upper and lower chord lengths 3, 5 carried on top of the upper and lower rollers are vertically spaced a distance somewhat greater than the height of the trusses to be fabricated. The apparatus is constructed to take chord length lumber ranging in overall length from 10 feet to 36 feet, of minimum size 1½ inch ×2$\frac{3}{16}$ inch (referred to as 2×3s), and of maximum size 1½ inch×3½ inch (referred to as 2×4s), for the fabrication of trusses ranging from 10 feet to 36 feet long and ranging in height from 9¼ inches minimum to 16¼ inches maximum.

The upper and lower runs 15 and 17 of conveyor C continue forward (downstream) from section C1, having upper and lower horizontal reaches 63 and 65 in the chord preparation section C2 of conveyor C in line with infeed sections 51 and 61, a downwardly inclined upper reach 67 and an upwardly inclined lower reach 69 in the tapering conveyor section C3 and upper and lower horizontal reaches 71 and 73 in the vertical web applying and fastening section C4. Reaches 67 and 69 converge to a vertical spacing of, and reaches 71 and 73 are vertically spaced, a distance generally corresponding to the height of trusses to be fabricated. The upper reaches 63, 67 and 71 in sections C2, C3 and C4 comprise three beams 75, 77 and 79 extending end-to-end longitudinally of conveyor C, the central beam 77 of this trio being inclined downwardly from the downstream end of beam 75 to the upstream end of beam 79. Similarly, the lower reaches 65, 69 and 73 comprise three beams 81, 83 and 85 extending end-to-end longitudinally of the conveyor C, the central beam 83 of this trio being inclined upwardly from the downstream end of beam 81 to the upstream end of beam 85.

The upper infeed section 51 and the assembly of beams 75, 77 and 79 (the segment of the upper run of the conveyor in C2–C4) constitutes a unit adapted to be raised or lowered (as the case may be) for adjustment for fabricating trusses of different height. The lower infeed section 61 and the assembly of beams 81, 83 and 85, and the segment of the lower run of the conveyor in sections C2–C4 remain at the same elevation as initially established. The upper and lower infeed sections 51 and 61 in section C1 and the upper and lower beam assemblies 75, 77, 79 and 81, 83, 85 in conveyor sections C2–C4 are supported by a plurality of supporting frames or stanchions, six being shown and designated S1–S6 in order upstream to downstream. S1 and S3 provide support generally at the upstream and downstream ends of infeed conveyor section C1 (FIG. 6). S2 provides support intermediate the ends of section C1. S3 also provides support generally at the upstream end of section C2, and S4 provides support generally at the juncture of sections C2 and C3, S5 provides support generally at the juncture of sections C3 and C4, and S6 provides support generally at the downstream end of section C4. Auxiliary supports each designated AS are provided in section C1 for the lower feed section 61 and in sections C2–C4 for the lower triple-beam assembly 81, 83, 85 of sections C2–C4.

The stanchions (FIGS. 6 and 7) are substantially similar, each comprising a base 87 having members 89 at opposite sides thereof and a cross-frame member 91 extending between the side members 89 at their midpoints. Legs 93 having flat plates 95 for feet resting on the floor indicated at F are adjustable adjacent their ends. Extending up from the side members 89 of the base at their midpoints are vertical posts 97 braced by gusset plates 99. An upper frame member 101 extends between the upper ends of the posts, completing a generally rectangular framework. A carriage 103, which may also be called a trolley, is vertically adjustable in the space between the posts, having rollers 105 movable up and down on tracks 107 on the posts. The carriage (or trolley) is vertically adjustable by mechanism including a lead screw 109 extending down from the upper frame member 101 having a threaded connection therewith.

The aforesaid unit of conveyor C comprised of the upper infeed section 51 and the assembly of beams 75, 77 and 79 is supported in the carriages 103 of the stanchions S1–S6 for vertical adjustment (adjustment to different elevations relative to the floor and the lower reach of the conveyor C in sections C1 to C4) for the fabrication of trusses of different height. For this purpose, the lead screws of the stanchions are rotatable one way or the other to raise or lower the carriages 103 of the stanchions in unison by gearing 113 at the upper end of each lead screw 109 operable by an elongate drive shaft 115 which extends longitudinally of conveyor sections C1–C4 above the stanchions suitably supported on their frame members 101 adapted to be driven one way or the other by a height adjustment motor and gear drive unit 117 (FIGS. 5 and 38) operated by the PLC 505 as preprogrammed for the heights of various trusses. The motor 117 may be mounted on any of the stanchions S1–S6. The height (spacing between the upper and lower conveyors) can be indicated by any suitable encoder type device 118 such as a proximity switch that senses the rotation of a drive sprocket or the like with the PLC counting the number of revolutions and equating the revolutions to height.

The auxiliary supports AS (FIGS. 7 and 8) are all substantially similar, each comprising a cross-bar 119 having legs 93 with flat-plate feet 95, the legs being threaded therein adjacent the ends of the cross-bar and a post 125 extending up from the cross-bar at its midpoint supporting the lower reaches of the conveyor C in sections C1–C6.

The rollers 59 of the upper infeed section 51 are adapted to be driven in unison in the forward direction of rotation for feeding chord lengths 3 thereon in forward direction by an upper roller drive system generally designated 127 comprising an upper roller drive shaft 129 extending throughout infeed conveyor section C1 underneath the rollers of the upper infeed section 51 adapted to be driven by a motor 131 (with a speed reducer unit) on the carriage 103 of stanchion S1. The drive shaft is suitably journalled in bearings on the carriages of stanchions S1–S3 for vertical adjustment therewith and is operable to drive all the upper rollers by means of a multiplicity of endless belt drives 133, the belts 135 of which are trained around pulleys 137 on the drive shaft and around the rollers in annular grooves 139 in the rollers, each groove being deep enough to allow a chord length of lumber to engage the roller (see FIGS. 6 and 9).

The rollers 59 of the lower infeed section 61 are adapted to be driven in unison in the forward direction of rotation for feeding chord lengths 5 thereon in forward direction by a lower roller drive system generally designated 141 substantially similar to the upper roller drive system. The same reference characters are used for the components of system 141 as for system 127 except that the motor of system 141, which is mounted at the upstream end of lower infeed section 61, is designated 143 to distinguish it from motor 131 (FIGS. 6 and 9).

Figure 35:
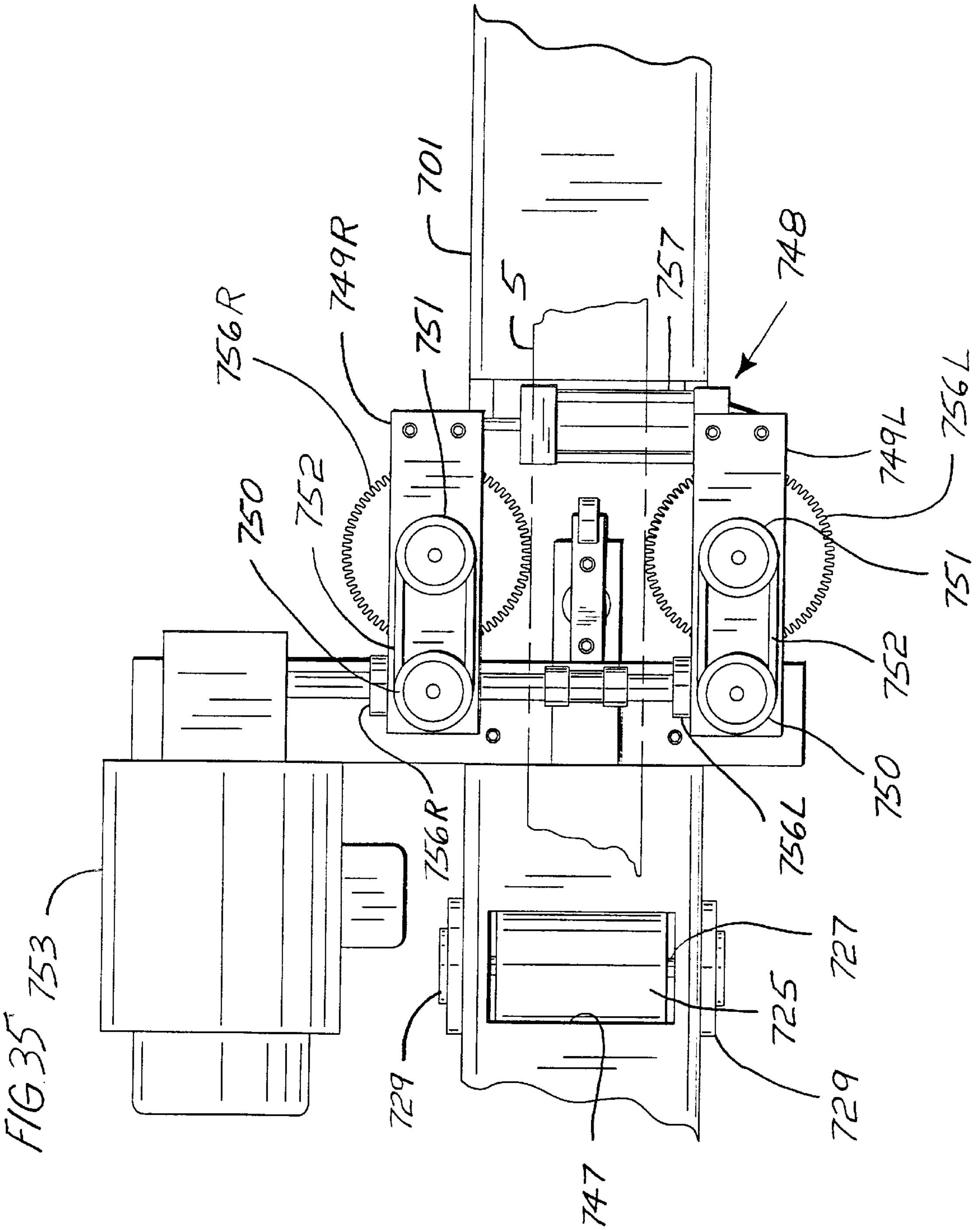
FIG. 35 is an enlarged plan view of a chord drive device used to drive chords in the staging conveyor.

The apparatus is provided at the downstream end of the upper run 51 of the infeed section C1 of conveyor C with a pair of take-off rollers, each designated 145 (see particularly FIG. 10), engageable with the sides of the upper chord lengths 3 for feeding them forward from section C1 into section C2, and at the downstream end of the lower run 61 of section C1 and with a similar pair of take-off rollers, each designated 147, for feeding the lower chord lengths 5 forward from section C1 into section C2. Rollers 145 and 147 are journalled with their axes vertical at the ends of arms 149 pivoted for swinging movement on vertical shafts 151, the arms being biased by springs (not shown) to swing rollers 145 into engagement with the sides of upper chord lengths 3 and rollers 147 into engagement with the sides of lower chord lengths 5. Drives for the rollers 145 and 147 include belt and pulley drives 153 from shafts 151, which are adapted to be driven by drives comprising chain and sprocket drives 155, and right-angle gearing in gear boxes 157. Side guides for the chord lengths are indicated at 53, 55. An alternative drive to advance the upper and lower chords 3, 5 from the infeed conveyor is shown in FIG. 35 and described below.

The upper beams 75, 77 and 79 and the lower beams 81, 83 and 85 in conveyor sections C2–C4 are box beams of generally square hollow cross section (see FIGS. 10–13). The three upper beams in effect amount to one continuous beam with the downwardly inclined intermediate section 77; the three lower beams also in effect amount to one continuous beam with the upwardly inclined intermediate section 83. The upper beams or beam sections 75 and 77 carry an upper series of rollers 163 having trunnions journalled in bearings 165 on the outside of side walls 167 of beams 75 and 77, these rollers being rotatable on horizontal axes fixed with respect to conveyor C (transversely of the beams). Rollers 163 are of such diameter and their axes are so located with respect to slots 169 in the bottom wall 171 of beams 75 and 77 that they project down out of the beams through the slots for engagement of upper chord lengths 3 with the bottoms of the rollers for the forward feed of said lengths. The bottoms of rollers 163 in beam 75 are in a plane generally parallel to the plane of the tops of the rollers 59 in conveyor section C1; in beam 77, they are generally in a plane slanting down to section C4. A series of vertically movable rollers 175 is carried by beam 75 for holding up chord lengths 3 against the bottoms of rollers 163 of beam 75. Rollers 175 are at the lower ends of bell crank levers 177 pivoted at 179 on the outside of one of the side walls of beam 75 biased by springs 181 to tend to move rollers 175 up toward rollers 163. Adjustable stops for the levers are indicated at 183. Extending down from the bottom wall of beam 77 are headed studs 185 having rails 187 slidable thereon and biased upward by springs 189 carrying rollers 191 for holding up chord lengths 3 against the bottoms of rollers 163 of beam 77. A chain and sprocket drive indicated generally at 193 is provided for driving the rollers 163 in chord-length-feeding direction comprising chain 195 trained around sprockets 197 on the right-hand trunnions of the rollers with a chain and sprocket drive 199 for the upstream roller 163 including a motor 201 (and speed reducer).

The lower beam or beam sections 81 and 83 match the upper beams or beam sections 75 and 77, being inverted or reversed with respect thereto. Reference numerals used for the components associated with beams 81 and 83 correspond to those used for the components associated with beams 75 and 77, but with the subscript L for distinction. Thus, the lower beams or beam sections 81 and 83 carry a lower series of rollers 163L having trunnionsjournalled in bearings 165L on the outside of the side wall of beams 81 and 83, these rollers being rotatable on horizontal axes fixed with respect to conveyor C (transversely of the beams). Rollers 163L are of such diameter and their axes are so located with respect to slots 169L in the top wall 171L of beams 81 and 83, that they project up out of the beams through the slots for engagement of lower chord lengths 5 with the tops of the rollers for the forward feed of said lengths. The tops of rollers 163L in beam 81 are in a plane generally parallel to the plane of the tops of the rollers 59 in conveyor section C1; in beam 83, the rollers are generally in a plane slanting up to section C4. A series designated in its entirety by the reference numeral 173L of vertically movable rollers 175L, is carried by beam 81 for holding down chord lengths 5 against the tops of rollers 169L of beam 81. Rollers 175L are at the upper ends of bell crank levers 177L pivoted at 179L on the outside of one of the side walls of beam 81 biased by springs 181L to tend to move rollers 175L down toward rollers 169L. Adjustable stops for the levers are indicated at 183L. Extending up from the top wall of beam 83 are headed studs 185L having rails 187L slideable thereon and biased downward by springs 189L carrying rollers 191L for holding down chord lengths 5 against the tops of rollers 163L. A chain and sprocket drive indicated generally at 193L is provided for driving the rollers 163L in chord-length-feeding direction comprising chains 195L trained around sprockets 197L on the left-hand trunnions of the rollers with a chain and sprocket drive 199L for the upstream roller 163L including a motor 201L (and speed reducer).

The upper beam 79 carries a series of rollers 205 having trunnions joumalled in bearings 207 vertically slidable in slots 209 in the side walls 211 of the beam 79 over a short distance. Bearings 207 are biased downward by springs 213 to a lower limit engaging the lower ends of the slots 209 (FIG. 8). The rollers 205 project out of beam 79 through slots (not shown) in the bottom wall 217 of beam 79 in both their lower and upper positions for engagement of upper chord lengths 3 with the bottoms of rollers 205 in both said positions, the rollers being of the requisite diameter and their axes as determined by the bearings 207 having the requisite locations for the purpose. When the rollers 205 are in their lower position (held down therein by the springs 213), their bottoms lie in a generally horizontal plane. A series of vertically movable rollers 221 is carried by beam 79 for holding up chord lengths 3 against the bottoms of rollers 205. Rollers 221 (like rollers 175) are at the lower ends of bell crank levers 223 pivoted at 225 on the left side beam 79 biased by springs 227 to swing rollers 221 up toward rollers 205. Adjustable stops for levers 223 are indicated at 229. The upward bias of springs 227 is insufficient to overcome the downward bias of springs 213. A chain and sprocket drive generally designated 231 is provided for driving the rollers 205 in chord-length-feeding direction comprising a chain 233 trained around sprockets 235 on the right-hand trunnions of the rollers 205 and sprockets 237 carried on beam 79, drive 231 being served by a motor 238 (shown schematically in FIG. 38) via a speed reducer and a vertical drive shaft and gearing (not shown).

The lower beam 85 matches the upper beam 79, being inverted or reversed with respect thereto. Reference numerals used for components associated with beam 85 correspond to those used for the components associated with beam 79, but with the subscript L for distinction. The lower beam 85 carries a series of rollers 205L having trunnions joumalled in bearings 207L vertically slidable in slots 209L in the side walls 211L of the beam 85 over a short distance. Bearings 207L are biased upward by springs 213L to an upper limit engaging the upper ends of the slots 209L. The rollers 205L project out of beam 85 through slots 215L in the top wall 217L of beam 85 in both their upper and lower positions for engagement of lower chord lengths 5 with the tops of rollers 205L in both said positions, the rollers being of the requisite diameter and their axes as determined by the bearings 207L having the requisite locations for the purpose. When the rollers 205L are in their upper position (held up therein by the springs 213L), their tops lie in a generally horizontal plane. A series of vertically movable rollers 221L is carried by beam 85 for holding down chord lengths 5 on the tops of rollers 205L. Rollers 221L are at the upper ends of bell crank levers 223L pivoted at 225L on the outside of the right side wall of beam 85 biased by springs 227L to swing rollers 221L up toward rollers 205L. Adjustable stops (not shown) for levers 223L are provided. The downward bias of lever springs is insufficient to overcome the upward bias of springs 213L. A chain and sprocket drive generally designated 231L is provided for driving the rollers 205L in chord-length-feeding direction comprising a chain 233L trained around sprockets 235L on the right-hand trunnions of the rollers 205L and sprockets 237L carried on beam 85, drive 231L being served by the motor 238 (via the speed reducer). Rollers 221 and 221L, being downstream from the board applying station 21, are so constructed and arranged as to be clear of the board 9 in place between chords 3, 5.

The apparatus is operable in cycles in each of which a pair of chord lengths 3, 5 which are to constitute the upper and lower chords of a truss are fed forward in registry (or substantially in registry) from the infeed section C1 of the conveyor C to conveyor sections C2 and then to section C3 in a continuous manner.

Figure 18:
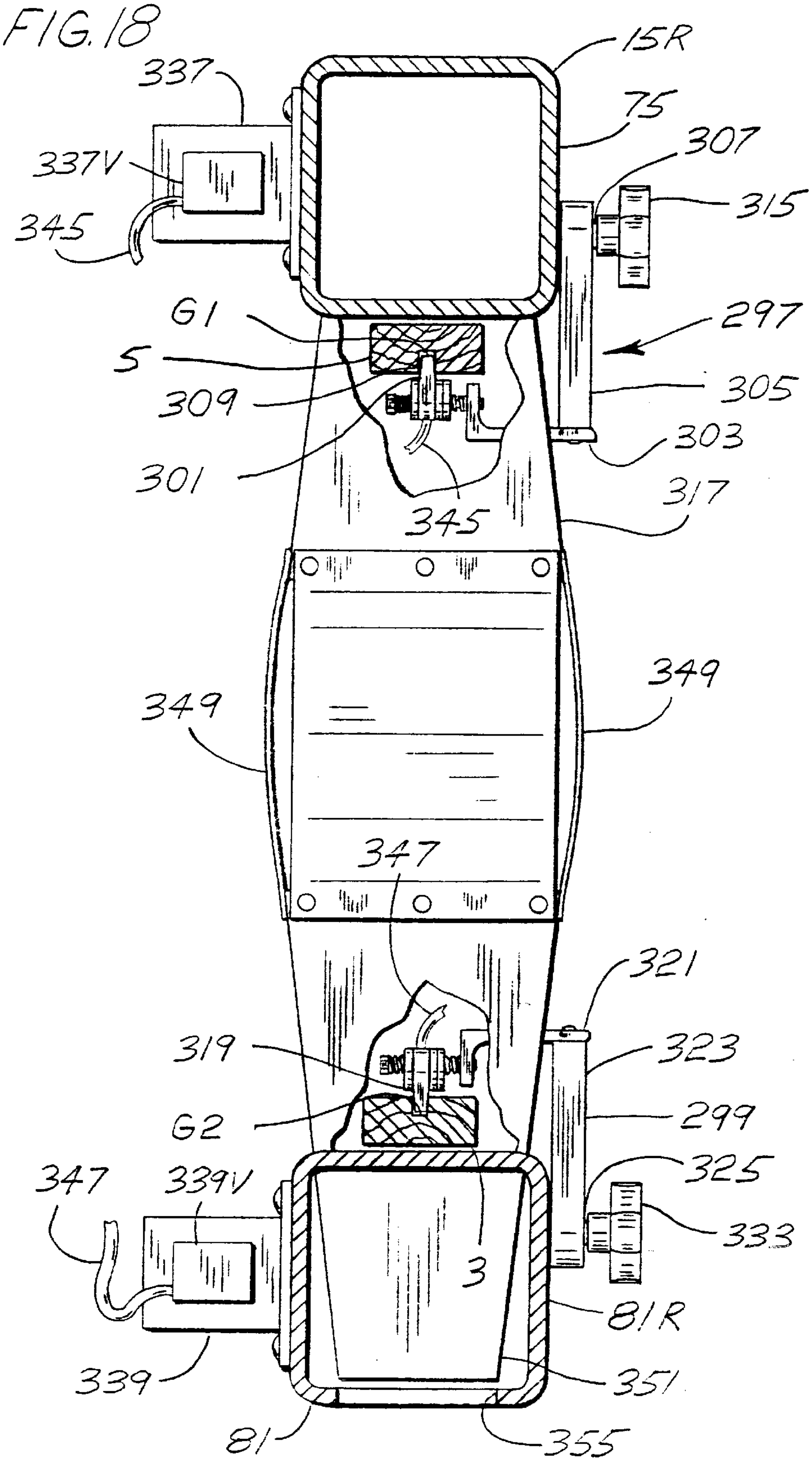
FIG. 18 is a fragmentary end elevation view of glue applicators.

Section C2 extends through the aforesaid board applying station 21 comprising the set of devices indicated at 27 for effecting the securement of the board to the chord lengths and the board transfer device 23 for transferring a board 9 from the supply to a position downstream of the devices indicated at 27 and adjacent the downstream end of C2 for being engaged by the chord lengths and thereby completing the securement. The set of devices 27 includes, first, an upper milling device 271 and a lower milling device 273 (see FIG. 12) for milling a longitudinal board-receiving groove G1 generally centrally in the bottom of the upper chord 3 and a similar groove G2 in the top of the lower chord 5, these grooves extending from the leading ends of the chord lengths back for a distance somewhat greater than board length. The milling devices 271 and 273 are substantially identical, but mounted in reversed or inverted positions, and a description of one will suffice for both. Each comprises a horizontal base 275 having a vertical flange 277. A pair of rods 279 vertically slidable in linear bearings 281 mounted on one side of the base 275 carry a plate 283 supporting a motor for driving a circular saw for the milling of the respective groove. The motor of the lower milling device 273, which is best shown in FIG. 18, is designated 285L; the motor of the upper milling device 271 is designated 285T, and the saws of the upper and lower milling devices are designated 287T and 287L to distinguish one from the other. The plate with the motor and saw of each milling device is vertically movable by means of an air cylinder 289 carried by the base on the opposite side from the linear bearings having its piston rod 291 connected to a yoke 293 joining the rods 279. Each of the saws is adapted to mill its groove G1 or G2 in the respective chord length 3, 5 with a tapered cross-section converging inward (see FIG. 12) for facilitating reception of the upper and lower margins of the board and effecting a good connection.

The upper milling device 271 is mounted on the right side of the upper beam 75 by means of its flange 277 with its motor 285T down extending transversely under beam 75 carrying its saw 287T in the central vertical longitudinal plane of the upper chord 3, the saw being movable from a lowered retracted position clear of the chord 3 to a raised position for sawing the groove G1 in the upper chord. The cylinder 289 of the device 271 (the upper milling device) is operable for moving the upper saw 287T between said positions. The lower milling device 273 is mounted on the left side of the lower beam 81 by means of its flange 277 with its motor 285L down extending transversely over beam 81 carrying its saw 287L in the central vertical longitudinal plane of the lower chord 5, the saw being movable from a raised retracted position clear of the chord 5 to a lower position for sawing the groove G2 in the lower chord. The cylinder 289 of the lower milling device 273 is operable for moving the lower saw 287L between said positions. The upper and lower cylinders 289T, 289L are under control of valves 294T, 294L respectively (shown schematically in FIG. 38). A suitable dust collection system, e.g., a vacuum system (not shown since it is not a critical part of the invention) is provided for collecting the sawdust resulting from the milling operation on the chords 3, 5. The two saws 287T and 287L may also function to mill grooves in the trailing ends of upper and lower chord lengths in addition to the grooves in their leading ends as will be explained subsequently.

As a pair of chord lengths 3, 5 is fed forward into section C2 (i.e., through station 21), the upper saw 287T will have been moved up to its raised position by cylinder 289 of device 271 thereby to mill the groove G1 in the upper chord length 3, and the lower saw 287L will have been moved down to its lowered position by cylinder 289 of device 273 thereby to mill the groove G2 in the lower chord length 5. When the chord lengths have moved past the saws a distance corresponding to slightly more than the length of the board 9, the saws are retracted to end the milling operation. The operation of the upper and lower saws 287T and 287L is controlled by the encoders EN1T and EN1L respectively and limit switches LS6, LS7 respectively described below in the description of the operation of the apparatus. Guide rollers such as indicated at 295, described in more detail below are provided just upstream from the saws for centering the chords for their travel in engagement with the saws 287T, 287L.

Figure 19:
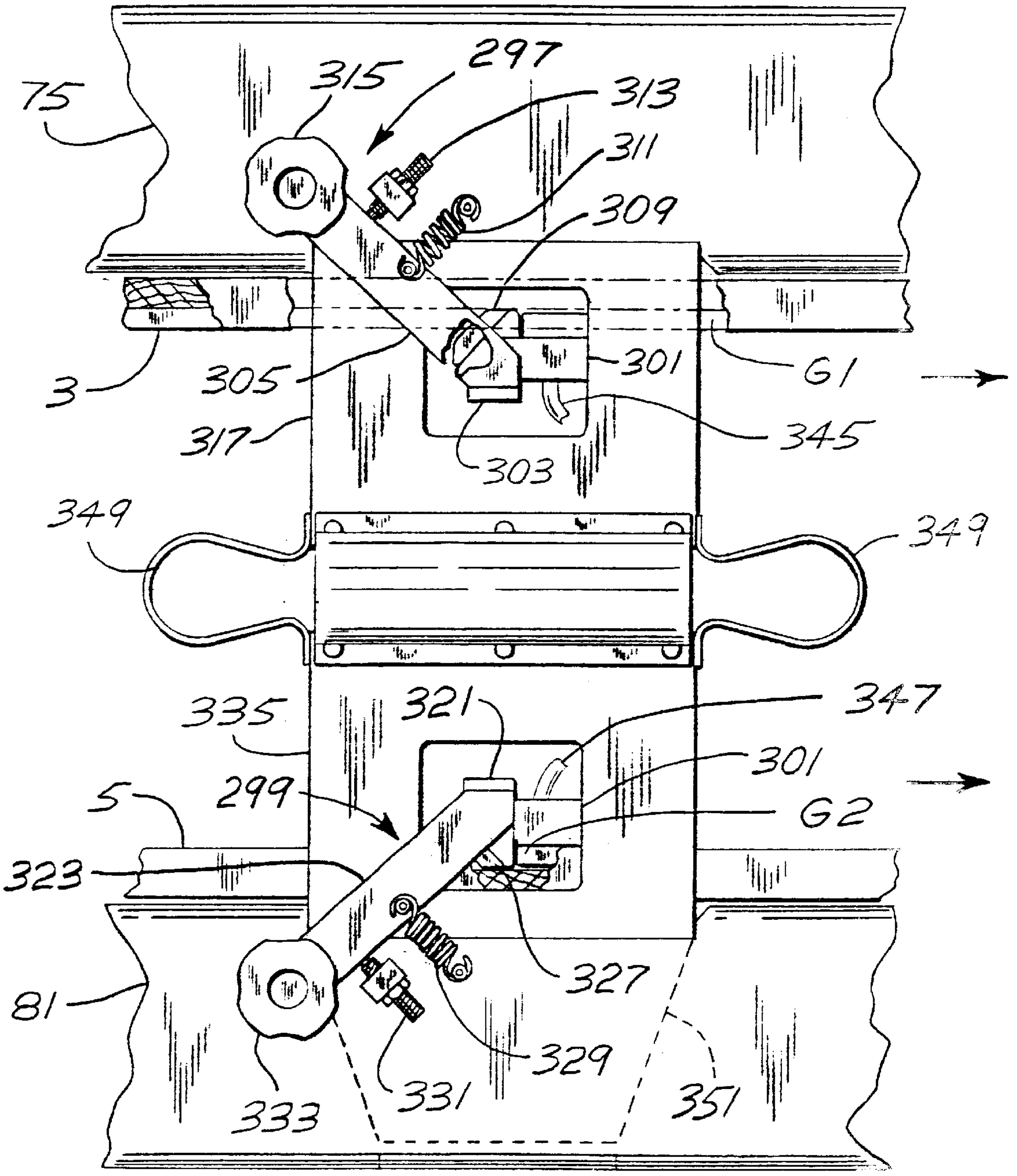
FIG. 19 is a view in side elevation of the glue applicators of FIG. 18.

The chord lengths 3, 5 grooved as above described, encounter next in section C2 an upper adhesive applying system or applicator 297 and a lower adhesive applying system or applicator 299 for applying adhesive to the upper and lower chord lengths in the grooves G1, G2 thereof for effecting securement of a board 9 in the grooves (FIGS. 18 and 19). The two adhesive applying systems are substantially identical, but reversed or inverted in position with respect to one another for applying adhesive in the groove G1 of the upper chord length 3 and in the groove G2 of the lower chord length 5. The upper adhesive applying system or applicator 297 is shown to comprise an adhesive applying head 301 for applying adhesive in the groove G1 of the upper chord length 3 as the upper chord length travels forward past the head, the head being mounted on a member 303 extending laterally under the upper box beam 75 from the lower end of an arm 305 pivoted at 307 on the side wall 75R of beam 75 for swinging movement on an axis extending transversely with respect to the beam (transversely with respect to the conveyor C). The member 303 also carries a guide 309 of tapered cross-section corresponding to the tapered cross-section of the groove for tracking in the groove G1 in the bottom of the upper chord length 3 as it travels forward under the beam 75. The arm 305 is biased by a spring 311 for entry of a head 301 in the groove G1 in the upper chord length 3, the head being passaged for flow of adhesive supplied to the head, as will be described, into the groove. An adjustable stop 313 on the right side wall of the beam 75 limits the upward swing of the arm 305 to keep the head 301 clear of the bottom of the beam when no chord length 3 is traveling under the beam. The arm 305 (with member 303 and the guide and head carried thereby) is removable, being held on its pivot 307 by a removable knob 315. Shielding 317 for confinement of adhesive which may splash out of the groove depends from the upper beam 75, having openings downstream and upstream for passage of the upper chord lengths 3.

Referring to FIGS. 18 and 19, the lower adhesive applying system or applicator 299 is also shown to comprise an adhesive applying head 319 for applying adhesive in the groove G2 of the lower chord length as the lower chord length travels forward past the head, the head being mounted on a member 321 extending laterally over the lower box beam 81 from the upper end of an arm 327 pivoted at 325 on the side wall 81L of beam 81 for swinging movement on an axis extending transversely with respect to the beam (transversely with respect to the conveyor C). The member 321 of applicator 299 also carries a guide 327 of tapered cross-section corresponding to the tapered cross-section of the groove G2 for tracking in the groove in the top of the lower chord length 5 as it travels forward over the beam 81. The arm 327 of the lower applicator 299 is biased by a spring 329 for entry of its head in the groove G2 in the lower chord length 5, the head being passaged for flow of adhesive supplied to the head as will be described into the groove G2. Adjustable stop 331 on the side wall of the beam 81 limits the upward swing of the arm 323 to keep the lower head up clear of the top of the beam when no chord length 5 is traveling over the beam. As in the upper applicator, the arm 323 with member 321 (and the guide and head carried thereby) is removable, being held on its pivot 325 by a removable knob 333. Shielding 335 is provided for confinement of adhesive which may splash out, having openings downstream and upstream for passage of the lower chord lengths 5.

Figure 20:
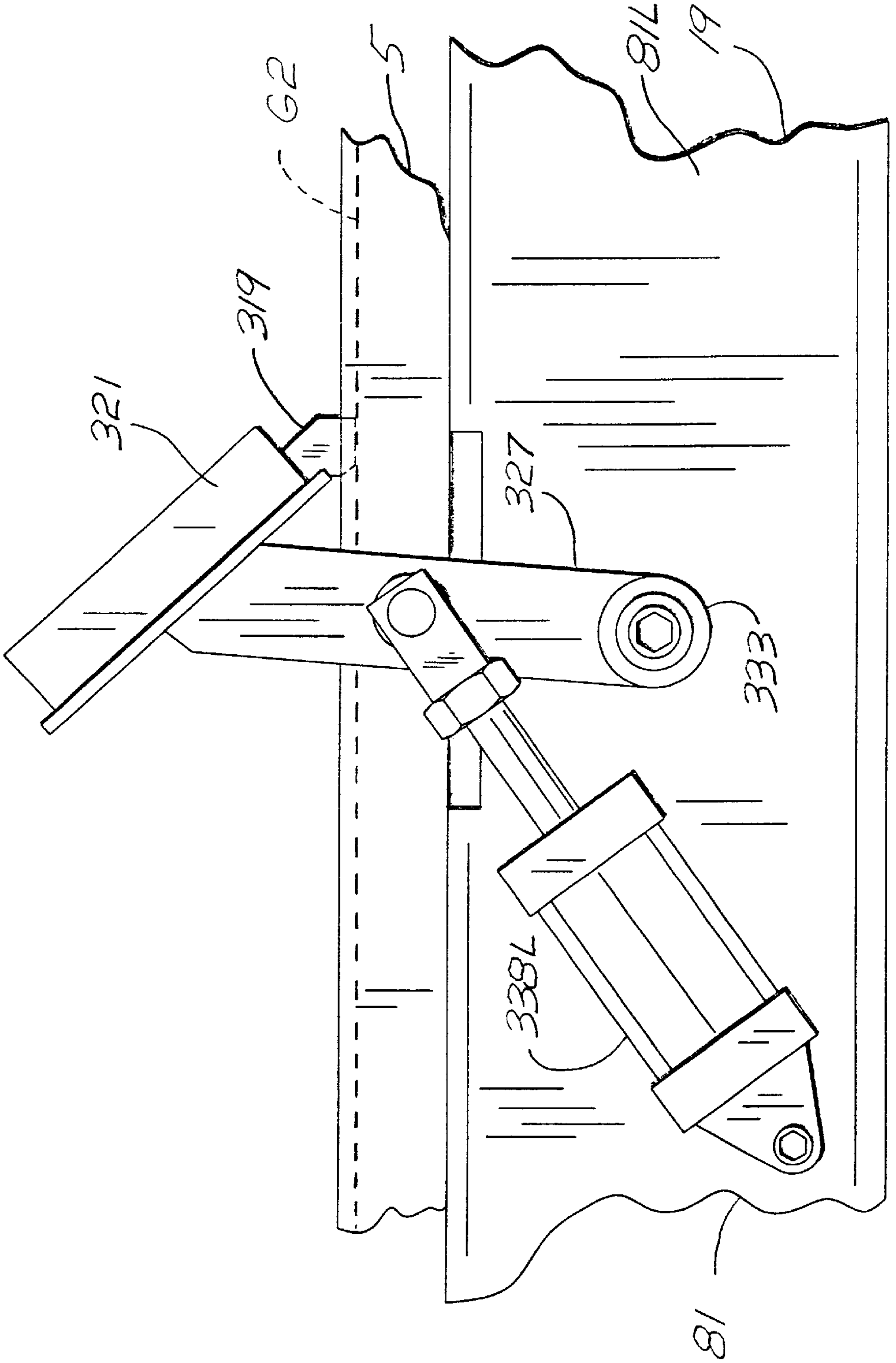
FIG. 20 is a fragmentary view in side elevation of an alternative embodiment of a drive for moving a glue applicator.

Alternately, as seen in FIG. 20, the arms 305, 327 are biased to their upward and downward positions, respectively, for the application of adhesive in the grooves G1, G2 by respective pneumatic cylinders 338T, 338L. For convenience, only the lower applicator is illustrated in FIG. 20, both applicators being of the same construction the lower applicator being inverted relative to the upper applicator. Extension and retraction of the cylinders 338T, 338L are controlled by solenoid valves 340T, 340L respectively (FIG. 38). The solenoid valves are controlled by signals from encoders EN1T, EN1L with one each being mounted on the upper and lower conveying runs 17, 19, and first engage the leading ends of the respective chords lengths 3, 5. When the leading ends of the chord lengths engage the limit switches LS14, LS15 mounted on the upper and lower chord conveying runs 17, 19 respectively, the respective encoder is zeroed and the PLC will know where the chords are and start and stop adhesive dispensing and operation of the cylinders 338T, 338L advancing and retracting the heads 301, 319 into and out of the respective grooves G1, G2 for dispensing of glue substantially only in the grooves.

The two adhesive applying heads 301 and 319 are adapted to be supplied with and to deliver liquid adhesive; for example, a mixture of resorcinol and slurry, into the grooves G1 and G2 in upper and lower chord lengths 3, 5 as they travel under beam 75 and over beam 81 by a dual metering pump system indicated at 336 such as a Model F/J-1008-5-28 Special two metering pump system for double end gluing sold by SRT Electronics of Puyallup, Washington. This system basically comprises two motor driven metering pumps diagrammatically illustrated at 337 and 339 in FIGS.

18 and 38, fed by gravity with the mixture to be delivered, the pumps pressurizing a reservoir (not shown). Valves 337V, 339V are each connected to the respective reservoir and the 345, 347 respectively and are operable under control of the encoders EN1T, EN1L to deliver the mixture at a selected (and digitally displayed) rate per minute via flexible lines 345 and 347 to the adhesive applying heads 301 and 319. The rate is related to the speed of the chord lengths for obtaining a generally uniform application of adhesive in the grooves G1 and G2 in the appropriate volume per running foot of the grooves for the ultimate adherence of a board 9 in the grooves. Flexible shielding 349 is attached to the lower end of the upper shielding and to the upper end of the lower shielding, completing the splash guarding function, and being flexible to permit the vertical adjustment as above described of beam 75. At 351 is indicated a purge waste funnel in the lower beam for funneling waste out through an opening 355 in the lower beam. As will be observed from FIG. 19, when groove G2 in the lower chord length 5 (in the course of its forward feed as shown by the direction arrow) reaches the guide 327 and the head 319, the guide and head ride up the trailing end of the groove, arm 323 swinging up against the bias of spring 329. A similar observation may be made as to the groove G1, the upper guide 309 and the upper head 301 except that the upper guide and head move downward. Delivery of adhesive is generally confined to delivery to the grooves G1 and G2, the valves 337V, 339V being started when the leading ends of the chord lengths reach the heads and being stopped as the ends of the grooves approach the guides. Operation of the applicators 297, 299 is controlled by the below described control system.

Having had adhesive applied in the grooves G1 and G2, the paired upper chord length 3 and lower chord length 5 enter the tapering conveyor section C3 (FIGS. 11 and 13) and are fed to the board applying station 21 for engagement with a board 9 which has been placed ahead of the arrival of said lengths in position in the vertical plane of conveyor C (more specifically in the vertical plane of conveyor section C3) for the lengths coming together with the upper and lower margins of the board received in the grooves G1 and G2 for becoming adhered in place between said lengths. The board transfer device 23 functions to transfer a board from supply 25, more particularly a stack of the boards, to said position which may be referred to as the chord-engageable position, and to hold it in said position for engagement by the oncoming pair of chord lengths, then to release the board for ensuing travel of the chord lengths with the board in place between them. The board transfer device 23, shown in FIGS. 14–17 as located on the right side (as viewed from exit end toward the infeed end of the conveyor) of section C3 of conveyor C, comprises two frames, each generally designated 357, standing on the floor alongside section C3, each frame comprising two posts each designated 358 vertically adjustable on legs 359 (see FIG. 14 ) having flat-plate feet. Each frame further comprises a beam 360 extending horizontally across the two posts thereof at the top. The frames are positioned in parallel relation in planes transverse to conveyor section C3, spaced apart a distance such as to accommodate an indexing unit 361 for the supply stack of boards 9. The boards, which are rectangular, lie horizontally flat one on top of another in the stack, with their long dimension generally parallel to the conveyor section C3. An elongate linear motion device such as a rodless type air cylinder 362 is mounted on the beams 360 and has a follower 363 movable in a path in a horizontal plane and generally normal to the beams 75, 81. The follower includes a board pusher 363A movable therewith. The bottom of the pusher is slightly above the bottom surface of the top board 9 in the stack. The cylinder 362 under control of a valve 362Vand pusher 363A are operable to move a top board 9 from the stack to a board pick up station. The pick up station includes a stop gate 364 secured to an arm 364A that is pivotally mounted to a beam 360. Air cylinder 364B is also mounted on the beam 360 via a bracket 364C. The cylinder 364B is connected to the arm 364A thru a linkage 364D to move the arm in a generally vertical plane between a down position (board stop and align position) and an up position (board release position). The cylinder 364B is under control of a valve 364V. The pick up station includes a pair of spaced board support rails 365 onto which boards 9 are moved by the pusher 363A for support awaiting pickup. A table 366 is carried by a pair of linear motion slides 366A for movement of the table toward and away from the lower chord conveying run 19. A drive such as an air cylinder 366B under control of a valve 366V is connected to the table and operable to move the table toward and away from the lower beam 81. A device is provided to pick up a board 9 from the rails 365, turn the board from a horizontal orientation to a vertical orientation and hold the board 9 in position until it is positioned in the chord grooves G1, G2 at which point the board is released to move forward with the chords. The device includes vacuum cups 367 mounted on a shaft 367A journalled in bearings 367B which are secured to the table 366 for movement therewith. An arm 367C is fixed to the shaft 367A and connected to an air cylinder 368 under control of a valve 368V. The cylinder 368 is mounted on the table 366 and is connected to the shaft 367A thru the arm 367C to rotate the shaft and thereby move the cups 367 between a board pick up position (facing upwardly) to a board release position (facing sideways). In the upwardly facing position, the board will lie in a generally horizontal plane and when facing sideways, the board will lie in a generally vertical plane for insertion into the vertically aligned grooves G1, G2. A rail 367D is mounted adjacent each vacuum cup 367 to engage a board 9 when the board is gripped by the vacuum cups to fix the board in place for carriage from the pick up position to the release position and to assist in retaining the board in the release position until it is inserted into the grooves G1, G2.

In operation of the pick up device, the vacuum cups 367 are facing upwardly during retraction of the table 366 and cups to the retracted (board pick up) position. A top board 9 is fed from the stack 25 by the pusher 363A to a position over the cups 367. The leading edge of the board 9 engages the stop 364 which will both stop the board and align its leading edge. Vacuum is then applied to the cups from a source (not shown) under control of a valve (not shown) controlled by a read switch in the cylinder 362 to fix the board to the cups and the rails 367D for transport. The stop 364 then moves up by activation of the cylinder 364B under control of a valve 364V. The operation of the valve 364V can be controlled by a vacuum pressure switch that sends a control signal indicating that the cups are sealed to the board 9. The shaft 367A is then rotated by the cylinder 368, under control of valve 368V, to move the board to its generally vertical position for pick up by the chords 3, 5. The table 366, under operation of the cylinder 366B controlled by a valve 366V (FIG. 38), then moves forward toward the conveyor section C3 until it is in alignment with the path of movement of the grooves G1, G2. Operation of the valve is controlled by a read switch 368S in the cylinder 368 that sends a signal indicating the cylinder is retracted and the board 9 is in its vertical position. The board will be held by the cups 367 until all the gate switches 499, 501 and 503

(hereafter described with reference to FIG. 21) and the read switch 368S provide signals that the leading chord ends and board end are vertically aligned as described below and that the board is vertical. When the signals are received, the vacuum in the cups will be released, releasing the board to travel with the chords 3, 5.

Figure 14A:
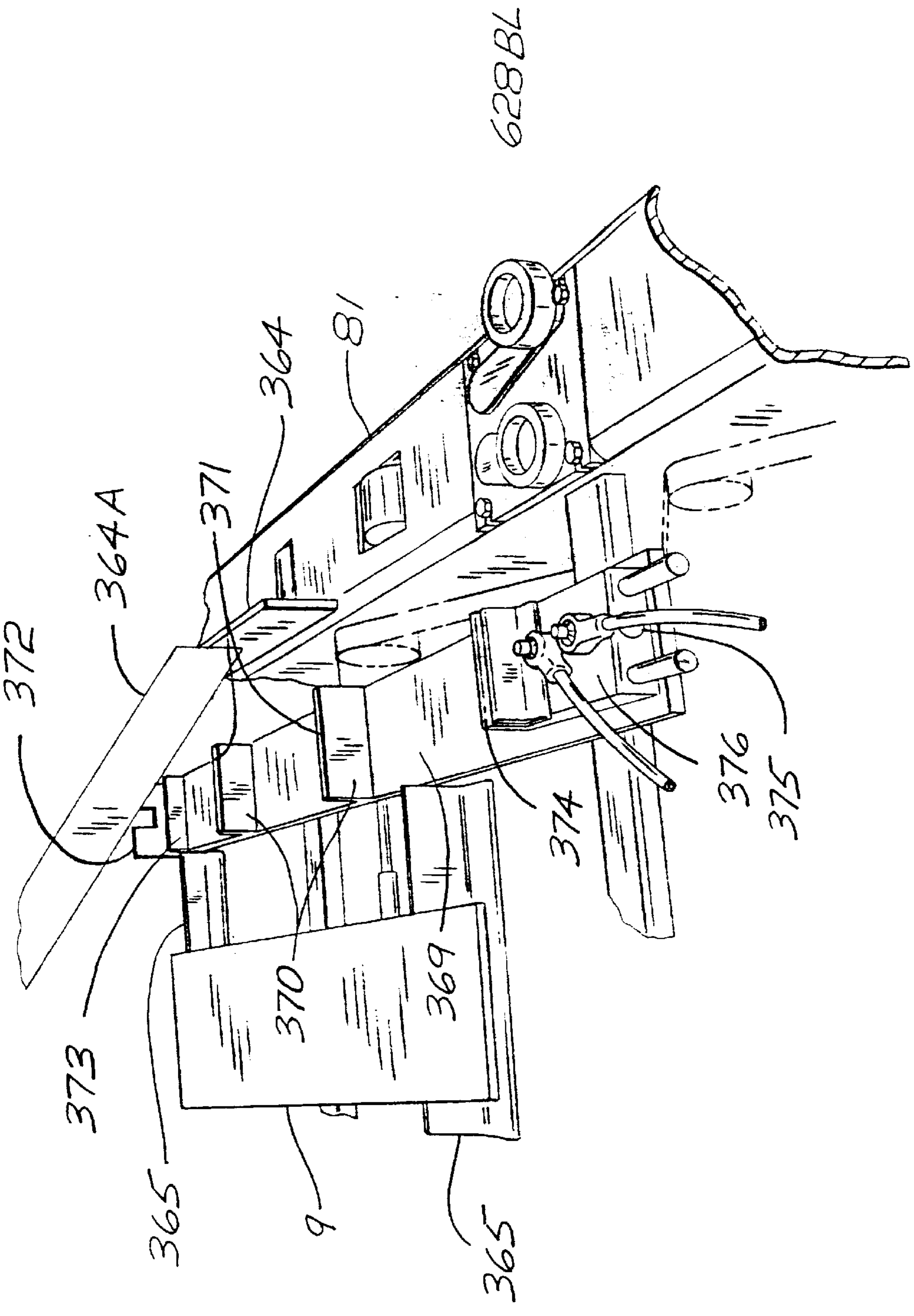
FIG. 14A is an enlarged perspective view of an alternative embodiment of a board holding device for use in the board feeding device shown in FIG. 14.
Figure 15:
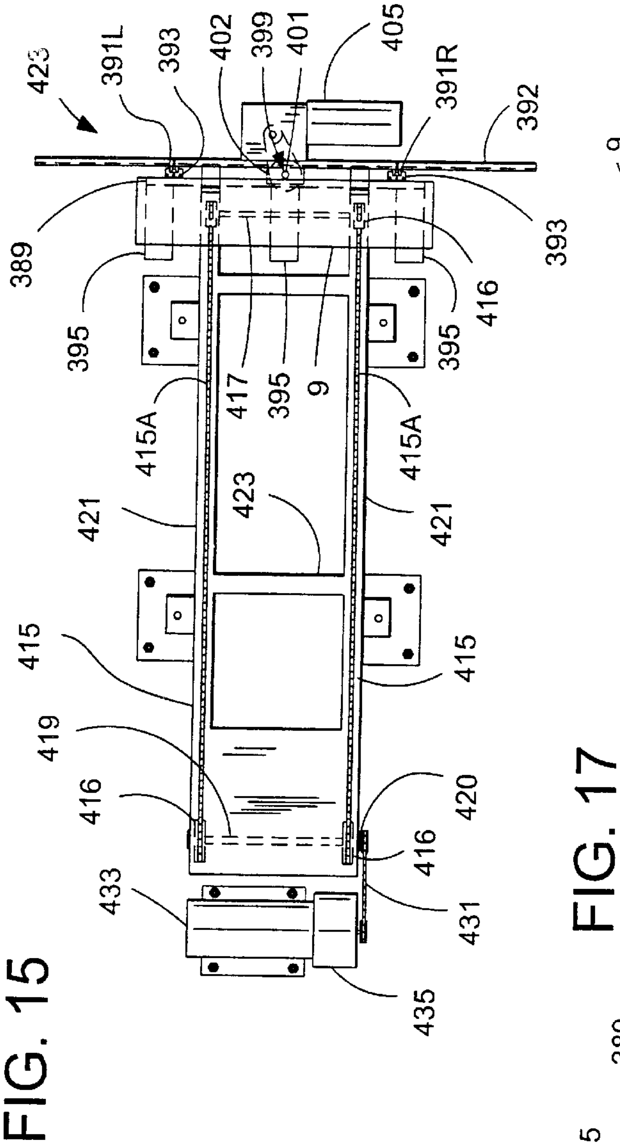
FIG. 15 is a plan view of a board feeder portion of the device of FIG. 14.
Figure 17:
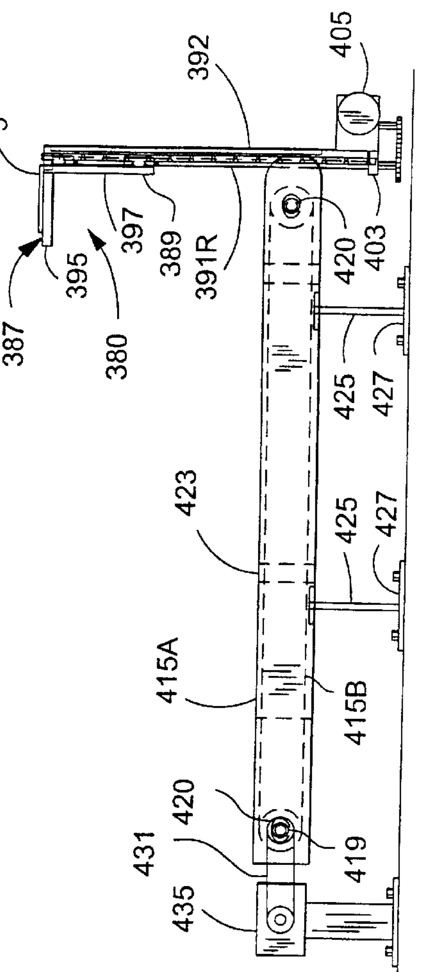
FIG. 17 is a view in side elevation of FIG. 15.
Figure 16:
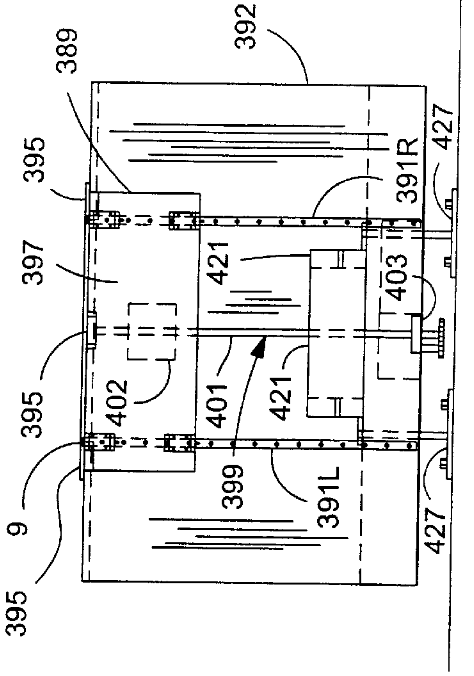
FIG. 16 is an end elevation view of the board feeder of FIG. 15.

An alternate device to the use of the vacuum cups to hold a board 9 is shown in FIG. 14A. The device includes a carrier plate 369 which is mounted for pivoting movement like the cups 367 The carrier 369 includes a pair of board rests 370 in spaced relation along its length for engaging and supporting a board 9 on the free ends 371. A stop 372 is secured to the downstream end 373 and has a height taller than the height of the rests 370. The stop 372 is selectively engageable with the leading end of a board 9. A movable stop 374 is secured at a trailing (upstream) end 375 and has a height taller than the height of the rests 370. The rests 370 are positioned between the stops 372, 374. The stop 374 is selectively movable by a linear motion device such as an air cylinder 375 under control of a valve 375V. The stop is secured to a slide 376 movably mounted on the carrier 369. The stop 374 is movable toward and away from the stop 372 to selectively clamp a board 9 therebetween for movement to a position between the chords 3, 5 for fastening thereto.

A board indexing unit, designated generally 380, is provided to incrementally move boards 9 upwardly for feeding by the pusher 363A to the board transfer device 23. The indexing unit comprises an elevator device 387 for holding the stack adjacent the opposite ends and at the middle thereof and lifting it in index increments corresponding to the thickness of a board 9. The elevator device 387 comprises a plate 389 mounted on rails 391L, 391R by followers 393 secured to the plate for reciprocal movement of the plate 389 in a generally vertical plane. A suitable rail is a THK rail model SR25W2SS+100L sold by THK Co., LTD, 1300 Landmeier Road, Elk Grove Village, Ill. The rails 391L, 391R are secured to a generally vertical support plate 392 that is secured to top and bottom cross rails 393 extending between and connected to the frames 357. Lift fingers 395 are secured to the plate 389 projecting laterally therefrom forming a board lift platform 397. The lift fingers 395 engage the bottom surface of the top board 9 of a stack 25. The indexing drive for the lift platform 397 comprises a power driven screw drive arrangement designated generally 399. The screw drive includes a screw 401 mounted for rotation on the plate 392 in bearings 403. The screw 401 can be an acme screw threaded along its length. The screw 401 is threaded in an internally threaded follower 402 secured to the plate 389 whereby rotation of the screw 401 will move the lift platform 397 up for feeding boards and down when a new stack 25 of boards 9 is needed. The screw 401 is driven by an electric motor 405 via a speed-reducing right angle gear box 407 through a chain a sprocket arrangement 409. A sensor, such as a limit switch 411 (FIG. 38), detects the presence or absence of a board at a predetermined elevation for feeding by the pusher 363A. When a board 9 is fed to a pickup position over the rails 365, the sensor, sensing the absence of a board at the predetermined elevation, signals motor 405 to drive the screw 401 to raise (index) the stack a distance corresponding to the thickness of one board. When the stack has indexed upward, the sensor detects the presence of the top board at the stated predetermined elevation and the motor 405 stops.

The stack feed conveyor 411 is a chain conveyor comprising a pair of chains each designated 415 trained around sprockets 416 on shafts 417, 419 journalled for rotation on low-lying horizontal axes in bearings 420 on horizontal hollow side rails 421 secured to frame 423 having adjustable legs 425 and flat-plate feet 427 resting on the floor. The chains 415 travel inside the rails 421, having upper horizontal reaches 415*a* and lower return reaches 415*b*. They are adapted to be driven in the direction for forward movement of the upper reaches toward the plate 392 by a chain and sprocket drive 431 for the rearward shaft 419 adapted to be driven by a motor 433 via a speed reducer 435. When the last board of the stack in the feed position on the fingers 395 is exhausted, a sensor 441 detects the exhaustion of that stack and provides a signal to energize motor 433 to drive the chains 415 for forward movement of their upper reaches 415*a* to bring a fresh stack to the lift platform 397, the motor being de-energized when the fresh stack reaches the lift platform.

Figure 21:
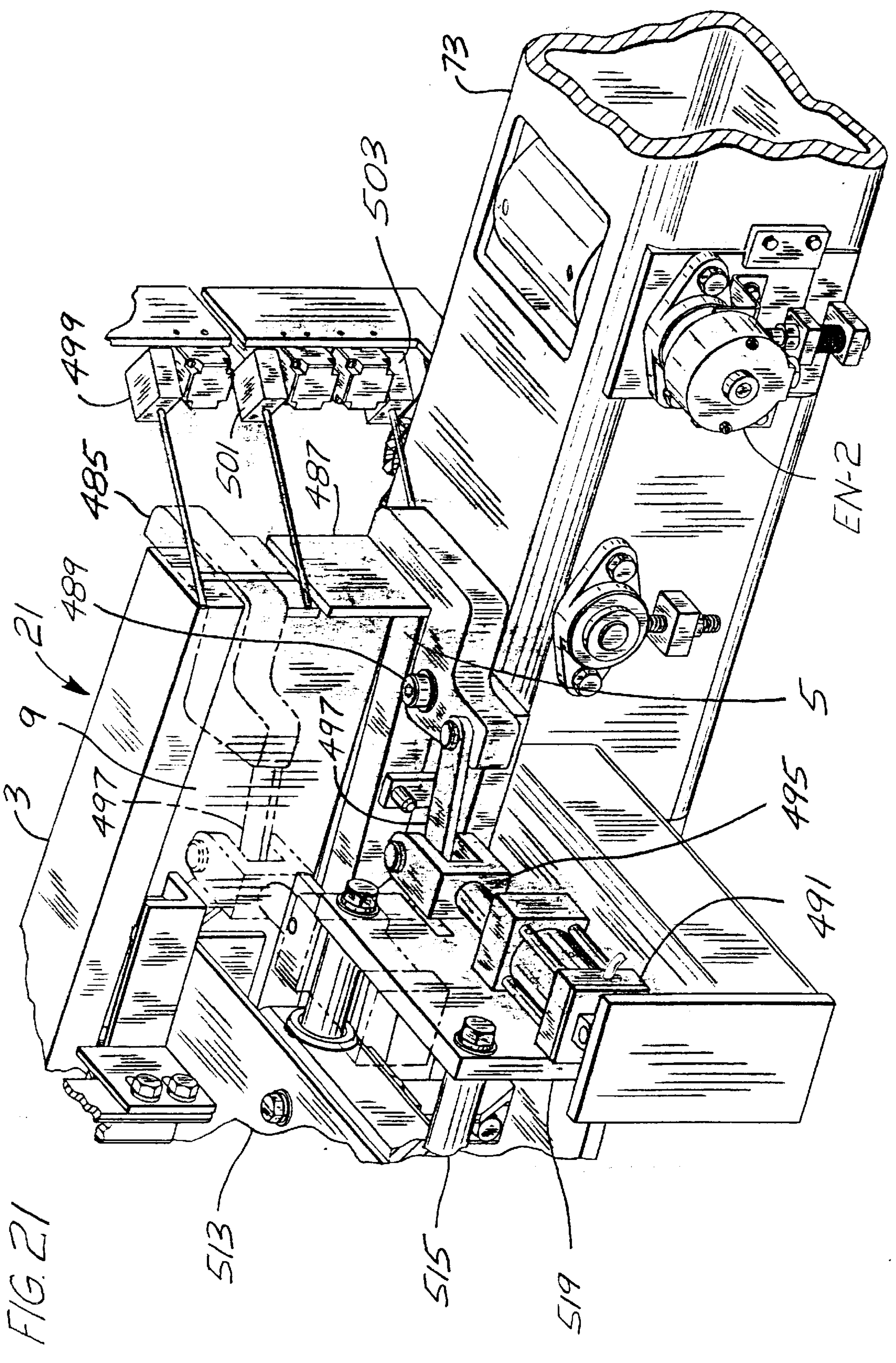
FIG. 21 is an enlarged fragmentary perspective view of a gate device used for vertically aligning the ends of chords and board inserted therebetween downstream of the glue applicators.
Figure 22:
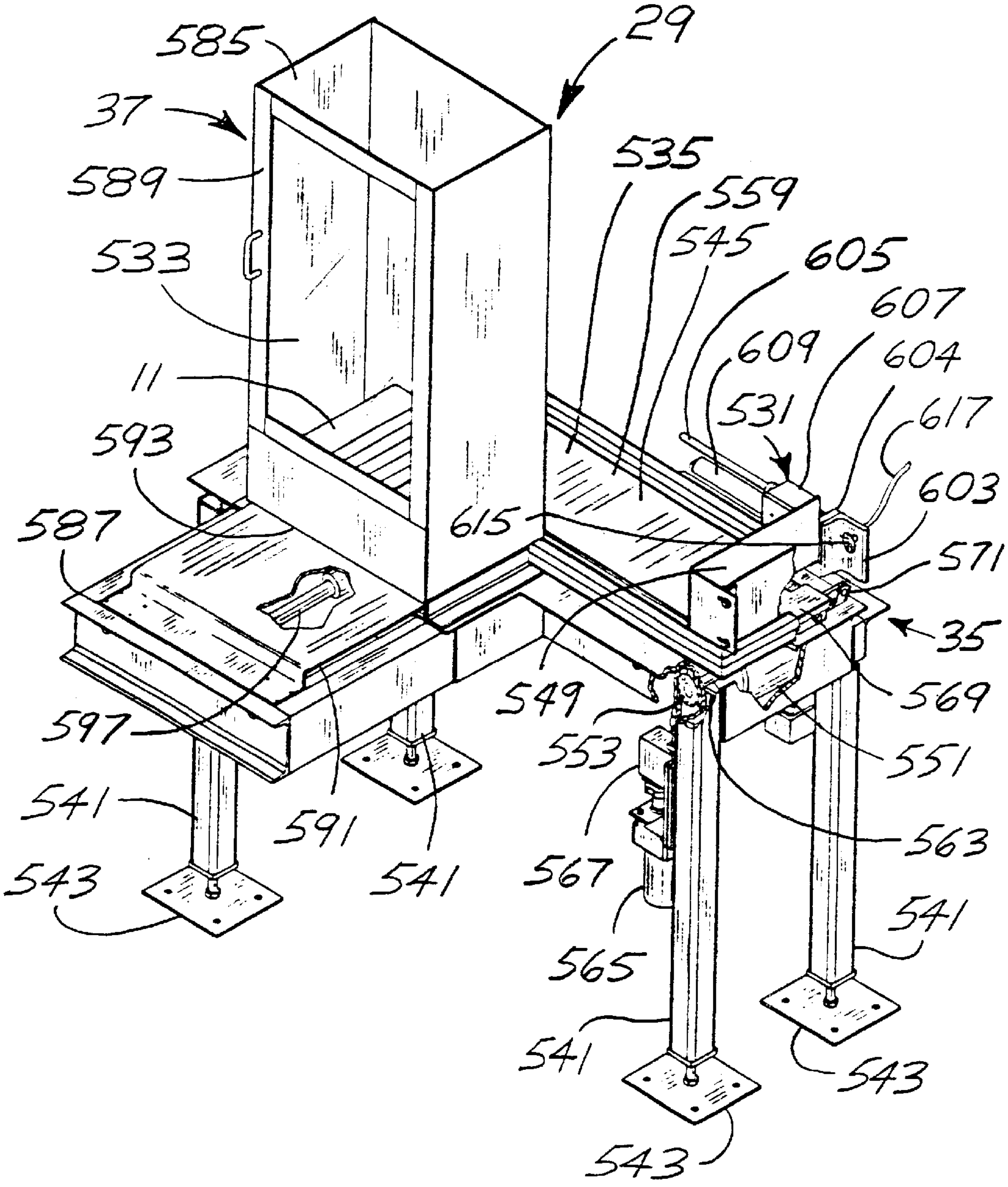
FIG. 22 is a perspective view of a device for inserting vertical web members between chords.

At the downstream (forward) end of the tapering conveyor section C3 (its narrow end), the apparatus has an upper gate 485 for engagement (when closed) by the leading end of an oncoming upper chord length 3, and a lower gate 487 for engagement (when closed) by the leading end of an oncoming lower chord length 5. Each gate is swingable as shown in FIG. 21 for the lower gate between open and closed positions on a vertical pivot 489 by an air cylinder 491 controlled by a valve 491V mounted alongside the respective box beam as indicated at 493 having its piston rod 495 toggle-connected as indicated at 497 to the gate 487. The downstream end of the board in the chord-engageable position (flat against backstops 486) is contiguous to the gates when they are closed, the arrangement being such that the gates keep the board 9 from being moved forward by the oncoming chord lengths 3, 5 and stop the chord lengths with the leading ends of the chord lengths aligned with the downstream end of the board. Three switches 499, 501 and 503 engageable by the leading ends of the above lengths and board are connected in a control circuit 505 (shown schematically in FIG. 38) with an indicator not shown such as an indicator lamp, for indicating alignment thereof. When all three switches are closed, indicating alignment, the lamp goes on.

Figure 11:
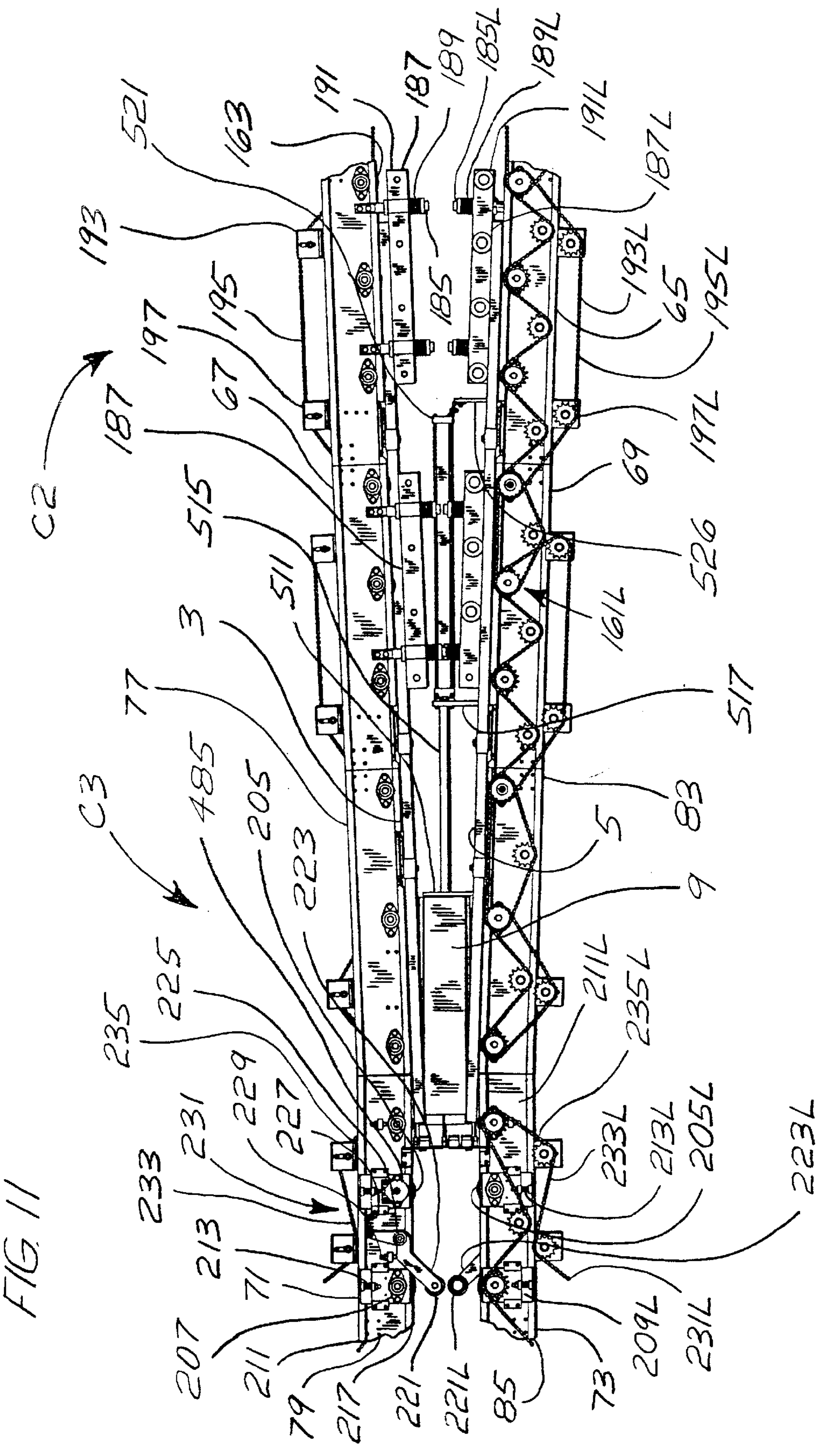
FIG. 11 is an enlarged elevation view of a board inserting station showing a board being inserted into the leading end of a pair of truss chords with the truss components moving from right to left in the figure.
Figure 12:
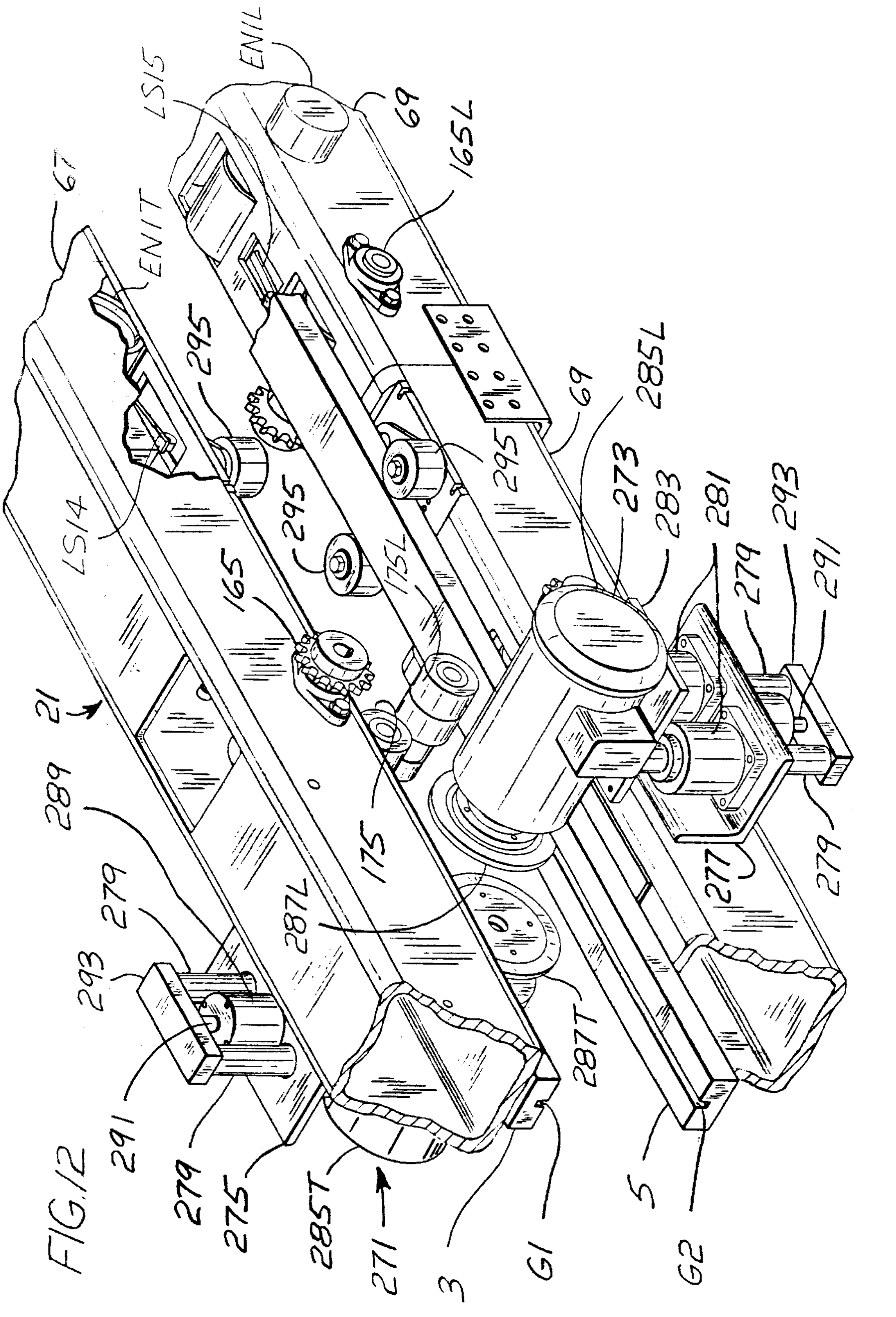
FIG. 12 is an enlarged perspective view of chord milling devices.
Figure 13:
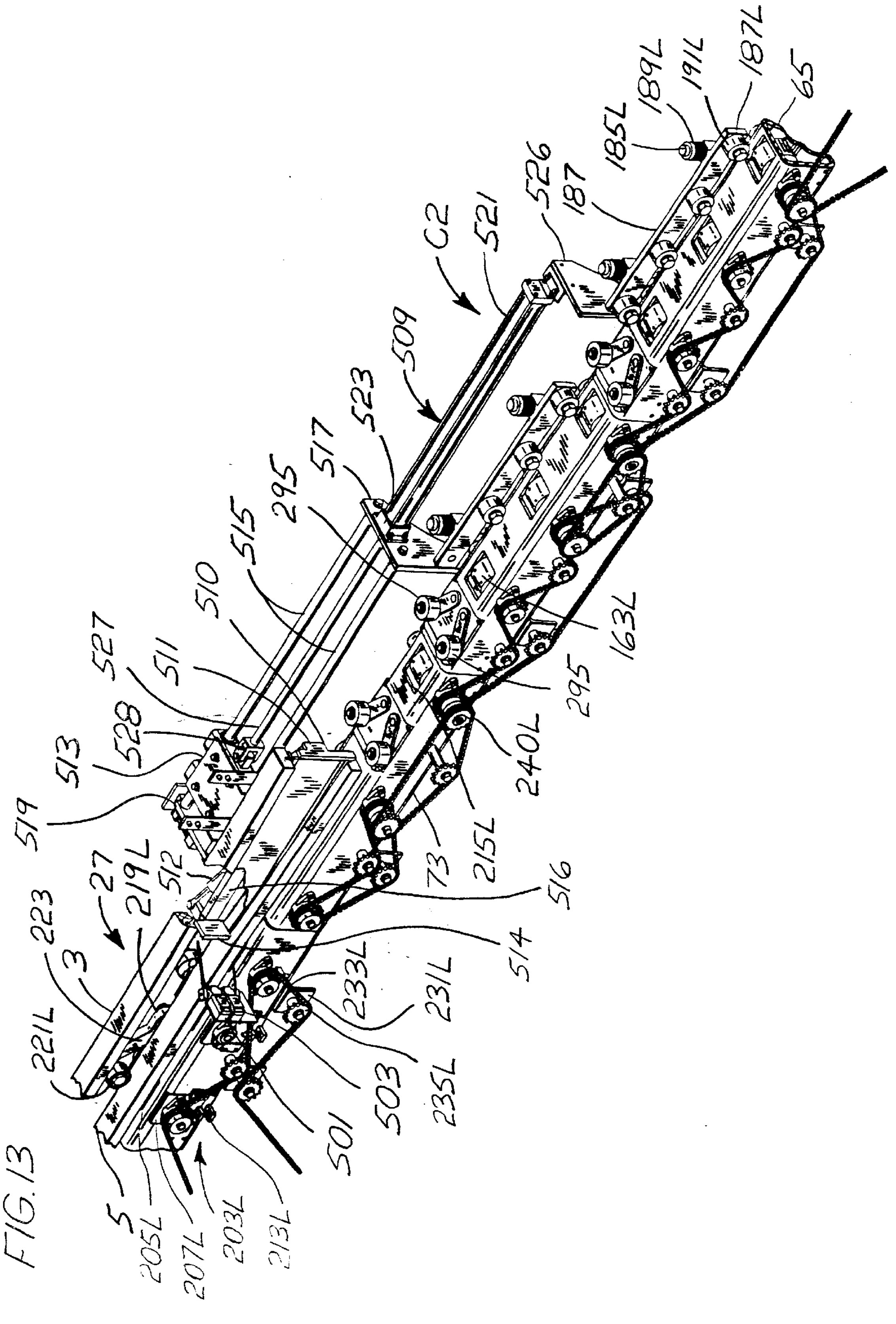
FIG. 13 is a perspective view of the board inserting station of FIG. 11 showing a board being inserted into the trailing end or a pair of truss chords.

Thus, and referring particularly to FIGS. 11 and 21, with the upper and lower gates closed, the path of the upper and lower chord lengths 3, 5 is blocked and forward movement of the board from the chord-engageable position is blocked. The chord lengths are fed forward in converging paths, each approaching the board at an angle (of about 2° for a total angle of convergence of about 4°). The groove G1 of the upper-chord length moves down and forward (in a downwardly slanting path) into mating relation with the upper edge of the board, and the groove G2 of the lower chord length moves up and forward (in an upwardly slanting path) into mating relation with the lower edge of the board. The tapered shape of the grooves and a tapered shape of the board edges if so provided, though not essential, facilitate entry of the board edges into the grooves and thus capture of the board in the grooves for the ultimate adhesion thereof by the adhesive in the grooves. The chord lengths 3, 5, moving forward after engaging the board, move the board forward into engagement with the gates 485 and 487, if the board is not already there, and the chord lengths then slide forward relative to the board until they engage the gates with resultant registration of the forward ends of the board lengths and the forward end of the board.

After the chords 3, 5 with the applied adhesive have fully engaged the edges of the board 9, a pair of pneumatic nailers 486 (one top and one bottom) can be activated to drive nails through the chords and into the board to help prevent relative movement until the glue sets. As seen schematically in FIG.

5, a pair of nailers 486 such as Model SFN-40 from Senco Products Inc. of Cincinnati. Ohio, are mounted adjacent the gates 485, 487 (preferably just down stream of the gates) and are operable, on command, to drive one or more nails into the top chord and one or more nails into the bottom chord for penetration into the board 9. A suitable nail size is a 15 gauge nail. Nails may be fed on a continuous strip fed to each nailer as is known. The nails may be driven during any pause in movement of the truss once the board is fully in the grooves of the chords.

The milling devices 271 and 273 may be used to mill grooves G3 and G4 (similar to grooves G1 and G2) in trailing end portions of chord lengths 3, 5, the adhesive applying systems 297 and 299 may be used to apply adhesive to the lengths in said trailing end grooves, and a board 9 secured in these trailing end grooves by means indicated generally at 509 on the other side of the conveyor C from the board transfer device 23. The chord lengths, having the trailing end grooves G3 and G4 with the adhesive therein, are brought to a stop with their trailing ends just forward of the forward end of a board placed in the transferred position (in the plane of grooves G3 and G4). A trailing end board 9 is fed to the means 509 by the board transfer device prior to its feeding a leading end board 9 and held in place by a clamp 510 which includes the member 511 and another end member 514 pivotally mounted on a support 516 operated for selective clamping by an air cylinder 512 (FIG. 38) which is activated by a proximity switch PRS 15 controlling a valve 512V and is released on signal from a read switch RS31 indicating the cylinder 521 has inserted the board. The board is then pushed forward into the grooves G3 and G4 by the member 511 (which may also be referred to as a hook) at the downstream end of a slide 513 slidable longitudinally with respect to conveyor C on the other side of the conveyor from the board transfer device 23 on rods 515 extending parallel to the conveyor between bracket plates 517 and 519 mounted on the lower box beam structure extending laterally therefrom. The slide 513 is movable on the rods 515 from a retracted rearward position to a forward position for pushing the board forward into the grooves G3 and G4 of the chord lengths 3, 5 and back to retracted position by an air cylinder 521 controlled by valve 521V (shown schematically in FIG. 38), the cylinder having its forward end mounted on the bracket 517 and its rearward end mounted on another bracket 526 mounted on the lower box beam structure, the piston rod 527 of the cylinder being connected to the slide as indicated at 528. The forward movement of the board 9 into the grooves is stopped by the engagement of the member 511 engaging one or more of the trailing ends of the chords 3, 5.

Having had the board 9 assembled therewith at their leading end, the pair of chord lengths 3, 5 with the board in place are then fed intermittently through conveyor section C4 (FIGS. 4 and 5) for the emplacement of the vertical web members 11 therein one at a time at station 29 and the fastening of said vertical web members in place one at a time at station 31.

The applicator 35 at station 29 for the vertical web members or struts 11 comprises means indicated generally at 529 for inserting the members or struts 11 in place between the upper and lower chord lengths 3, 5 and means indicated generally at 531 for conveying members 11 from a supply 533 thereof into position for being gripped by the insertion means 529 for ensuing insertion (FIGS. 22–28). The conveying means 531 comprises a table-top conveyor 535 comprising a table indicated in its entirety at 537 having an L-shaped top 539 on legs 541, each having a vertically adjustable foot plate 543 for table top height adjustment and a conveyor belt designated 545 for the conveyance of the members 11 over the top of the branch 547 of the L-shaped table to means 549 at one end of said branch 547 for upending the member 11 at said one end (i.e., turning it from a horizontal position to a vertical position) for pick-off by the inserting means 529. The table is set alongside conveyor section C4 adjacent its upstream end on the left side thereof with its branch 547 essentially at right angles to conveyor section C4 and with the end of that branch having the upending means 549 adjacent conveyor section C4. The belt 545 is trained around rollers 551 on a forward sprocket shaft 553 and a rearward roller (not shown), the shafts being suitably journalled at the sides of the branch 547 of the table, the belt 545 having an upper horizontal forward moving reach 559, and a lower return reach 563. The belt 545 is adapted to be driven in the direction for forward travel (travel toward the upending means 549) in an intermittent manner by a motor 565 and speed reducer 567 for driving shaft 553.

The conveying means 531 for members 11 is adapted to receive at the rearward end thereof (on the end of the branch 547 of the table away from conveyor section C4) a row of members 11 each being a short length of 2×4 lumber, (for example) for being moved forward to bring the first member 11 in the row to the upending means 549. The latter comprises a plate 569 which may be called the "pop-up plate", having a length and width corresponding to the length and width (the nominal 4" dimension, and more accurately the approximate 3½" dimension of 2×4s) pivoted at 571 for swinging movement on a horizontal axis generally parallel to the belt 545 at the right side of the branch 547 of the table 537 from a lowered position essentially flush with the table top to a generally vertical position extending up from the table top (see FIG. 24). A three-sided guide 573 is provided on the branch 547 of the table for guiding the member 11 being swung up to erect position by the pop-up plate 569, said guide being open-ended at the left side of branch 547 and having one long side 575 adjustable toward and away from the other as indicated at 577. An air cylinder 579 under control of a valve 579V (shown schematically in FIG. 38) has its piston rod 583 connected to the pop-up plate 569 for swinging it between its lowered and raised positions.

Figure 23:
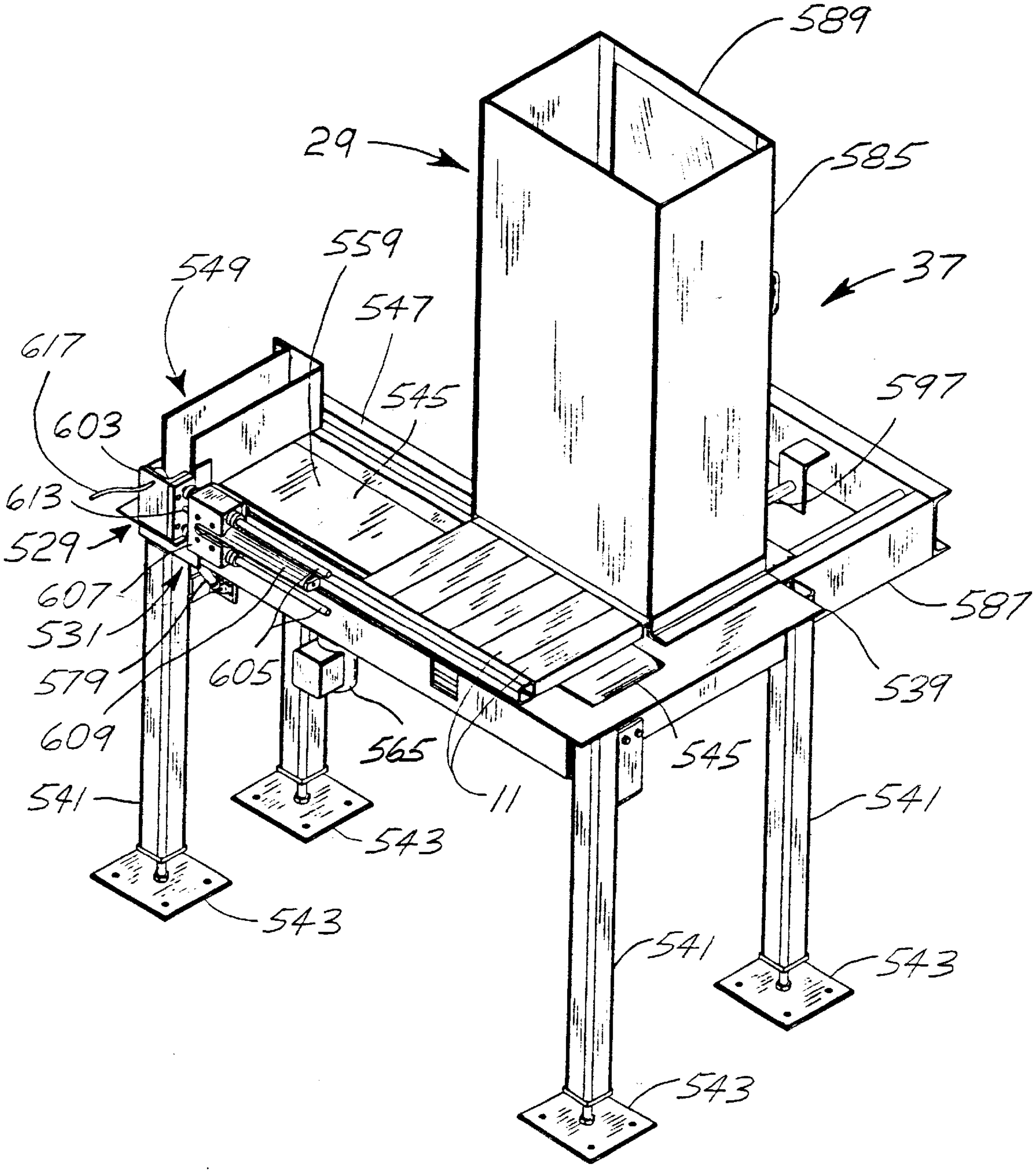
FIG. 23 is a perspective view of the device of FIG. 22 viewing it from the opposite side thereof.
Figure 24:
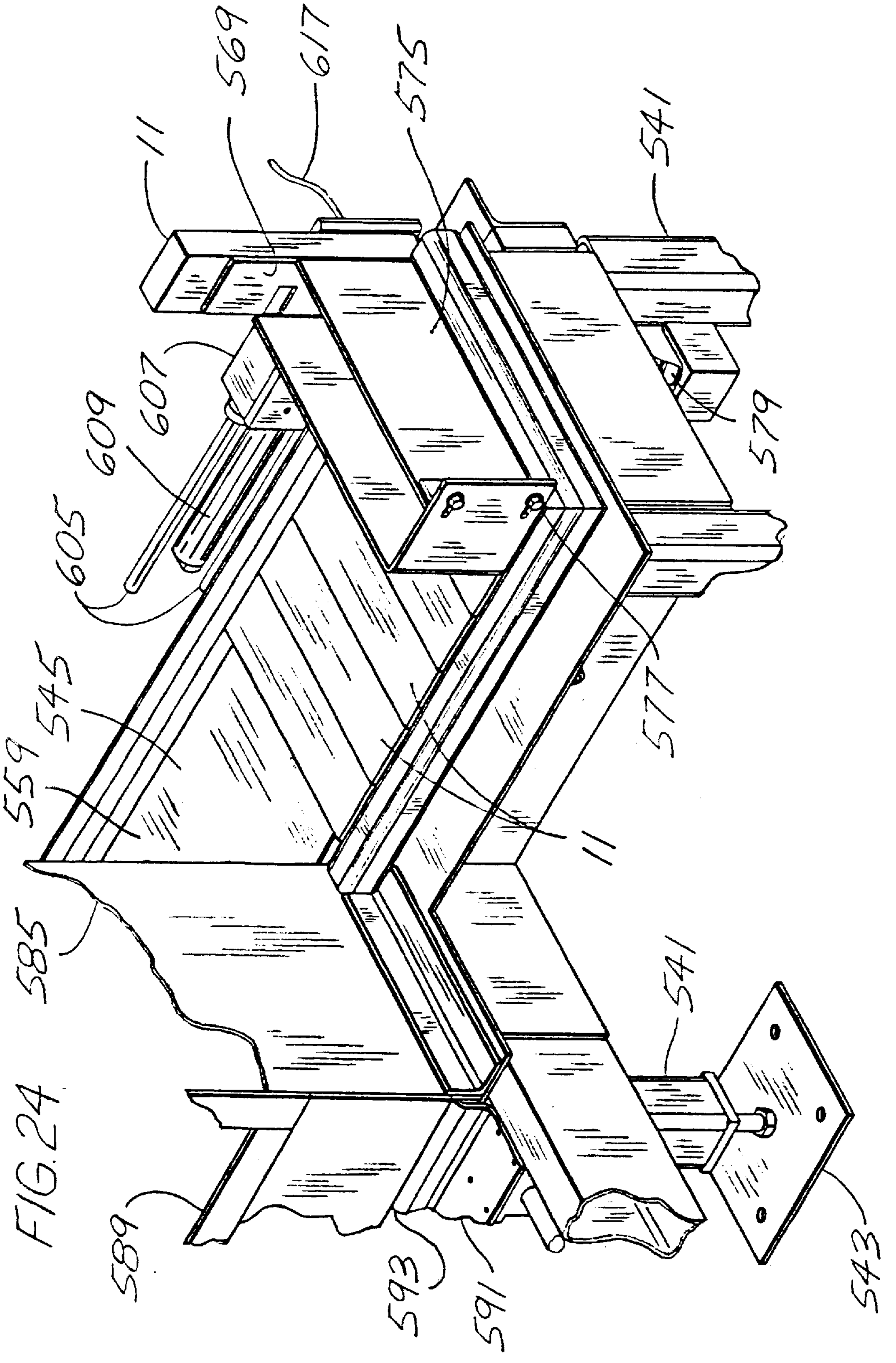
FIG. 24 is an enlarged fragmentary perspective view of the device of FIG. 22 showing a vertical web member in upended position.

As shown in FIGS. 23 and 24, the row of the vertical web members or struts 11 consists of several members 11, e.g. 6, lying more or less flat on the table top 539, each extending transversely with respect to the belt 545 in contact with its exposed upper reaches 559, with the broad sides (the nominal 4" sides) of the members 11 horizontal and the short sides thereof touching one another (in side-by-side relation). A row (of six members 11 as shown in FIG. 23 is fed on to the top of branch 547 of the table top 539 from the supply 533 of members 11, which comprises six stacks thereof loaded in a bin 585, the stacks and the bin standing on the branch 587 of the L on the right side of and adjacent the rearward end of the branch 547. The members 11 in each stack are horizontal, extending transversely with respect to the conveying means 531 (transversely with respect to the branch 547) stacked up on their broad sides. The bin has a door 589 for access for loading the stacks therein. A pusher plate 591 slidable on the branch 587 through an opening 593 at the door side of the bin (below the door) is adapted to push the six bottom members 11 of the six stacks onto the branch 547 of the table at the rearward (trailing) end of the conveyor means 531 via an opening 595 at the bottom of the opposite side of the bin, thus delivering the row of six members 11 for conveyance toward the upending means 549 by the belt 545.

An air cylinder 597 under control of a valve 597V (shown schematically in FIG. 38) mounted on the table has its piston rod 601 connected to the pusher plate 591 for reciprocating it.

Figure 25:
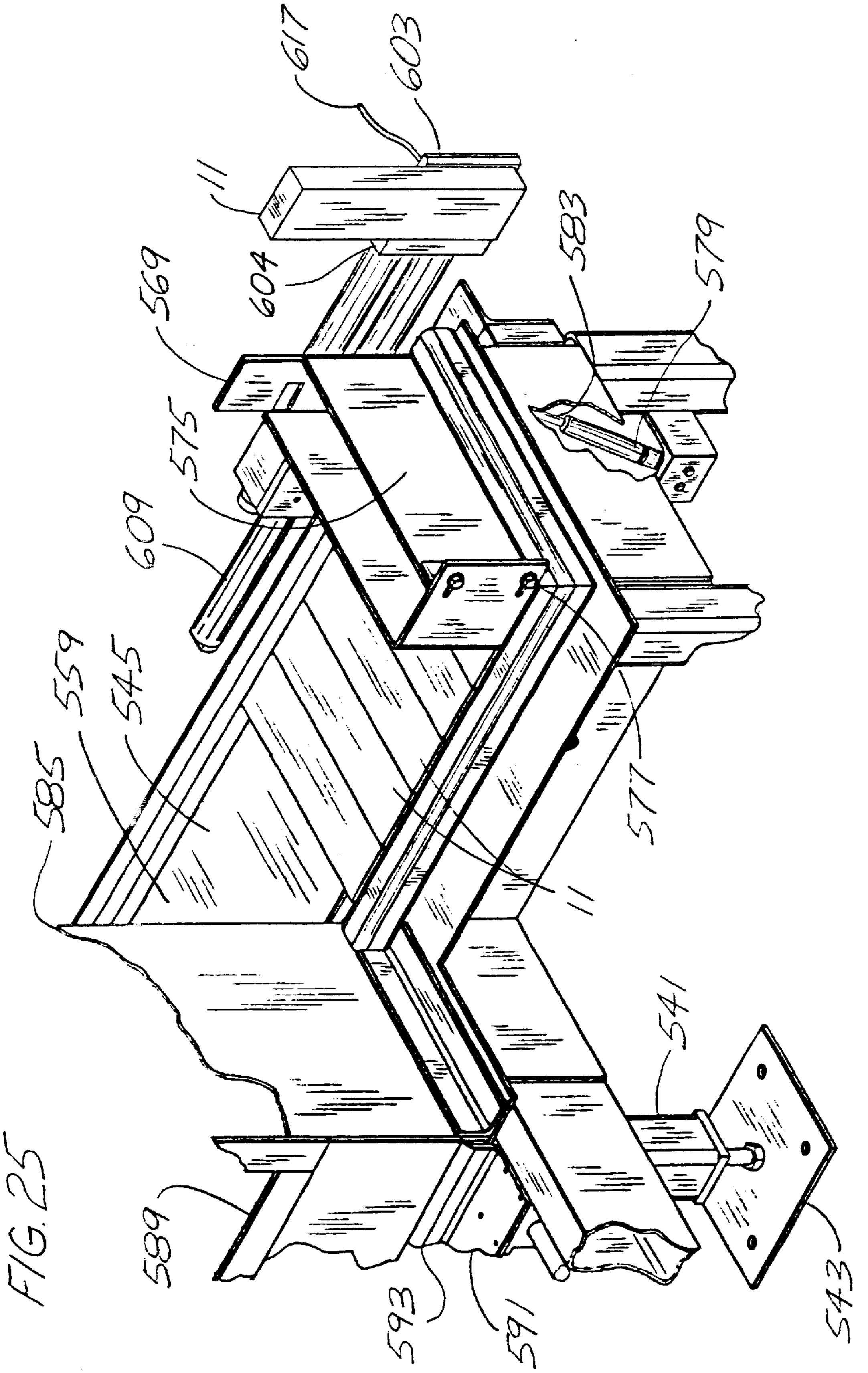
FIG. 25 is similar to FIG. 24 showing the vertical web member in an extended position for insertion between a pair of chords.
Figure 26:
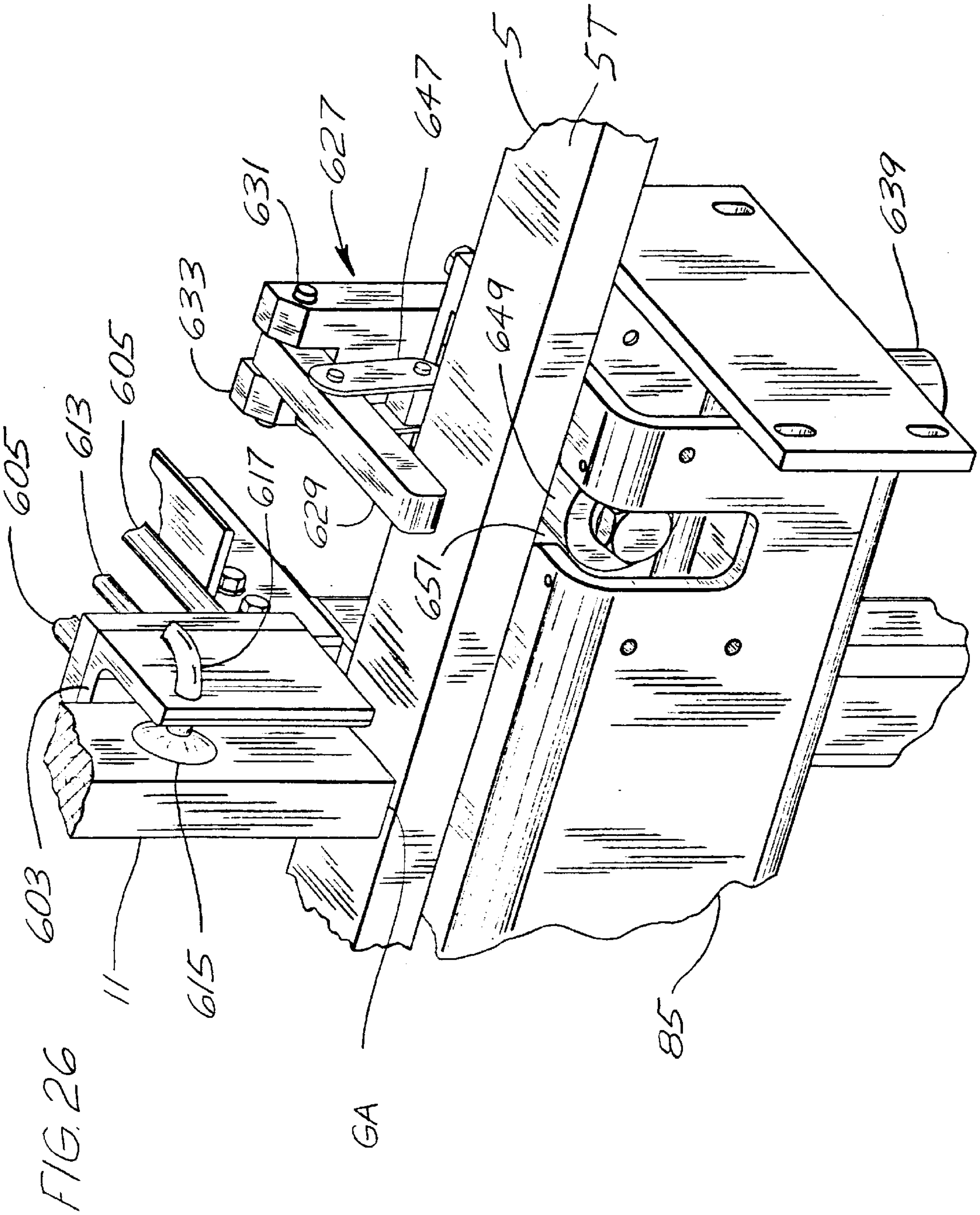
FIG. 26 is an enlarged fragmentary perspective view of a device for deflecting chords at the vertical web member insertion station to permit the application of the web members, the device is shown with the chord deflected and a web member positioned for insertion.
Figure 27:
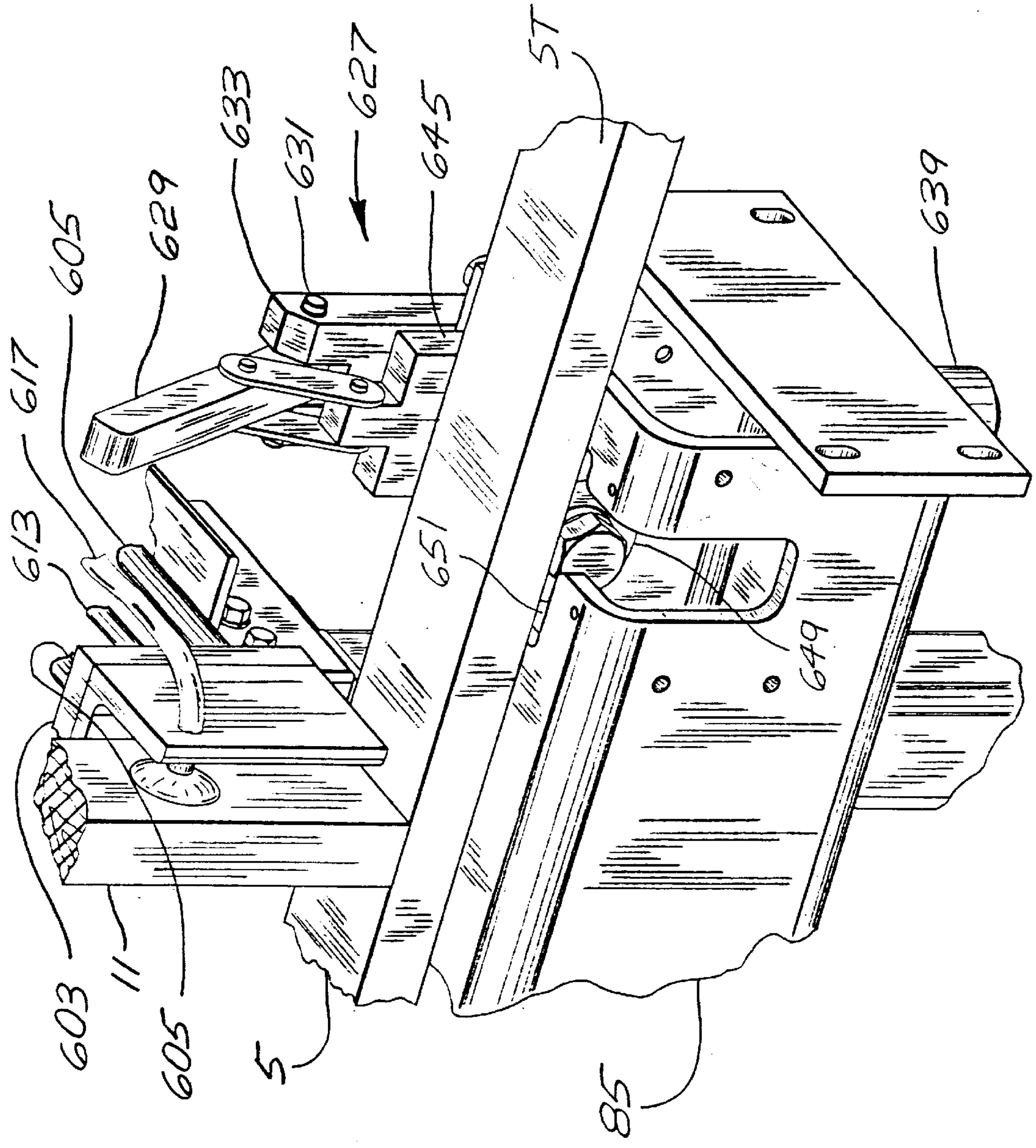
FIG. 27 is a figure similar to FIG. 26 showing the chord not deflected and the web member in engagement with the chord.

The inserting means 529 functions to grip the member 11 which has been upended ("popped up") to vertical position by the upending means 549 and move it to a vertical position between the upper and lower chord lengths 3, 5, the latter being spread apart for the insertion as will be subsequently described (FIGS. 25–27). The inserting means comprises a carriage 603 slidable longitudinally with respect to the branch 547 of the table and toward and away from conveyor section C4 on rods 605 extending generally parallel to the long branch of the table on its left side mounted thereon as indicated at 607 and adapted for reciprocation by an air cylinder 609 under control of a valve 609V and having its piston rod 613 connected thereto. Mounted on the carriage 603 is a vacuum gripper 615 (suction cups) for vacuum-gripping a vertical wooden member 11 popped up to vertical position by the pop-up plate 569. The cylinder 609 is also under control of a vacuum switch VS1 that provides a signal that the gripper is holding a member 11. The carriage 603 is reciprocal by cylinder 609 between the retracted or rearward position with the gripper 615 positioned for engagement by member 11 as it is swung up by the pop-up plate 569, and the advanced or forward position (shown in FIGS. 25–27) wherein the thus-gripped member 11 is in inserted position between the upper and lower chord lengths 3, 5. A flexible vacuum line 617 connects the gripper to the aforesaid source of vacuum under control of a valve 619 (shown schematically in FIG. 38). It will be noted that the member 11 is inserted with its broad sides (the nominal 4" sides) crosswise of the chord lengths 3, 5 (and aligned therewith).

In further detail as to the operation of the conveying means 531, the pop-up plate 569, the carriage 603 with the vacuum gripper 615 and the pusher plate 591, the motor 565 is operable to drive the belt 545 to feed forward the row of six members 11 pushed out from the bin 585 by the pusher plate 591 onto the branch 547 of the table to the point where the first (leading) member 11 of the six comes over the pop-up plate 569 (down at this time). The motor stops and the cylinder 579 is actuated to swing up the pop-up plate to upend the member 11 (FIG. 25). With the carriage 603 starting movement from its retracted position (FIG. 20) a time delay (as controlled by the PLC) is provided before the vacuum for its gripper 615 is on to allow the member 11 to be engaged by the flange 604 to insure accurate positioning of the member 11. The vacuum is then applied and the swung-up member 11 is gripped for movement with the carriage, which is then moved forward by cylinder 609 for the insertion of member 11. The latter moves forward in a vertical plane P1 transverse to conveyor section C4. The vacuum grip is cut off and the carriage 603 retracted. The pop-up plate 569 is returned to its down (horizontal) position and the motor 565 is activated to feed the remainder of the row of members 11 forward to place what was the second member 11 of the row and which is now the leading member of the row onto the pop-up plate 569 for the ultimate insertion thereof. When all six members 11 of a row have been inserted as detected by a sensor 621 (shown schematically in FIG. 38), such as a limit switch, the sensor acts via circuitry to operate valve 597V to cause cylinder 597 to operate the pusher plate 591 to deliver a fresh row of six members 11.

Figure 28:
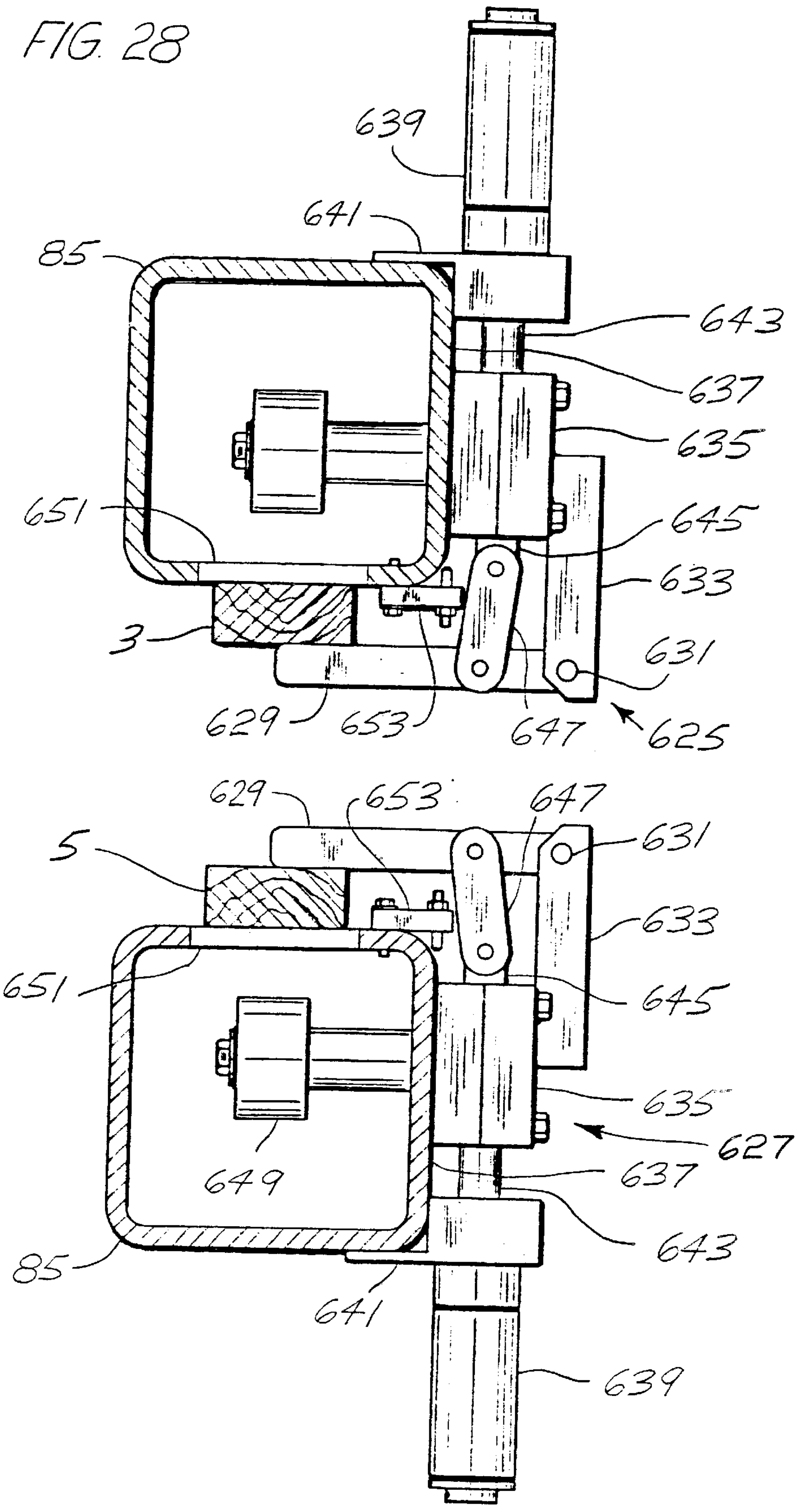
FIG. 28 is an end sectional view of the device of FIG. 26 showing the device in position to deflect a chord.

For insertion of members 11, upper and lower chords 3, 5 in conveyor section C4 are spread apart (i.e., the upper chord length is moved up and the lower chord length is moved down) as permitted by the movable spring-backed rollers 205, 205L in conveyor section C4, by means of upper and lower spreading devices 625 and 627 (FIGS. 26–28). These function to deflect the upper chord up about ¼ inch from its nominal elevation and to deflect the lower chord down about ¼ inch from its nominal elevation, thus attaining ample clearance for the insertion of the member 11. As the upper chord 3 is deflected upward, it moves the upper rollers 205 upward against the downward bias of springs 213 and as the lower chord 5 is deflected downward, it moves the lower rollers 205L downward against the upward bias of springs 213L. The upper and lower spreading devices 625 and 627 are essentially identical, but in reversed or inverted relation. Referring to FIGS. 26–28, the lower spreader 627 is shown to comprise a deflection finger 629 pivoted at 631 for swinging movement on a horizontal axis generally parallel to conveyor section C4 in a fork 633 extending up from a slide guide 635 attached as indicated at 637 to the box beam 85. An air cylinder 639 mounted on a bracket 641 on the box beam 85 in conveyor section C4 has its piston rod 643 connected to a slide 645 in extension thereof, vertically slidable in the slide guide 635. A pair of links 647 connects the slide and the finger, the arrangement being such that with the piston rod 643 and slide 645 in an extended raised position, the finger (of the lower spreader) occupies a raised position clear of the lower chord 5 shown in FIG. 27. On operation of cylinder 639 to retract the piston rod 643 and slide 645, the finger 629 swings down on top of the lower chord 5 in conveyor section C4 and deflects the lower chord down (e.g., ¼ inch) onto the top of the box beam 85 as shown in FIGS. 26–28. The slide 645 carries a roller 649 which, via a slot 651 in the top of the beam, supports the lower chord 5 when the slide is in raised position. The roller moves down to the retracted position shown in FIG. 28 when the slide moves down. A height adjustment 653 mounted on top of the box beam limits the upward movement of the roller and determines its raised position. The upper spreader 625 is identical, being installed on the upper box beam 79 above the lower spreader in reverse relation so that its finger 629 swings up (instead of down) to deflect the upper chord up (e.g., ¼ inch) against the bottom of the upper box beam 79. The air cylinders 639 of the lower and upper spreaders are connected in a pneumatic circuit under control of a valve 639V.

Upon insertion of a member 11, cylinders 639 are operated for retraction of the fingers 629 of the upper and lower spreaders 625 and 627 permitting the upper chord 3 to be sprung back down against the upper end of the inserted member 11 and the lower chord 5 to be sprung back up against the lower end of the inserted member 11, thereby holding it in its place in the truss being fabricated (see FIG. 27). With member 11 thus gripped in place between the upper and lower chords 3 and 5, the assembly comprising the chords, board 9 between the chords and the gripped-in-place member 11 is fed forward the short distance needed to bring the member 9 to the fastening station 31 for the fastening of member 11 to the chords by the fastening device 39, which functions to drive fasteners 13, of which there are four for each member 11, two on each side at top and bottom, into the sides of the chords and the sides of member 11.

Figure 36:
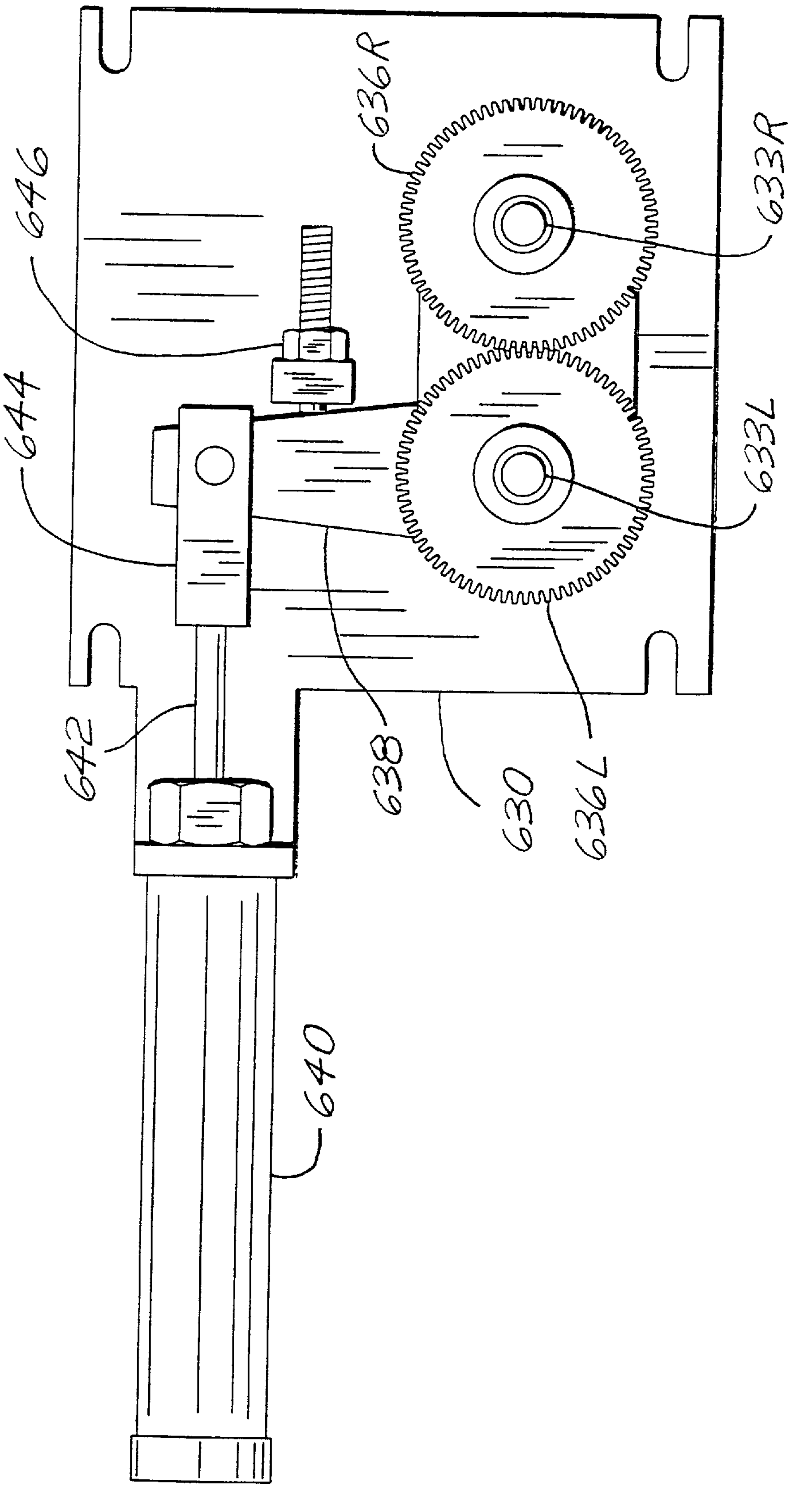
FIG. 36 is a bottom plan view of a device used at various locations along the conveyor to positively center the chords at various truss assembly stations.
Figure 37:
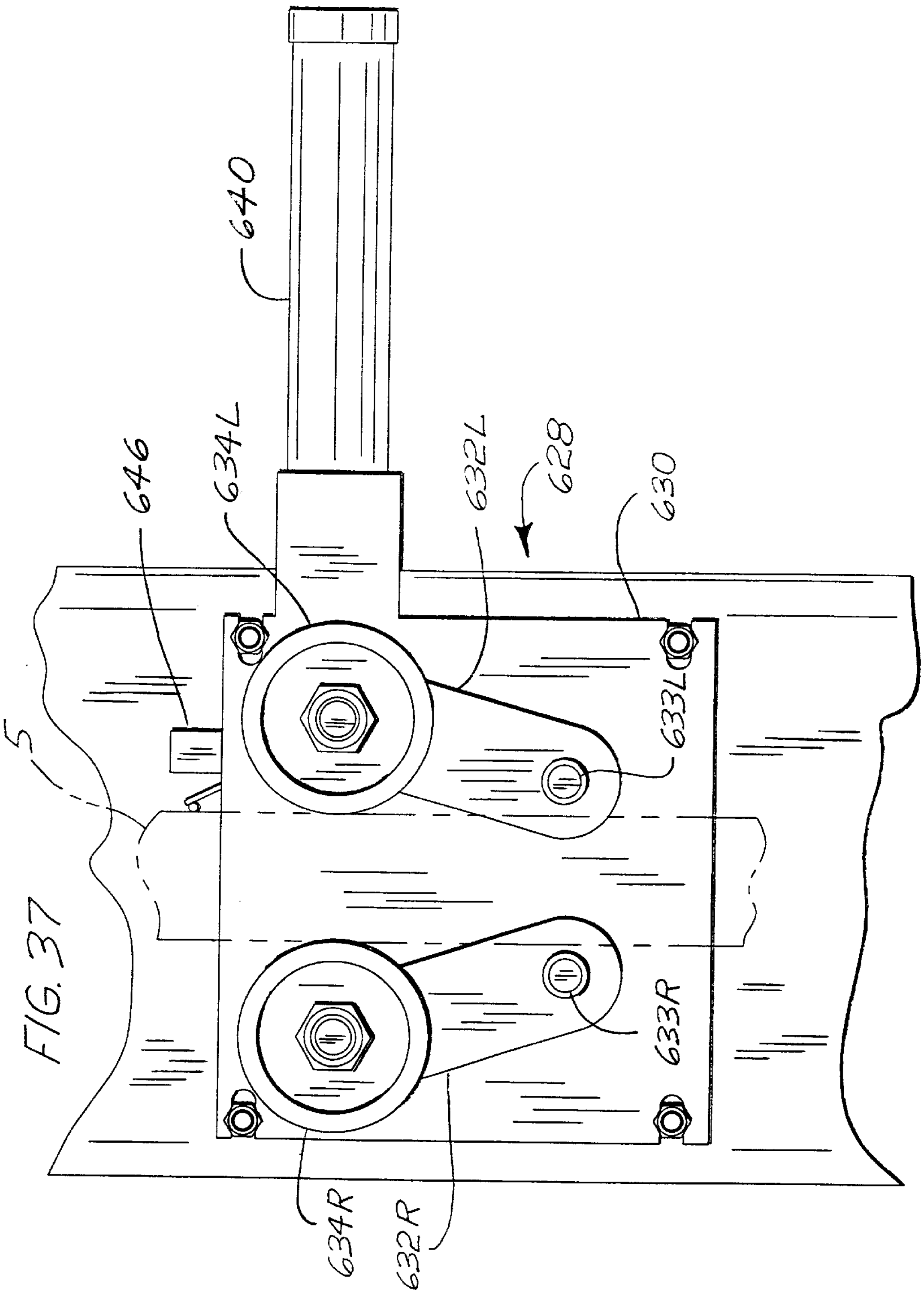
FIG. 37 is a top plan view of the device of FIG. 36.
Figure 38A:
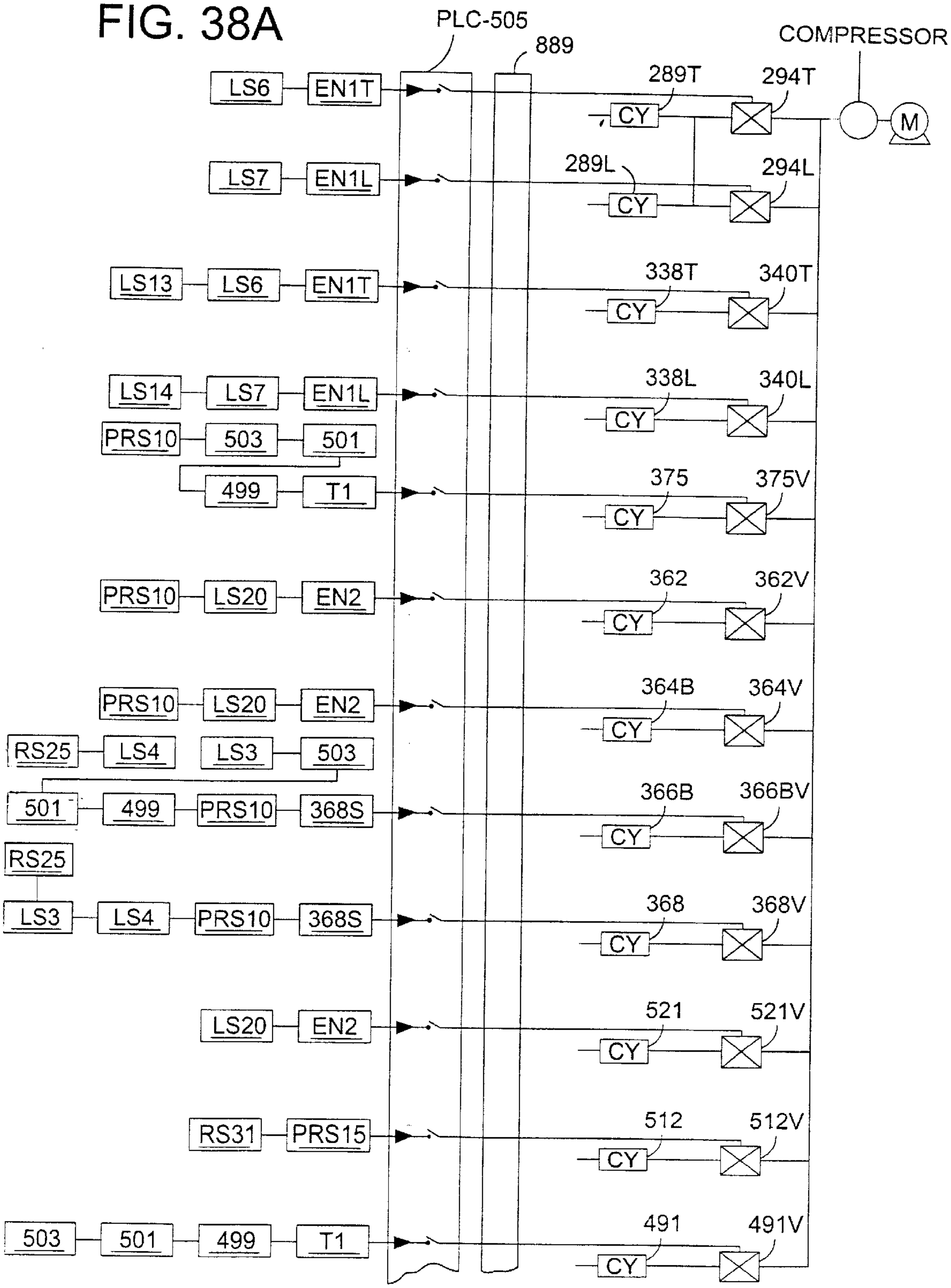
FIG. 38 is a schematic illustration of a control system for the apparatus and includes Figures denoted 38A–G.
Figure 38B:
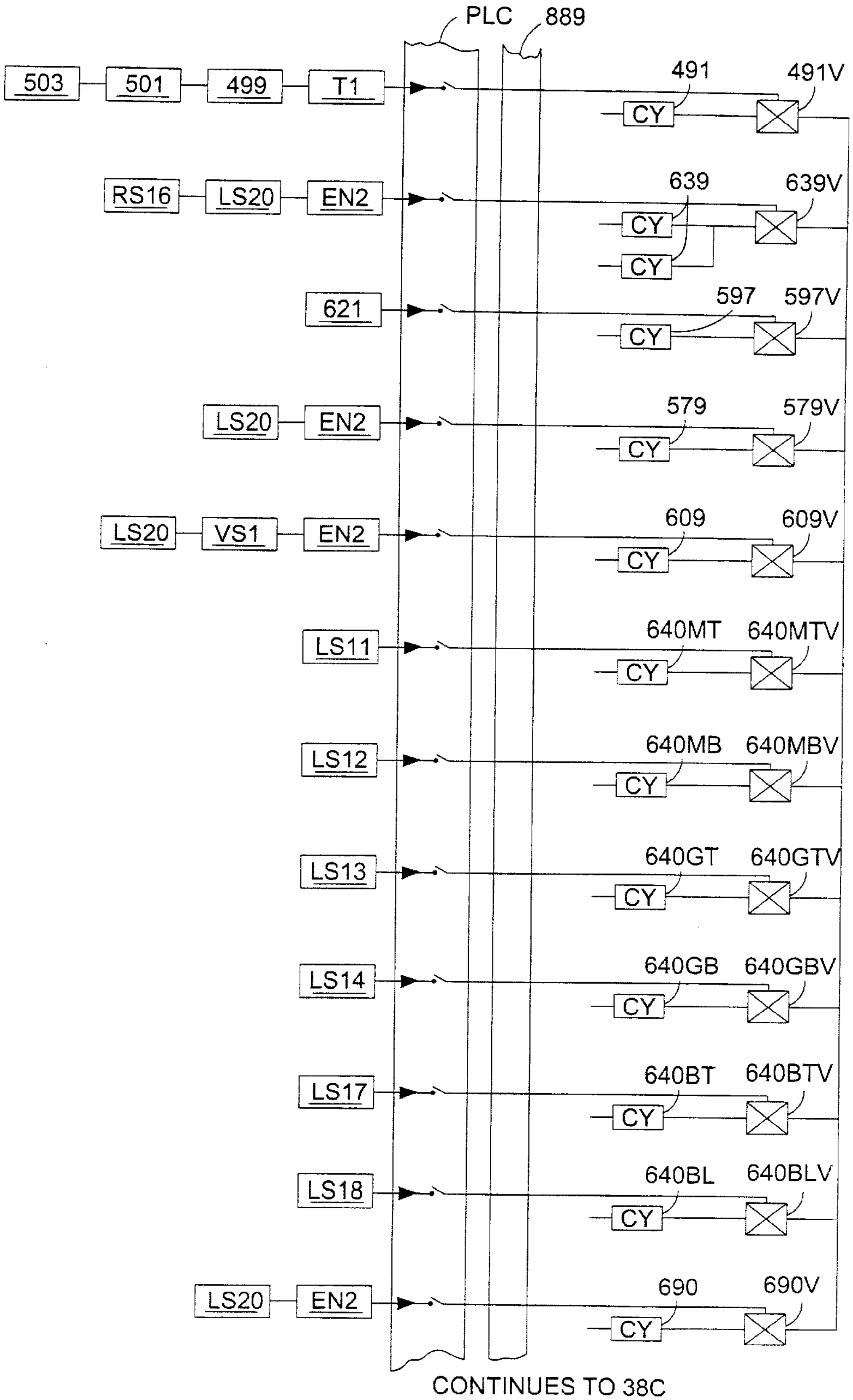
Figure 38C:
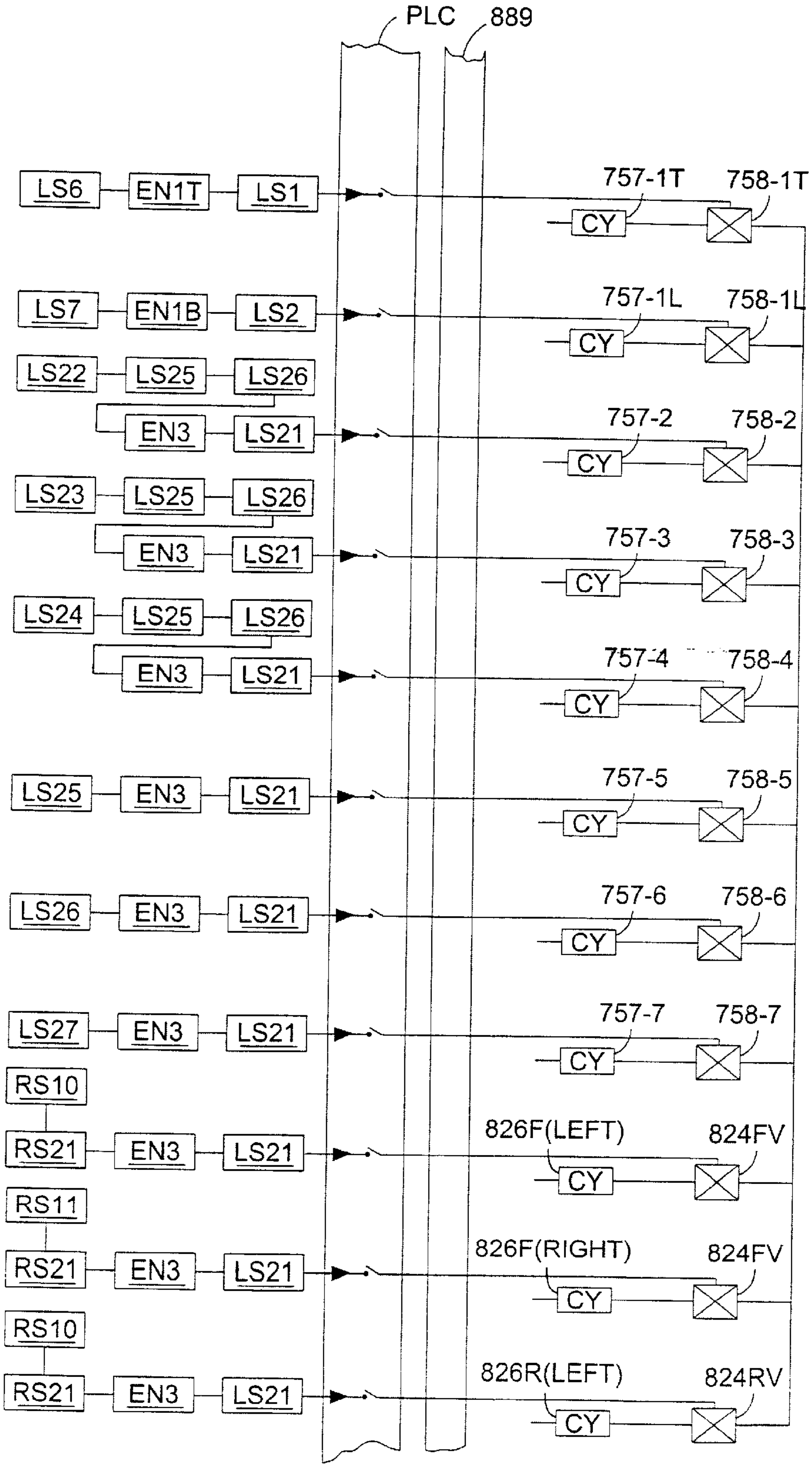
Figure 38D:
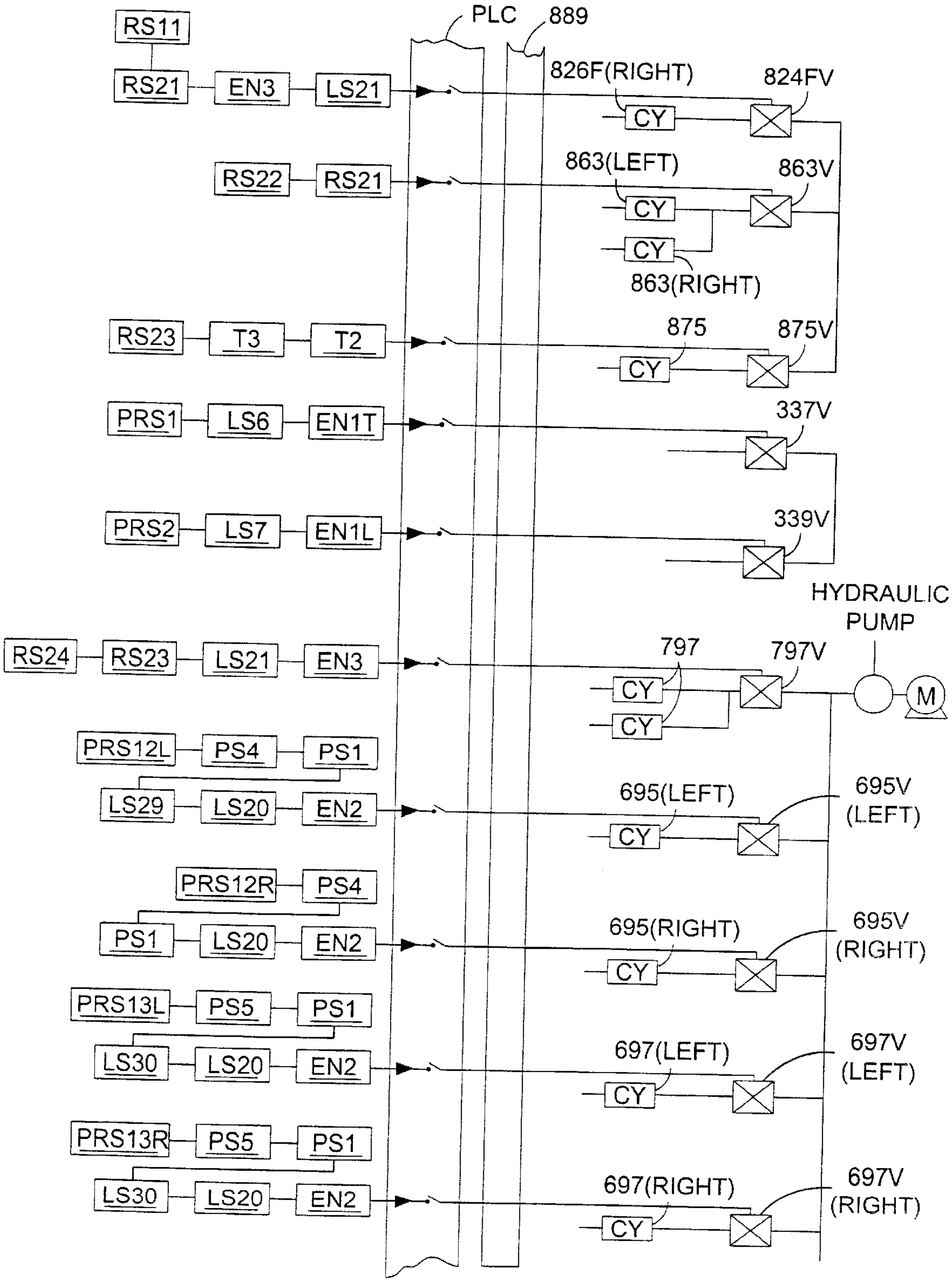
Figure 38E:
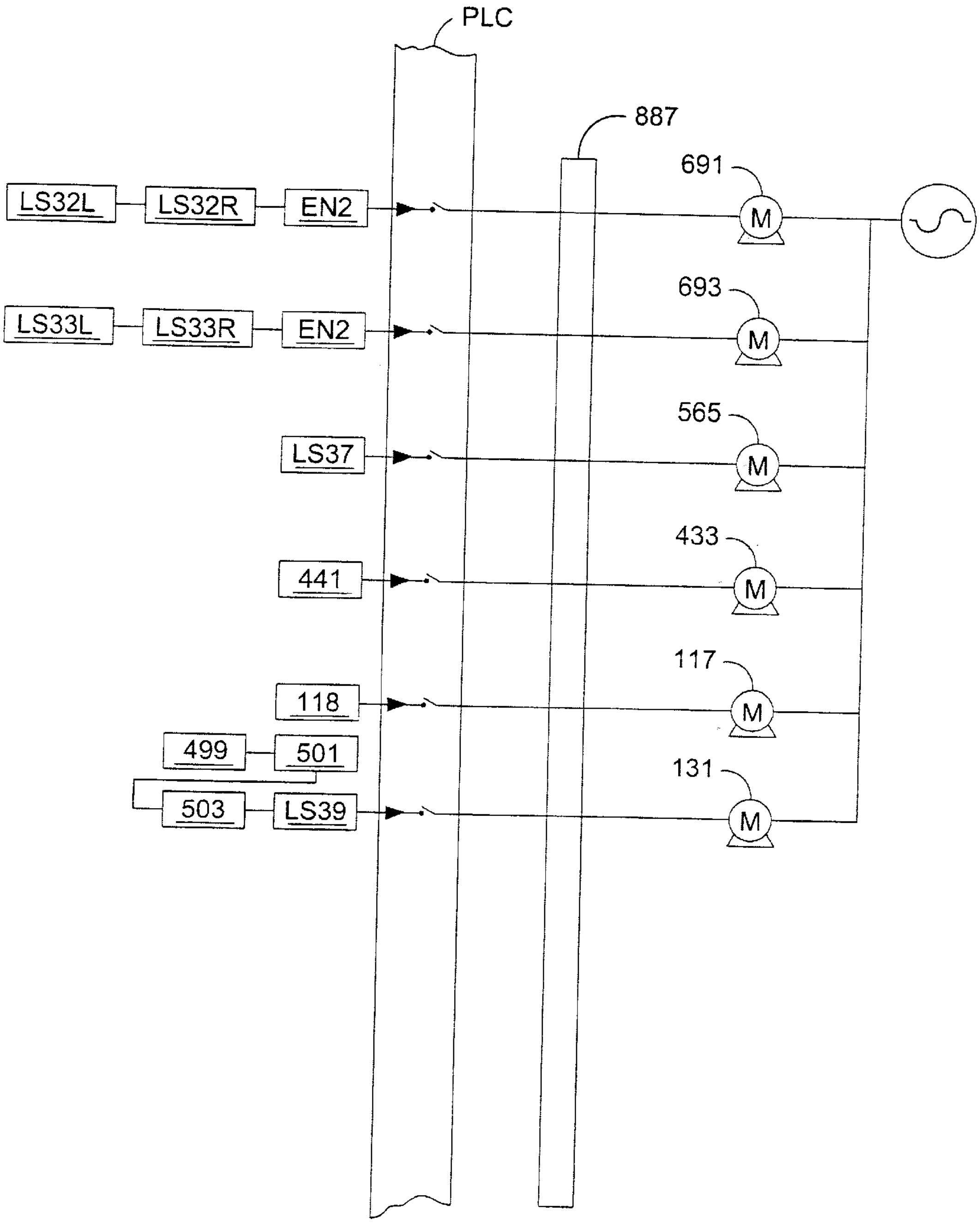
Figure 38F:
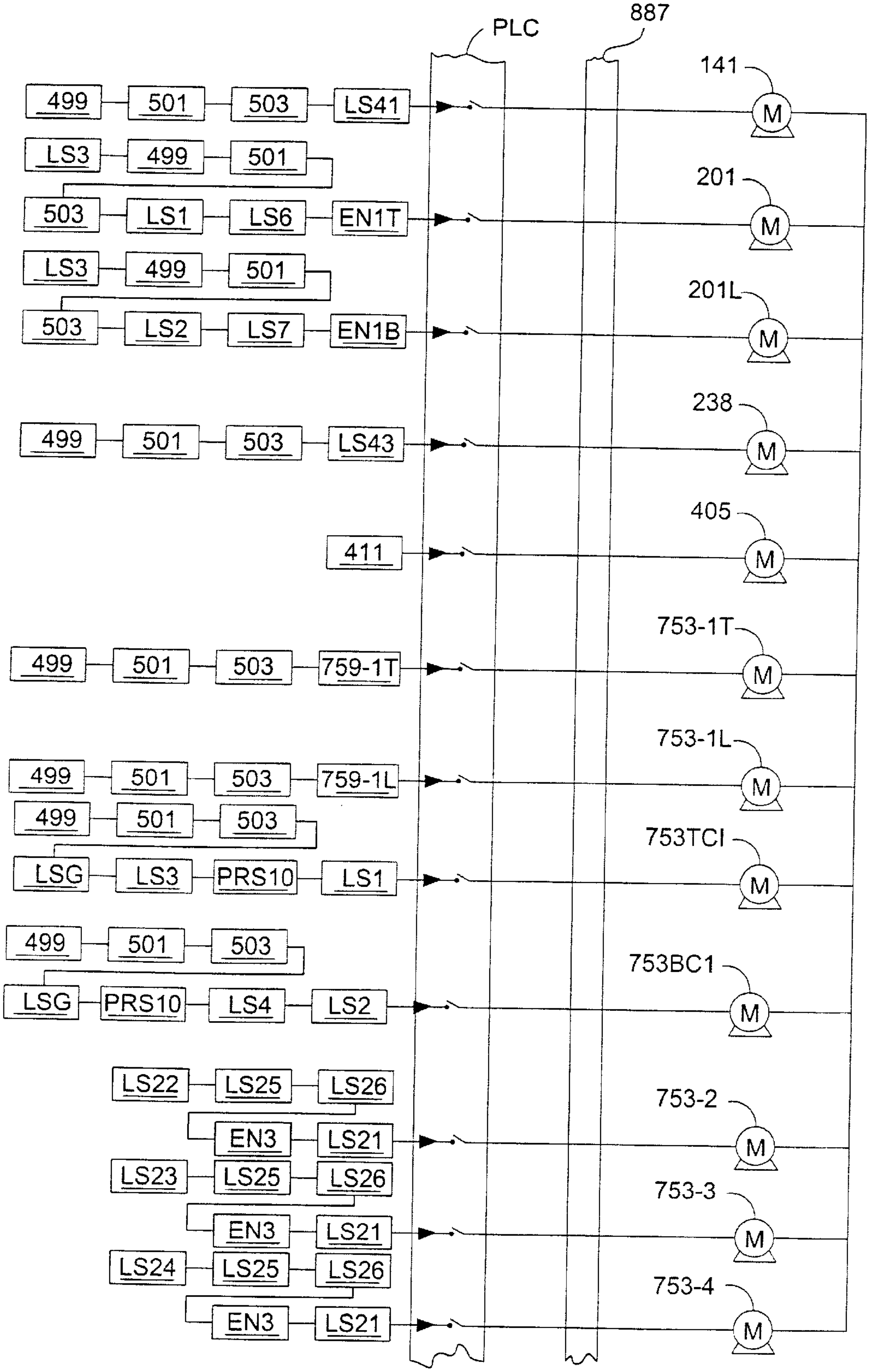
Figure 38G:
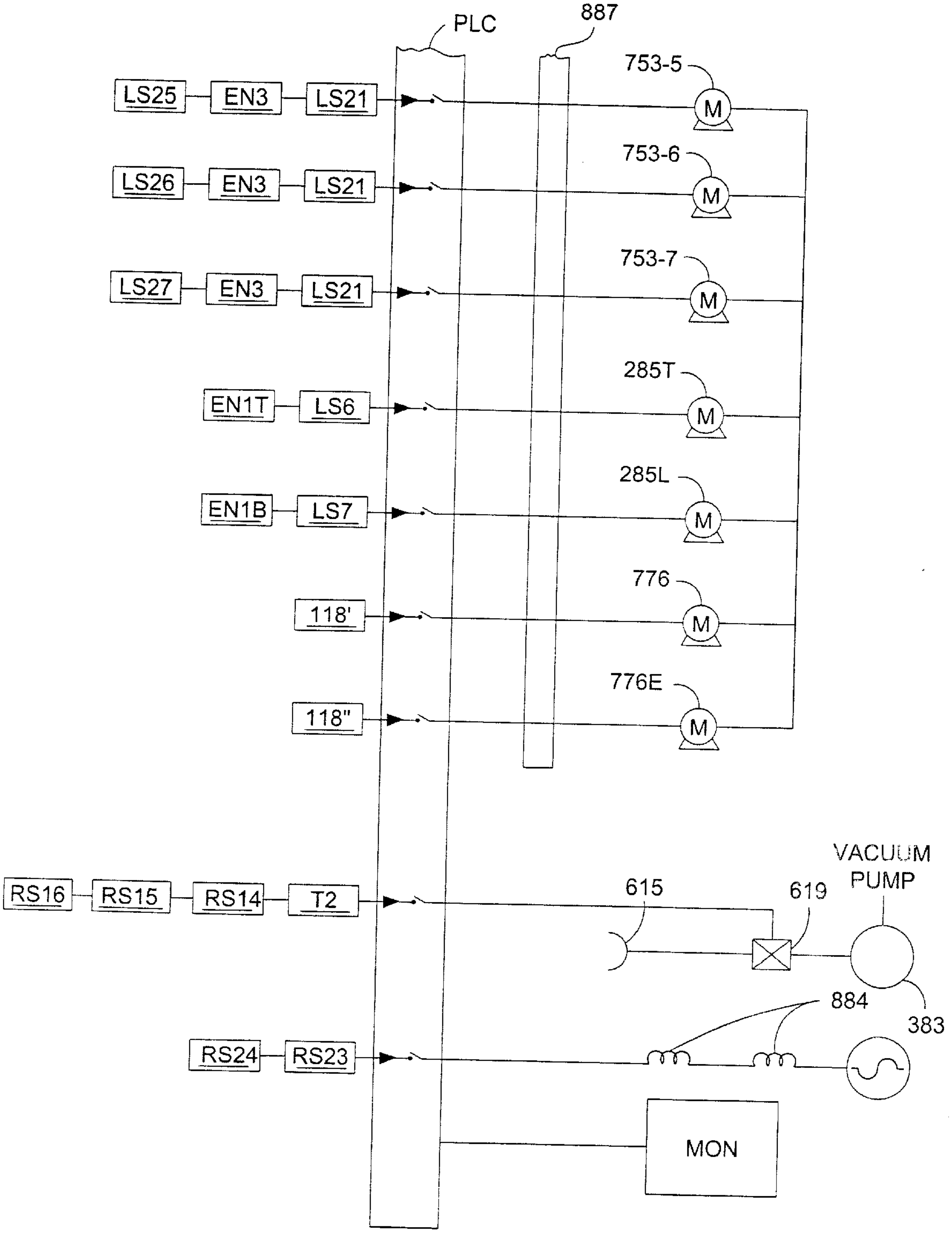

A series of positive centering devices, each designated generally as 628 and best seen in FIGS. 36 and 37, is provided to insure centering of the chord lengths 3, 5 at the saws 287T, 287L, board applying station 21, adhesive applicators 301, 319, and post inserter station 29. The widths of the chords for various trusses will be different and the centering device 628 is operable to center chords automatically without adjustment regardless of the chord width. A centering device 628 is mounted on both the top beam and the bottom beam at each station. A device 628 includes a mounting plate 630 with a pair of arms 632L, 632R pivotally mounted thereon. Each arm 632L, 632R includes a rotatably mounted roller 634L, 634R respectively on its free end. The rollers 634L, 634R are positioned on opposite sides of the respective chord for engaging opposite side edges thereof and are selectively movable toward and away from the opposite edges. The arms 632L, 632R are mounted on shafts 633L, 633R rotatable in the plate 630. On the opposite side of the plate 630 from the arms 632L, 632R drives are connected to the shafts whereby when one arm pivots, the other arm will simultaneously pivot in the opposite direction. Gears 636L, 636R are connected to the shaft 633L, 633R of the respective arm 632L, 632R whereby rotation of a gear will effect movement of its arm. The gears 636L, 636R are meshed whereby the rotation of one gear in one direction will effect rotation of the other gear in the opposite direction. The gears 636L, 636R will have the same diameter so that the degree of rotation will be equal for both. A drive is provided to effect rotation of each gear 636L, 636R positively in two directions and hence movement of the rollers 634L, 634R toward and away from the chords 3, 5. The drive includes an arm 638 connected to the gear 636R (either gear will suffice) whereby pivoting of the arm will effect rotation of the gear. The drive further includes a linear motion device connected to the arm 638 to effect its pivoting movement. A preferred linear motion device includes a pneumatic cylinder 640 mounted on the plate with its piston rod 642 connected to the arm 638 as with a pivoting clevis arrangement 644. An adjustable stop 645 is provided to limit the amount of gear rotation and pivoting of arms 632L, 632R. The operation of the cylinder 640 is controlled by a valve 640V (one only being shown schematically in FIG. 38 for convenience) which is operably connected to a sensor 646 such as a limit switch to signal the valve to allow the cylinder to extend or contract. Extension of the cylinder 640 moves the rollers closer together and retraction of the cylinder 640 moves the arms away from one another. The rollers 634L, 634R will move together until each engages the respective side of the respective chord and will stop moving. By having the halfway point between the rollers aligned with the center of the truss path, the rollers 634L, 634R will center the chords and hold them centered until the rollers move out of engagement with the chords. One centering device has been described and its description applies to each centering device. The centering devices are designated 628M, 628A, 628B, 628P for the devices located at the milling, adhesive application, board applying, and post inserter stations respectively.

Figure 29:
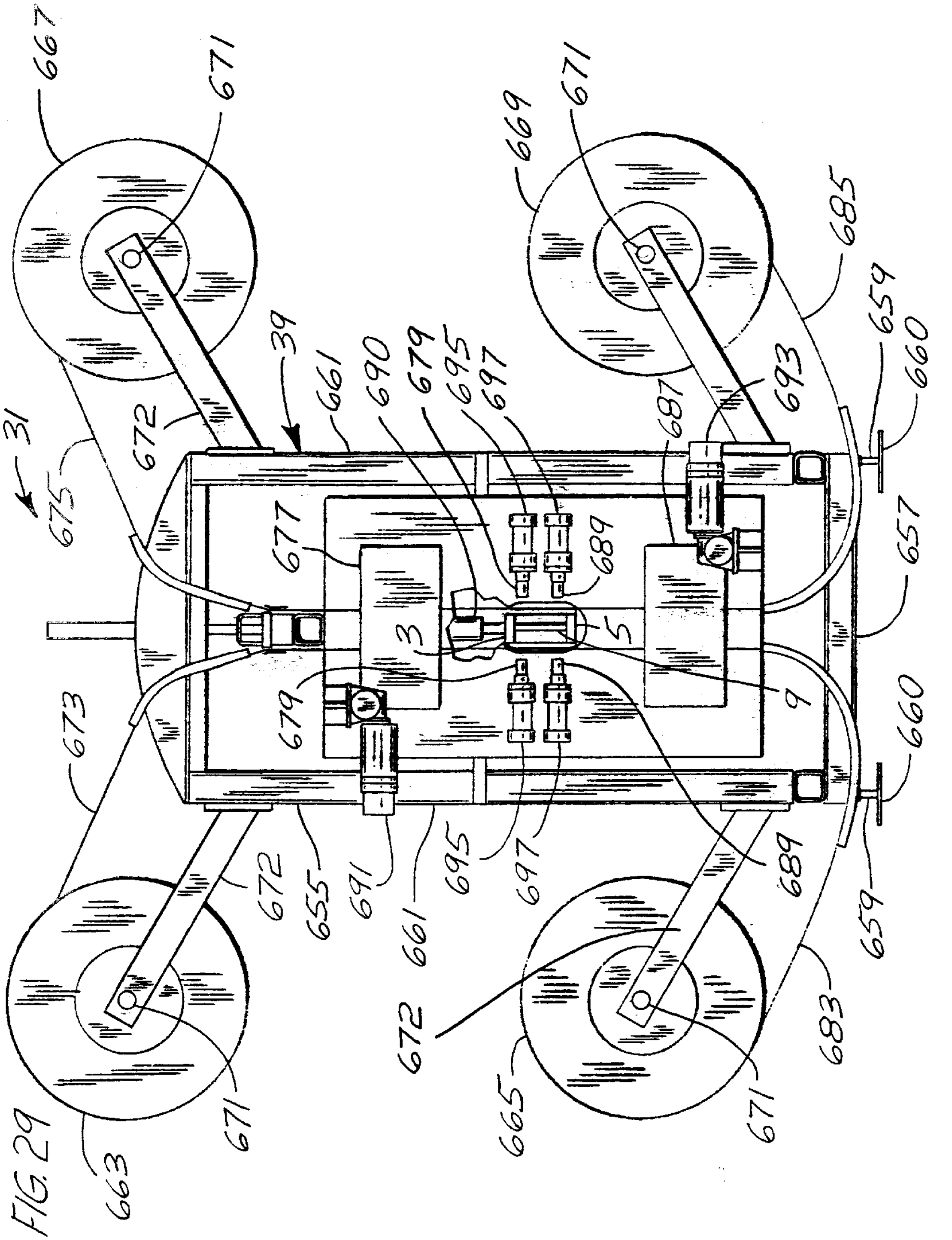
FIG. 29 is an end elevation view of the device for applying nailing plates to secure the vertical web members to the chords.

Each fastener 13 comprises a nailing plate having nailing teeth or nails 13N (FIG. 2) formed thereon extending from one face of the plate. The fastening device 39 for pressing in the fasteners 13 (FIG. 29), which may be referred to as a coil platen, comprises a frame 655 having a base 657 standing on adjustable legs 659 with flat-plate feet 660, the frame having vertical side posts 661 on opposite sides of conveyor section C4 (which passes through the frame). The post on the left side of C4 carries upper and lower coils 663 and 665 and the post on the right side carries upper and lower coils 667 and 669 of nailing plate stock in continuous strip format. The coils are rotatable on spindles 671 at the outer ends of arms 672 inclined upward and outward from the posts. Strip 673 and 675 are fed from the upper coils by means indicated at 677 to means indicated at 679 for shearing individual nailing plates 13 from the strips and driving the sheared-off nailing plates into the sides of the upper chord 3 and the member 11 at the top of member 11. Strips 683 and 685 are fed from the lower coils by means indicated at 687 to means indicated at 689 for shearing individual nailing plates 13 from the strips and driving the sheared-off nailing plates (i.e. driving their nails) into the sides of the lower chords 5 and the member 11 at the bottom of member 11. During the pause when the nailing plates are pressed in, a cylinder 690, under control of valve 690V, extends to engage the top chord 3 and apply downward force to the truss assembly to hold it in place during the pressing. At 691 and 693 are indicated motors (each with a speed reducer) for driving the feeding means 677 and 687. The feeding means 677 may be driven jointly by one motor 691 or separately by two motors 691, only one being shown schematically for brevity. Likewise, the feeding means 687 may be driven jointly by one motor 693 or separately by two motors 693, only one being shown schematically for brevity. At 695 and 697 are indicated hydraulic cylinders of the shearing and driving means 679 and 689 controlled by valves 695V and 697V (shown schematically in FIG. 38). The coil platen is derived from that in the co-pending co-assigned U.S. patent application of Michael M. Olden and Kathy L. Jin entitled Coil Advance Device for an Apparatus for Applying Links of Connector Plate Coils to Wooden Frames, Ser. No. 09/347,326, filed Jul. 2, 1999, a copy of which was filed as Appendix A with the provisional application parent of this application, the disclosure of said parent application Ser. No. 60/145,516 including the Appendix A being incorporated herein by reference, which may be had thereto for details.

Figure 39B:
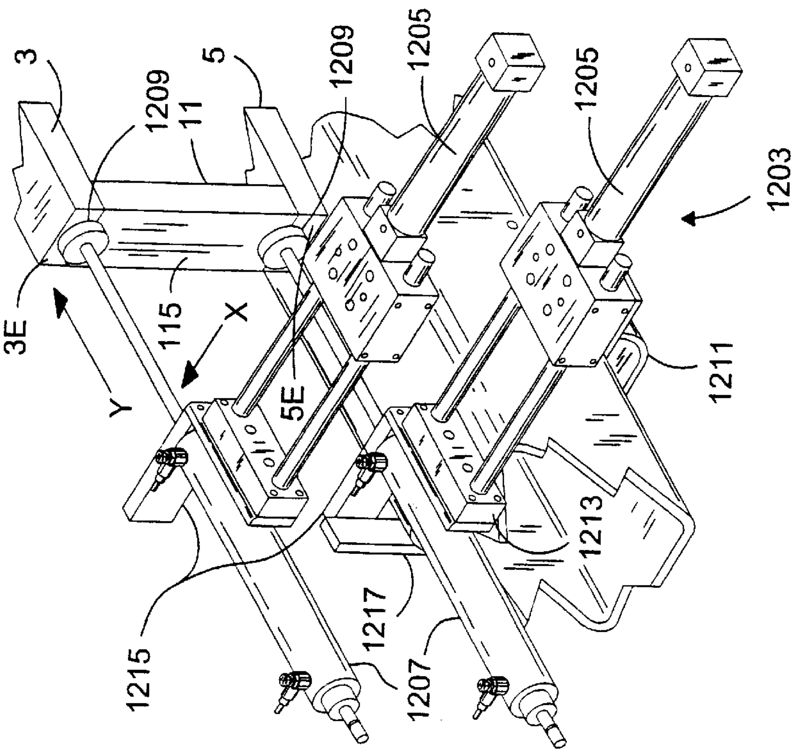
FIGS. 39A, 39B are perspective views of vertical post aligners used to align the end vertical post in a truss, FIG. 39A showing the aligners in a retracted position and FIG. 39B showing the aligners in position to align the post.
Figure 39A:
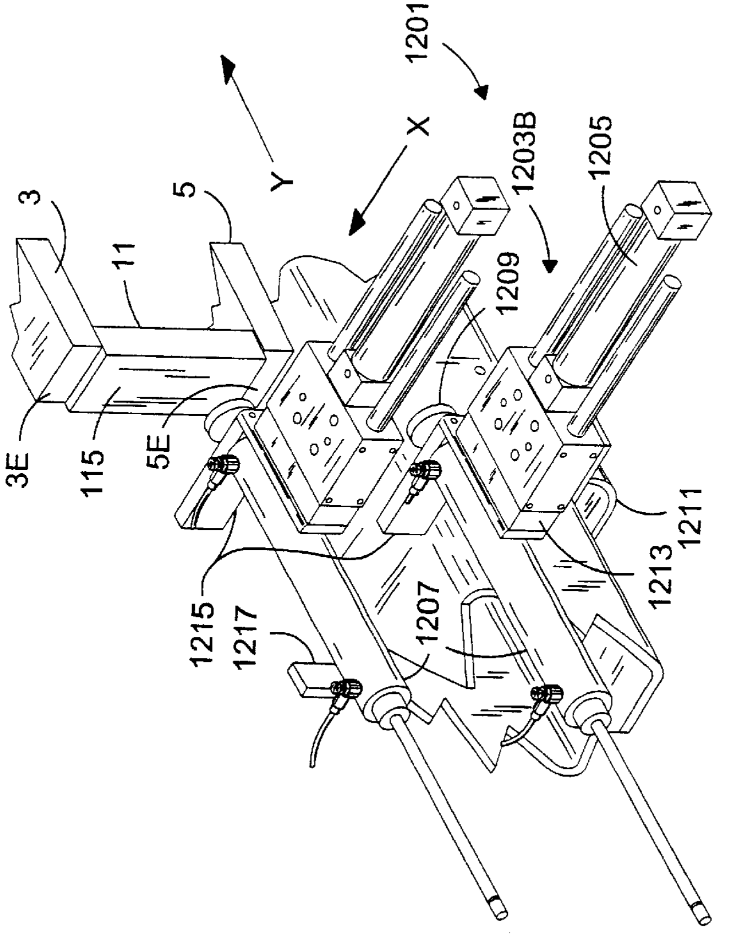

FIGS. 39A, 39B show an aligner mechanism designated generally 1201 for insuring flush alignment of the end member 11 with the trailing ends of the chords 3, 5. FIG. 39A shows the aligner mechanism in a retracted position which allow the truss to pass during manufacture. FIG. 39B shows the aligner mechanism in an extended position having aligned the trailing member 11 aligned flush with the ends of the chords 3, 5. The aligner mechanism 1201 includes a top and bottom aligner devices 1203T and 1203B respectively. The aligner devices 1203T, 1203B are in the illustrated embodiment are the same except for location and the description of one will suffice for the other. When the end member 11 is inserted between the chords 3, 5, it projects slightly from the trailing ends of the chords (FIG. 39A). It is moved forward by the aligner mechanism 1201 during a pause in forward progress of the chords to a position where the outward facing surface 11S is substantially flush with the trailing ends 3E, 5E (FIG. 39B). After the member is moved to the flush position, the chords can again move forward in the apparatus to complete the truss. The aligner devices 1203T, 1203B are mounted to the top and bottom beams respectively just upstream of coil platen 39 where the nail plates 13 are applied.

Aligner device 1203B includes a pair of pneumatic cylinders 1205, 1207 that are associated with a pusher pad 1209 to move the pad transverse to the path of truss movement and denoted by the arrow X and also parallel to the path of movement of the truss denoted by the arrow Y. The cylinder 1205 is mounted on the beam by a bracket 1211. A slide 1213 is connected to the cylinder for movement thereby. Cylinder 1205 moves the pad 1209 in the X direction. Cylinder 1207 is movable with the slide 1213 to a position in the path of movement of the chords 3, 5. The longitudinal axis of the cylinder 1207 is generally parallel to the path of chord movement. A stop arm 1215 is secured to the cylinder 1207 and limits movement of the cylinder in the X direction by engaging the stop plate 1217. The stop plate aligns the pad 1209 to engage the end member 11 and the chord 5. When the cylinder 1207 extends, the pad 1209 first engages the end member and then the respective chord and may also advance the truss in the forward direction of progress. By engaging both the end member and the end of the chord the end member is positively aligned with the ends of the chords. After effecting alignment, the cylinders 1205, 1207 retract to their start positions. The cylinders 1205, 1207 are connected to control valves not shown that control operation of the cylinders and the signals to commence operation may be any truss pause signal after the member is inserted and before the end member reaches the coil platen 39.

Following the insertion and fastening of the first member 11, i.e. the member 11 at position Y1 in the truss being fabricated (the workpiece), the workpiece is indexed by the conveyor C (i.e. fed forward in increments) for the insertion and fastening of members 11 at positions Y2 and Y3 of the workpiece, thus completing fabrication of the truss, with the one trimmable board 9 at the leading end of the workpiece, except for the application of the V-shaped metal web members 7. The workpiece, now comprising the upper and lower chords 3, 5, the board 9 at its leading end (and in the alternative, a board 9 at the trailing end if desired), and the vertical wooden members 11 at positions Y1, Y2, Y3, is fed forward by conveyor C to the staging section C5 of conveyor C.

In the staging section C5 (FIG. 8), the lower run of conveyor C comprises a relatively long box beam 701 supported in horizontal position extending forward from and in line with the lower run of conveyor section C4 on stanchions 703 and auxiliary supports 705. The stanchions have bottom side bars 707 on vertically adjustable legs 709 having foot plates 711 and side posts 713 and 715 on the side bars supporting a cross-bar 717, the latter supporting box beam 701. Posts 715 extend up above posts 713, each post 715 having a cantilevered arm 719 extending transversely with respect to the box beam 701 over the bar 717, said arms supporting an upper beam 721 (of channel section) constituting a part of the upper run of conveyor C in staging section C5. The box beam 701 carries a first lower series of rollers 725 having trunnions 727 journalled in bearings 729 in the sides of the box beam 701. These rollers are of such diameter and their axes are so located with respect to slots 747 in the top wall of box beam 701 that they project up through the slots 747 so that in staging section C5 the bottom chord 5 of each workpiece therein bears on the rollers for the forward feed thereof. The rollers 725 are preferably idler rollers for carrying the unfinished truss forward in the staging conveyor C5.

As best seen in FIGS. 8 and 35, a positive truss drives 748 are provided. A series of such drives are positioned along the conveyor C5 and one on the outfeed conveyor C6 and are designated 748-2 through 748-7 for clarity. Any suitable number may be used and for a forty foot staging conveyor five may be used and one may be used on the outfeed conveyor. Two such drives, designated 748-1T, 748-1L (FIGS. 5 and 38), may also be used at the outlet end of the infeed conveyor as described above instead of the drives shown in FIG. 10. The drives 748 are preferably the same and provide for self centering of the truss and positively drive the truss forward and can stop forward movement of the truss in response to control signals. The drive 748 includes a pair of pivoted arms 749L, 749R on the bottom beam 701. A drive pulley 750 and a driven pulley 751 are rotatably mounted on each arm 749L, 749R. A belt 752 connects the drive pulley to the driven pulley 751. Preferably, the pulleys 750, 751 and the belts 752 are cogged to provide slip free drive. The drive pulleys 750 are connected to a motor drive unit 753 (including a gear reducer) to be driven thereby. The motor drive 753 is connected to the pulleys 750 thru right angle drives 754L, 754R which are connected together by a shaft 755. Drive members such as a spur gears 756L, 756R are each connected to a respective pulley 749L, 749R to be driven thereby. The gears 756L, 756R each have a portion positioned in the path of the bottom chord 5 of the truss to engage side edges thereof for driving the truss forward. The teeth on the gears 756L, 756R provide substantially slip-free driving of the truss. To accommodate different widths of chords, the gears 756L, 756R can move toward and away from one another thru pivoting of the arms 749L, 749R. A drive is connected to the arms 749L, 749R to effect their pivoting. As shown, the drive includes a pneumatic cylinder 757 pivotally connected to both arms 749L, 749R whereby upon extension of the cylinder, the gears will move away from one another and upon retraction of the cylinder, the gears will move toward one another to engage the sides of the chord 5 therebetween. Extension and retraction of the cylinder 757 is controlled by a valve 758 (FIG. 38). The valve 758 is activated by a signal from a sensor 759 such as a limit switch. When a chord first engages the sensor 759, the cylinder 757 will retract moving the gears into engagement with the chord and the motor drive 753 will also be activated to drive the gears 756L, 756R and thereby drive the truss forward. When the chord moves out of engagement with the sensor 759, a signal is sent to the valve to extend the cylinder 757 and to the motor drive 753 to turn it off.

Each auxiliary support 705 (FIG. 8) simply comprises a cross-bar 763 on adjustable legs 765 having foot-plates and a center post (not shown) supporting box beam 701. The upper channel-section beam 721 carries an upper series of rollers 769 for bearing down on top of the upper chord 3 of a workpiece in staging section C5. Each roller 769 is at the lower end of a downwardly extending arm of a bell crank lever 771 pivoted at 773 on beam 721. The levers have their upper ends interconnected by a long connecting rod or link 775, which is driven upstream and downstream by a motor drive unit 776 connected thereto to swing the levers for engagement of rollers 769 with said upper chord 3. The motor 776 may be operated by the PLC in accordance with programmed instructions for each truss to be made in response to a height signal generator 118' like the encoder 118. The staging section C5 is of such length as to accommodate one or more workpieces. For example, for workpieces of the maximum length of 36 feet, the staging section C5 is about 40 feet long. Spring-biased side guide rollers 779 for side-guiding the upper chord 3 depend from the upper beam 721. It will be observed that with the lever-mounted upper rollers 769 the staging section C5 can handle workpieces having the height range previously mentioned.

The upstream end of conveyor section C6 (referred to as the exit conveyor section) is located downstream from the downstream end of staging section C5, providing what may be termed a gap in the conveyor line where the metal web applicators 41L and 41R are situated (the workpiece being intermittently fed forward between these applicators as will appear). This feed is by means of rollers 741 of the staging section C5 that function intermittently to feed the workpiece forward from the staging section through the metal web applying station 33 (comprising the left and right hand applicators 41L and 41R) to the exit section C6 which functions after the application of the metal web members has been completed to feed the completed truss forward from the downstream end of the conveyor line C.

The exit conveyor section C6 (FIGS. 4 and 5) of the conveyor C, which is immediately downstream from the metal web applying station 33, is a relatively short version of the staging section C5, comprising for its lower run a relatively short box beam 701E in line with box beam 701 and for its upper run a relatively short beam 721E of channel cross-section in line with beam 721 on stanchions 703E and auxiliary supports 705E. The components of the exit conveyor section corresponding to these of the staging section are assigned the same reference numerals as the latter with the subscript E (for exit). The lower rollers (not shown) of exit conveyor section C6 are idler rollers. The height of rollers 769E is adjustable via operation of the motor 776E under control of the PLC 505 and an encoder device 118" like the encoder 118.

As previously described, each of the metal web applicators 41L, 41R (FIG. 30) at station 33 comprises a holder 43 for holding a supply of the metal web members 7, a transfer device 45 for transferring a member 7 into position on the respective side (right or left) of the workpiece at station 33 and a driver 47 for effecting driving (pressing) of the nails of the members 7 into the top and bottom chords 3, 5 of the workpiece. The applicator components are mounted on a framework designated in its entirety by the reference numeral 781 comprising a table 783 on legs 785 each having the same type of adjustable foot plate as used throughout the apparatus. Posts 787 extend up from the table adjacent the coeners thereof. Beams 789 span the posts at the sides of the frame and beams 791 span the posts at the upstream and downstream regions of the frame, topping off the framework well above the table. The drive 47 of each applicator 41L, 41R comprises a platen 793, which may be referred to as a press platen, on the plunger 795 of a hydraulic cylinder 797, under control of valve 797V, which may be referred to as a press cylinder. The latter is mounted at the end thereof constituting its forward end on plate 799. Each plate 799 is mounted in vertical position on the table in an upstream-downstream vertical plane adjacent the respective side of the table by means of backing plates 801 on the outside of the plate 799. A cap plate 803 spans the backing plates 801. The platens 793 have back bracing as indicated at 805 and are movable on the table in transverse direction in relation to conveyor C toward and away from a workpiece (chords 3, 5 and a board 9 and vertical web members 11) extending therebetween. In this regard, it may be noted that the workpiece is adapted to be fed forward (intermittently in increments) by the staging conveyor C5 in vertical position in a vertical upstream-downstream plane passing centrally through the framework 781 over the table (the vertical plane of conveyor C).

Figure 32:
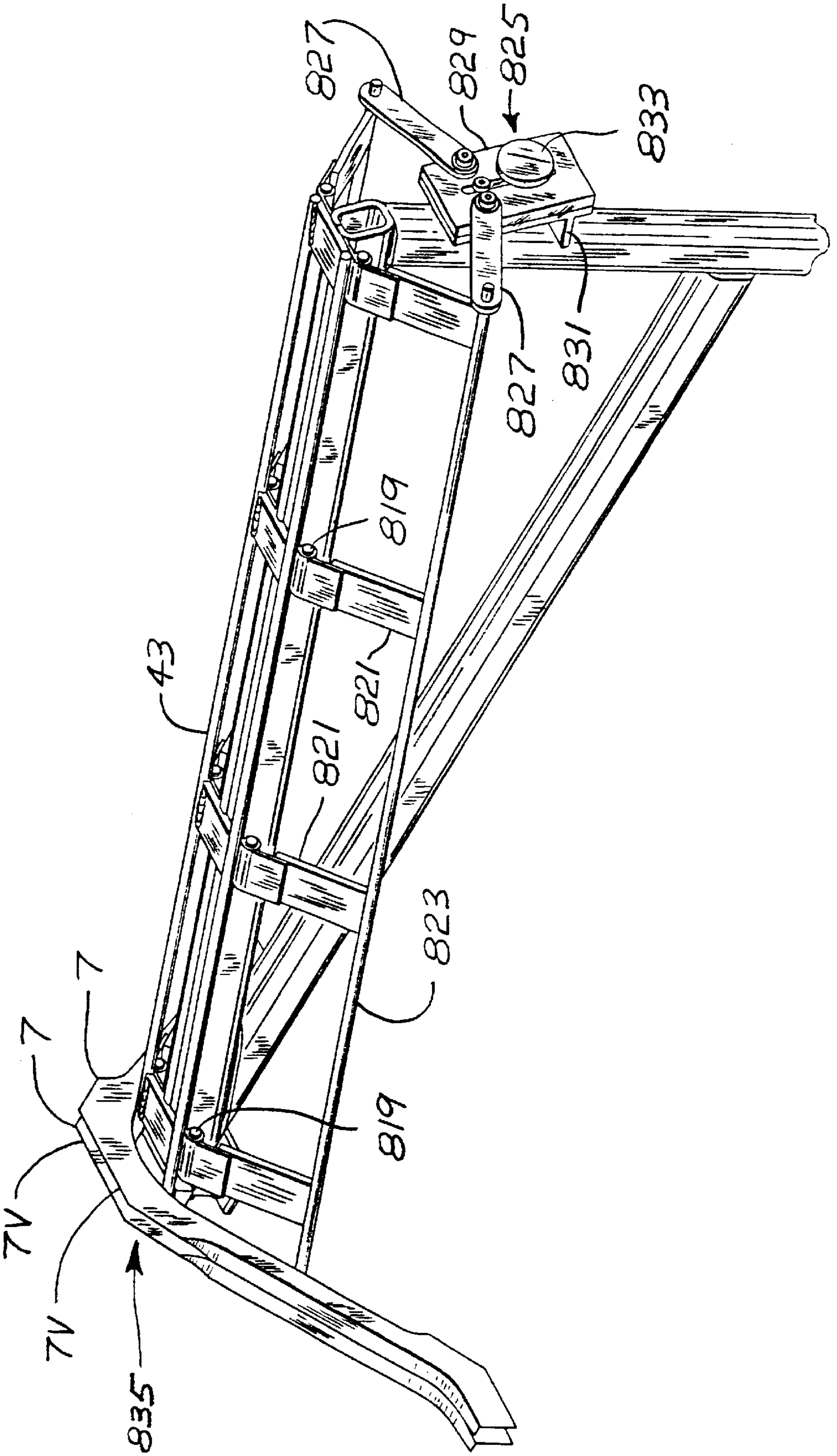
FIG. 32 is an enlarged perspective view of a magazine for storing the V-shaped web members viewed from the loading end toward the feed end.

Each holder 43 (one at the left, one at the right) comprises an adjustable configuration rack 807 slanting downward and inward from the upper end of a vertical strut 809 at the outer end of a horizontal beam 811 supported on a post 813 extending up from the cap plate 803 (FIG. 32). The rack 807, strut 809 and beam 811 are in the configuration of a right triangle, the rack constituting the hypotenuse of the triangle. Each rack-strut-beam assembly extends transversely with respect to the conveyor line C, each rack slanting down toward but terminating short of the aforesaid upstream-downstream central plane.

Figure 31:
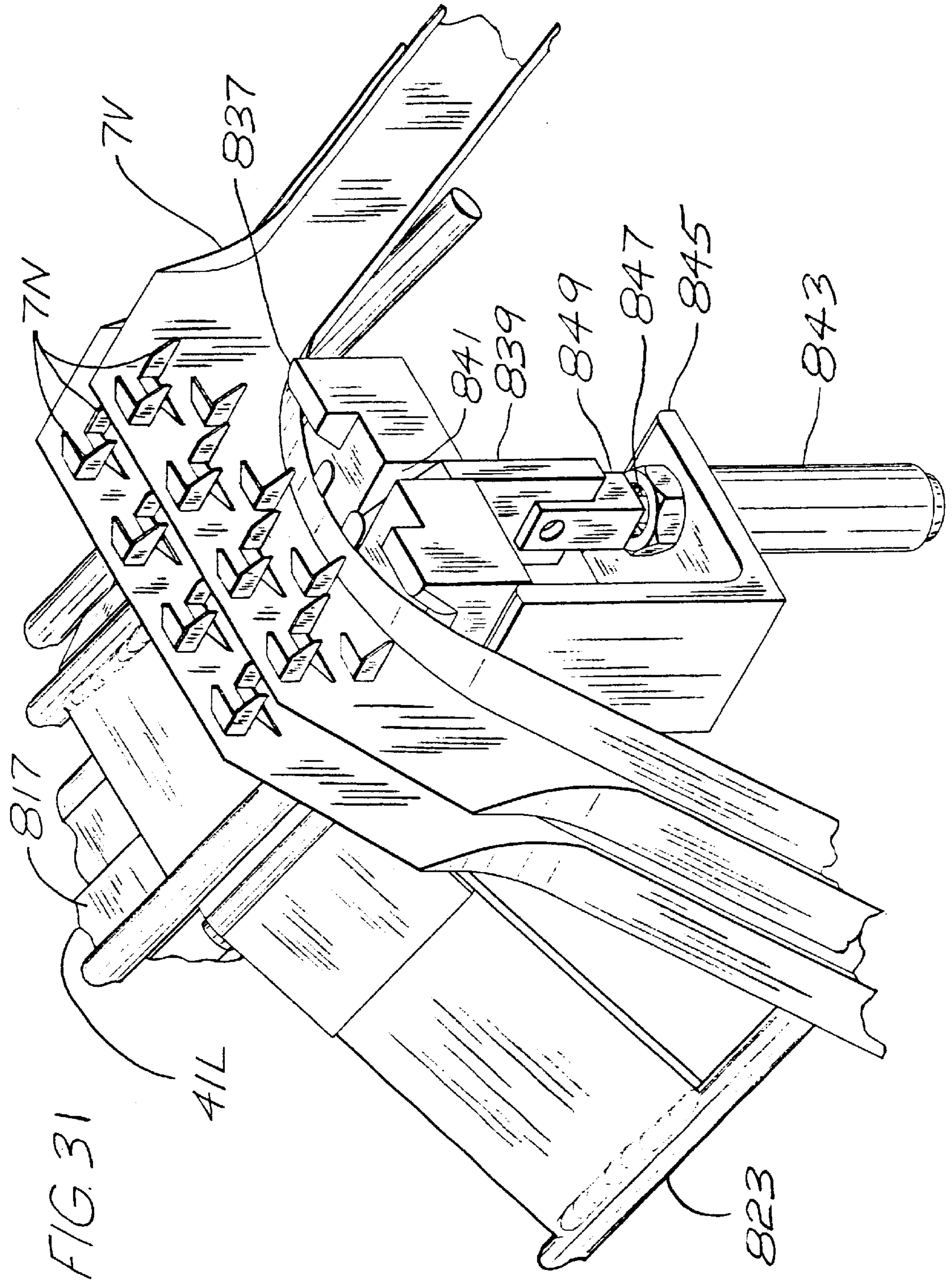
FIG. 31 is an enlarged fragmentary perspective view of a first form of mechanism for feeding webs from a storage magazine.

Each rack 807 (i.e. the one at the left and also the one at the right) comprises a box beam 815 supported at its ends on the upper end of strut 809 and on the inner (upper) end of the beam 811. An elongate top structure 817 extends lengthwise on the box beam 815 having a width corresponding to the width of the apex 7V of the metal web member 7 with the widest apex. Pivoted on this top structure 817 on both sides thereof as indicated at 819 on axes parallel to beam 815 are arms 821 angled downward and outward carrying rods 823 extending parallel to beam 815. The rods 823 are adjustable laterally in and out with respect to the top structure by means indicated at 825 including levers 827 interconnected between a plate 829 adjustable on a bracket 831 on the strut 809 adapted to be locked in adjusted position by a knob 833 for the hanging in inverted position of a row 835 of V-shaped metal web members 7 of selected size on the rack, the row 835 constituting an inclined stack of members 7. The latter are hung on the rack with their branches 7A being downwardly and outwardly inclined and teeth or nails 7N (at the apex 7V and ends of the branches 7A) directed inward (i.e. down toward the aforesaid central vertical plane of the apparatus). FIG. 31 illustrates one form of web retention device. Each row or inclined stack 835 is gravity-biased to slide down on the respective rack against a stop 837 at the inner (lower) end of the rack. A plate serving as a lifter 839 is slidable in a vertical slot 841 in the stop by means of an air cylinder 843 mounted on a bracket 845 at the inner (lower) end of the rack for lifting up the member 7 constituting the lowermost (the leading) member 7 of the stack clear of the stop. The air cylinder 843 has its piston rod 847 connected by a clevis 849 to the lifter, being under control of a valve (not shown).

Figure 33:
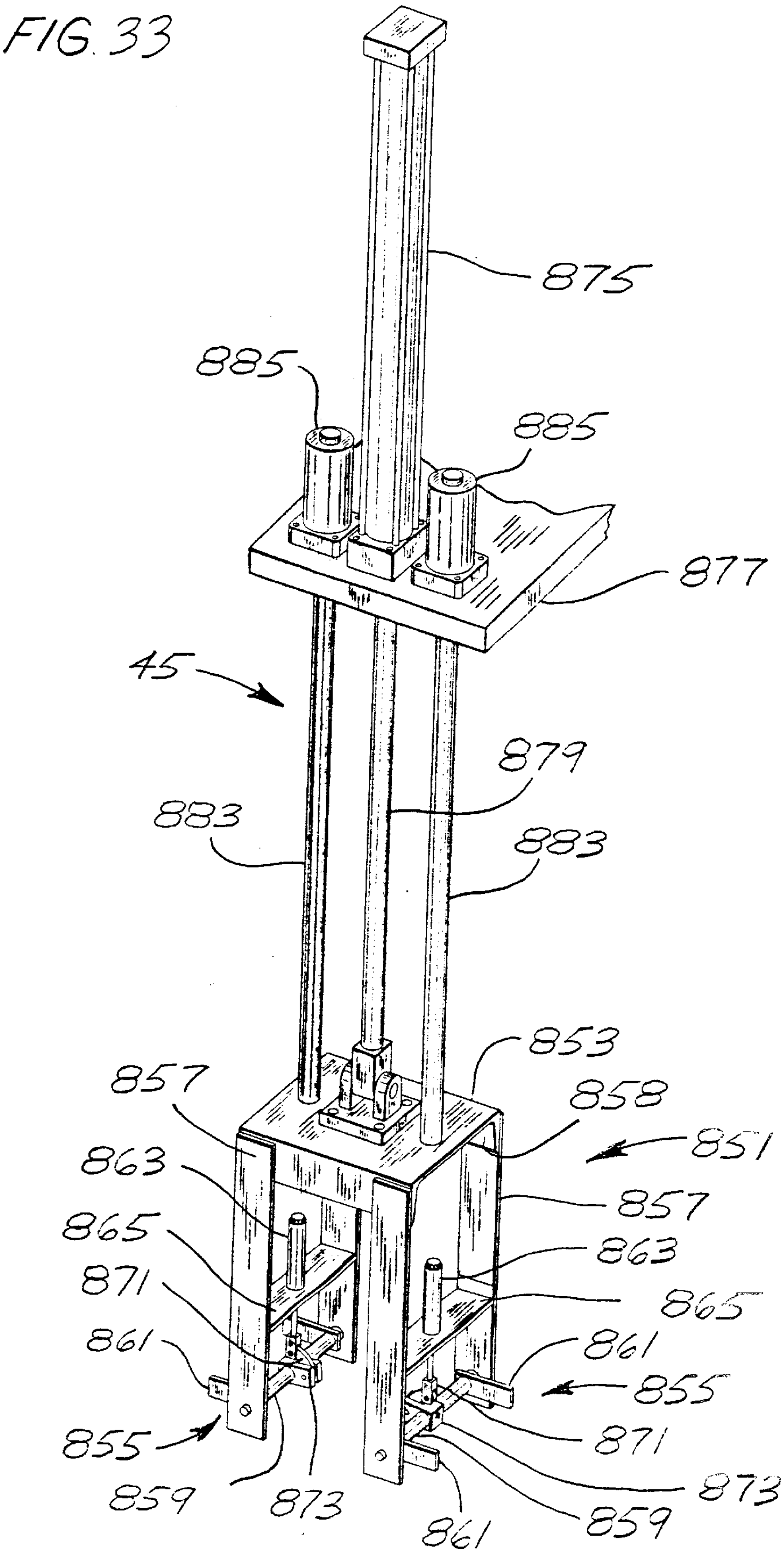
FIG. 33 is an enlarged perspective view of a carriage device for transferring webs from the storage magazine to devices for applying the webs to the chords.

The transfer device 45 at station 33 comprises a carriage (FIG. 33) designated 851 in its entirety movable vertically up and down in the framework 781 between a raised pick-off position between the inner ends of the racks 807 and a lowered position between the platens 793 for effecting the pick-off from a rack 807 of a V-shaped metal web member 7 (in its inverted position) and carrying it down for application (as will be subsequently described) to a respective platen for the ensuing pressing of the member 7 to drive its teeth (nails) into the chords 3, 5. The carriage 851 comprises a head 853 consisting of a short length of channel iron having identical left and right side web carrier means each designated 855. Each of said carrier means comprises a pair of flat bars 857 welded to the flanges 858 of the head at the respective side of the head extending down from the head. Journalled in each pair of bars 857 adjacent their lower ends for rotation on a horizontal axis extending parallel to the central vertical plane of the apparatus is a shaft 859 having a pair of web carrier arms 861 thereon. The shaft 859 is rotatable to swing the arms 861 between a horizontal outwardly extending web member carrying position and a downwardly extending clearance position out from under the web member by means of an air cylinder 863 mounted in vertical position on a support 865 extending between bars 857 of the respective pair having a clevis 867 at the end of its piston rod 869 (which extends down through an opening in the support 865) connected by a link 871 to a crank 873 on the shaft. Both cylinders 863 are under control of a valve 863V (FIG. 38). The carriage 851 is movable up and down by means of a relatively long air cylinder 875 mounted on a structure 877 supported by the top beams 791 of the framework 781 extending up from the framework and having its piston rod 879 extending down through an opening in the structure 877 to a connection at 881 with the carriage. Guide rods 883 extend up from the head of the carriage through linear bearings 885 mounted on opposite sides of the air cylinder 875 holding the carriage in the orientation with each web carrier means 855 on its respective side (left, right). Air cylinder 875 is under control of a valve 875V (shown schematically in FIG. 38).

The air cylinder 875 is operable to raise the carriage 851 to its upper limit with cylinders 863 having swung the arms 861 down to their retracted clearance position extending downward. Then, assuming the apparatus is handling the situation where the left-hand applicator 41L is to apply a web member 7 to a workpiece extending over table 783 (and dwelling in position for application thereto on the left side thereof of the web member 7) the left-hand air cylinder 843 is operated to raise the left-hand lifter 839 which lifts the foremost (leading) web member 7 of the inclined stack on the left-hand rack 807 clear of the stop 837 at the inner end (the lower end) of the left hand rack and effects forwarding of that member 7 onto the left-hand arms 861 on the carriage, these arms having been swung by the respective air cylinder 863 (the left-hand air cylinder 863) to their web member carrying position extending generally horizontally outward. The inclined stack 835 slides down on the left-hand rack 807 to the point of engagement of the leading member 7 of the stack with the stop 837, ready for the next time a left-hand member 7 is needed.

Figure 30:
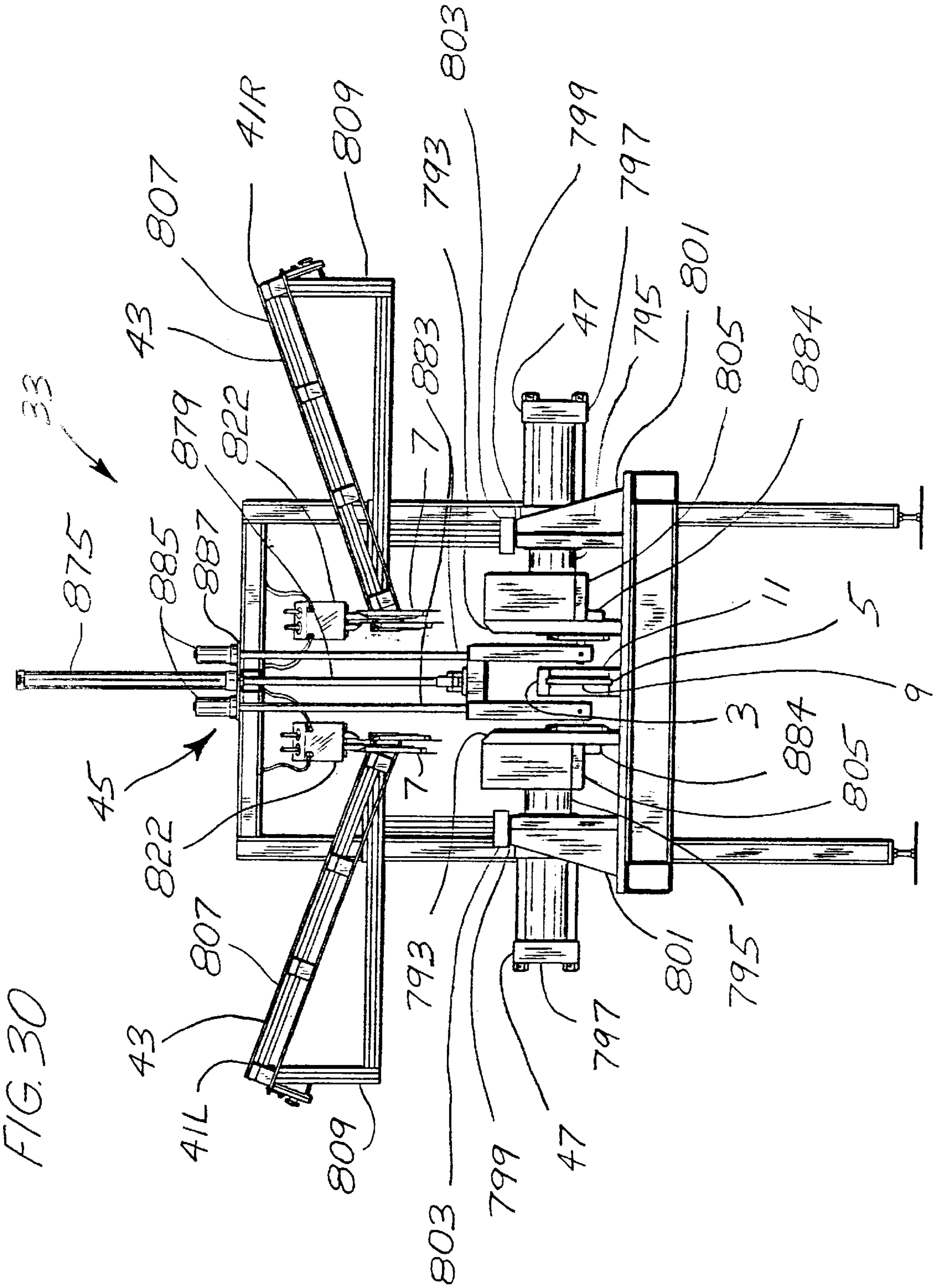
FIG. 30 is an end elevation view of the device for applying metal V shaped web members to the chords, the figure illustrating the alternate web feeding device.

With the V-shaped metal web member (inverted) on the left-hand arms 861, cylinder 875 is operated to drive the carriage 851 down to its lowered position between the platens 793 shown in FIG. 30 wherein the web member 7 is at the requisite elevation (and longitudinal position relative to conveyor C) for being driven (i.e. for having its nails 7N pressed) into the upper and lower chords 3, 5 by the platens 793. The member 7 is then magnetically (it's steel or in a broad sense paramagnetic) gripped on the face of the left-hand platen 793 by energization of electromagnets indicated 884 mounted on the platen. The left-hand cylinder 863 is operated to swing the left-hand arms 861 down to their retracted position and the carriage 851 is raised by cylinder 875 to its retracted position between the down ends of racks 807 to clear the way for operation of the platens 793 to press the member 7 on the left-hand platens home. And cylinders 797 are then operated to drive the platens inward for this purpose, the right-hand platen backing up the workpiece while the left-hand platen does the driving (pressing) of the nails 7N on the member 7 on the left-hand platen into the chords. The electromagnets 884 are deenergized to release their grip and the platens are retracted by cylinders 797.

The operation for the situation where the right-hand applicator 41R is to apply a web member 7 to a workpiece corresponds to the above-described operation of the left-hand applicator 41L, involving the right-hand components operating like the left-hand components. Operation for the situation where both left-hand and right-hand applicators 41L and 41R function at the same time to apply two web members 7 (one left, one right) to a workpiece involves simultaneous operation of left-hand and right-hand components.

Figure 34:
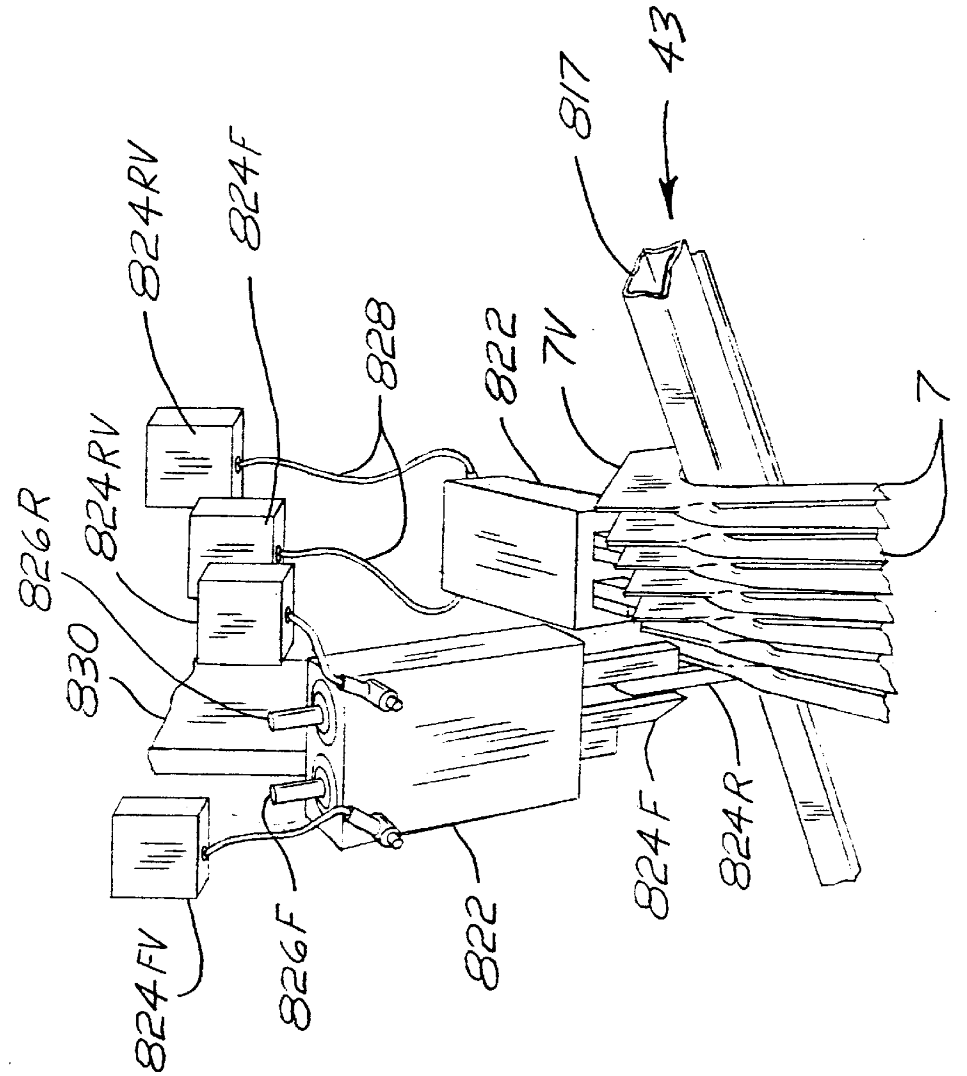
FIG. 34 is an enlarged perspective view of an alternative web release device as seen in FIG. 30.

Another embodiment of web retention device for the web applicators 41L, 41R is shown in FIGS. 30 and 34. It is substantially identical to the above described applicators except for the web retention devices, e.g., the stops 837, lifters 839 and cylinders 843, for selectively feeding webs 7. As shown, the web release mechanism for each applicator is the same and for convenience, only one will be described. The release mechanism includes a pair of reciprocating finger devices each designated generally 822 for each applicator 41L, 41R. The devices 822 are positioned on opposite lateral sides of the web holders 43 to effect engagement with the webs on opposite sides of the web apex 7V. Each device includes a pair of movable fingers 824F and 824R spaced apart along the longitudinal dimension of the holder 43 a distance slightly less than the spacing of the webs 7 positioned on the holder 43. The fingers 824F and 824R are movable to first engage and then disengage a web. Each finger 824F and 824R is mounted to an air cylinder 826F and 826R respectively to effect movement of the fingers. Each cylinder is connected to a source of compressed air via flexible hoses 828 and control valves 824FV and 824RV that control the extension and retraction of the cylinders and thus movement of the fingers 824F, 824R. The devices 822 are mounted to a bracket 830 which in turn is mounted to the frame of the web applicator 41. A web member 7 engages the fingers 824R with the fingers in a down position. With the fingers 824F in a down position, the fingers 824R are raised and a member slides downwardly to engage the fingers 824F which stop and retain the member 9 for subsequent release. When a member 7 is needed for application to a the chords 3, 5, the fingers 824F are raised to release the member for application as described above.

As shown in FIG. 38, the apparatus as a whole is under control of a PLC (programmable logic circuit) 505, more particularly model 9030 by GE Fanuc Automation, Route 29 and Route 606, Charlottesville, Va., controlling relays 887 for the plurality of motors of the apparatus and relays 889 for the plurality of valves of the apparatus, (all solenoid valves), the PLC being programmed for operation of the apparatus in cycles in each of which a pair of chord lengths 3, 5 are fed down the line C for application thereto in sequence a board 9 (or two boards 9), vertical web members or struts 11, and metal web members 7. A cycle starts with operation of motors 131, 143 of the infeed conveyor section C1 and motors (fluid) feed forward (continuously) a pair of chord lengths 3, 5 generally in registry as above noted into and through the chord preparation conveyor section C2 and the tapering conveyor section C3 to the point of engagement of the leading ends of the chords 3, 5 with the gates 485 and 487. The chords 3, 5 are fed into the infeed conveyor section C1 from the side by operators, however, an automatic feed device could be used to feed the chords from storage magazines.

As the pair of chord lengths 3, 5 travels through section C2, the upper and lower milling devices 271 and 273 are positioned (by operation of valve 294 controlling air cylinders 289) and activated (by operation of motors 285T and 285L to drive the saws 287T and 287L) to mill the grooves G1 and G2 in the chord lengths. The milling devices are retracted and stopped when the grooves are cut to the requisite length, which is slightly longer than the length of a board 9, extending back from the leading ends of the chords 3, 5. The latter, continuing their travel through section C2, then encounter the adhesive applicators 297, the pumps 337 and 339 being activated to pressurize the adhesive. Adhesive, allowed to flow on opening of the valves 337V, 339V, is applied in the grooves G1 and G2 as the chords 3, 5 pass by the applicator heads 301. The valves close when the trailing ends of the grooves move past the heads 301, 319.

Before the leading ends of chords 3, 5 reach the board applying station 21 (in section C3), a board 9 will have been placed in the board placement position wherein the board is in the vertical plane of tapering conveyor section C3 extending longitudinally thereof adjacent the downstream end thereof in readiness for convergence of the chords 3, 5 thereon by the board transfer device 23.

With the board 9 now in place in grooves G1 and G2 (and subject to the action of the adhesive in the grooves) the upper and lower gates 485 and 487 will open as described below. Operation of motors 201 and 201L takes place to send the chords 3, 5 with the board 9 in place into conveyor section C3 where rollers 205 and 205L takes over. Under control of programmer 505, motor 238 is operated to effect operation of rollers 205 and 205L to feed chords 3, 5 with the board 9 (the workpiece) into position at station 29 where the workpiece dwells for insertions of the web members 11.

After the insertion of each web member 11, the PLC 505 functions to operate motor 238 to operate rollers 205, 205L to feed (index) workpiece (now having board 9 and the Y1 strut 11 in place) into position in station 31 (coil platen 39) for effecting the fastening of the strut at Y1 to the chords while the workpiece dwells at said station. The cylinder 690 retains the workpiece in place while the struts are fastened in place. In preparation for said fastening, the PLC functions to operate motors 691 and 693 to feed the strips 673, 675, 683, 685 to the point where the four nailing plates 13 are to be sheared off therefrom and driven into the chords and the strut at Y1. During the dwell of the workpiece in the coil platen 39, valves 695V and 697V are operated to operate cylinders 695 and 697 to shear off the four nailing plates and drive them into the chords and the strut at Y1.

The above is repeated for the insertion and fastening of the struts at Y2 and Y3, at the conclusion of which the workpiece is fed out of conveyor section C4 into staging section C5. This is effected by the PLC functioning to operate motor 238 for driving rollers 205 and 205L in conveyor section C4 to effect the feed. Once in the staging section C5, the workpiece is fed forward by programmed operation of the drives 748-2 through 748-6 to index the workpiece in the requisite intervals for successively bringing the workpiece into position in station 33 (between applicators 41L and 41R) for application of the metal web members 7 at positions X1–X6.

Thus, for application of the two members 7 at X1, the workpiece is indexed by the operation of drive(s) 748-2 through 748-6 to forward the workpiece to the X1 position in respect to metal web applicators 41L, 41R. The PLC 505 functions to effect operation of each applicator involving operation of cylinders 843 to raise the lifters 841 causing a member 7 to come off the left-hand rack 41L onto the left-hand arms 861 on the carriage 851 and a member 7 to come off the right-hand rack 41R onto the right-hand arms 861 on the carriage. Cylinder 875 operates to lower the carriage, bringing the two members 7 carried on the arms 861 thereof down between the left and right-hand press platens 793. The webs may also be fed using the devices 822 as described above.

The electromagnets 884 are energized to effect gripping of members 7 on the inside faces of the platens 793. Cylinders 863 are operated to retract (lower) the arms 861 and cylinder 875 is operated to lift the carriage back up to its raised position in readiness for the next cycle. Cylinders 797 are operated to drive the platens 793 (with members 7 gripped thereon) inward for pressing the nails 7N on members 7 into chords 3, 5 and subsequently to retract the platens.

Having applied the two members 7 at X1, the apparatus (under control of the programmer 505) functions to reinstate operation of motor 753 to drive gears 756R, 756L to index the workpiece forward to the position for application of the one member 7 at X2 on the right-hand side of the workpiece in the same manner as above set forth for application of the right-hand member 7 at X1. And then the workpiece undergoes indexing for and operation of components of the one or both applicators for application of the left-hand member 7 at X3, the right-hand member 7 at X4, and the left and right-hand members 7 at X5. This completes the fabrication, and the completed truss 1 is fed out of the exit section C6 by operation of gears 756R, 756L as programmed.

After the truss is fully assembled downstream of the web applying station, a strap (not shown), e.g., a plastic strap, can be applied to the truss to help hold the chords engaged with the board to insure good contact between the chords and the board until the adhesive is set. Suitable strap applying machines which is designated 1251 in FIG. 5 are commercially available. One such machine is a Sure Tyer Side Seal from Signode Packaging Systems, Vernon Hills, Ill. and is shown schematically in FIG. 5. The strap is applied during a pause in forward progress of a truss at the exit end of the apparatus. The pause could be any pause during which a web member 7 is applied to the truss by wrapping the strap transversely around the truss.

The operation of the apparatus will be described along with the control system and is described using the alternate embodiments of various components as illustrated in FIGS. 5, 14A, 20, 30 and 35. The control system is shown schematically in FIG. 38. A pair of chords is fed into the infeed conveyor C1 and is conveyed to the downstream end thereof by operation of the motors 131 (under control of switches 499, 501, 503 and LS39), 143 (under control of switches 499, 501, 503 and LS41) and the accompanying roller drives. The chords are then fed, for example, by upper and lower drives 748-1T, 748-1L (and motors 753-1T, 753-1L), to the milling section C2 for processing initially. The limit switches LS1 and LS2 (like the above described limit switch 759) mounted in the drives 748-1T, 748-1L will operate the drives if the other conditions for operability are met. The cylinders 757-1T, 757-1L are actuated to effect chord engagement under control of their valves 758-1T, 758-1L, the encoders EN1T, EN1L respectively (and their respective limit switches LS6, LS7) and the respective limit switches LS1, LS2. The chords will only be fed if there is no workpiece in the conveyor sections C2–C4. This is indicated by a limit switch LSG and the gate switches 499, 501 and 503.

The chords 3, 5 in conveyor section C2 will then each activate a respective sensor such as limit switches LS3 (top), LS4 (bottom) signaling the presence of the leading end of the respective chord. If the chords are not close in vertical alignment, the leading chord will pause until the lower chord catches up at which time both can advance to engage a respective encoder EN1T or EN1B and downstream thereof where they will engage a respective limit switch LS6, LS7 that will set the encoders to zero after which forward advance is monitored to control operation of the saws and the glue applicators at the proper locations along the chords. The encoders EN1T, EN1B each activate the respective saw 285T, 285L for commencing rotation of its saw blade and also activates the respective cylinder 289T, 289L to move its saw into cutting position. When either of the encoders is first activated, the drive for the conveyors in the milling section C2 are slowed to reduce the forward speed of the chords thru the milling section. When the appropriate length grooves G1, G2 are made as determined by the forward progress of the chords by the encoders, the saws will stop and will be retracted from engagement with the chords. If trailing end grooves are made, they are made in a similar manner under control of the encoders and the PLC 505. When the chords enter the milling area as indicated by the limit switches LS11, LS12 (like the limit switch 646 of FIG. 37), the cylinders 640MT and 640MB (like the cylinder 640) are activated under control of valves 64OMTV and 640MBV respectively to move the rollers on upper and lower centering devices 628MT, 628MB to move inwardly and hold the chords centered during milling and are released when milling is complete. At the end of a groove cut, the conveyor is stopped while the saw is turned off and retracted from the respective groove The chords move forward in the conveyor C3 for the application of adhesive by the respective adhesive applicator in the just made grooves G1, G2 (and the trailing end grooves if made). The encoders EN1T, EN1B each provide a signal about the location of each chord to effect operation of the respective glue applicator. At the proper location, the respective conveyor stops, and centering devices using cylinders 640GT, 640GB, under control of valves 640GTV, 64OGBV and limit switches LS13, LS14 respectively, centering the respective chord and releases the saw centering rollers. The cylinders 338T, 338L are activated to move the glue applicator 297, 299 respectively into position for applying glue into the respective groove G1, G2. Proximity switches PRS1, PRS2 verify that the glue applicators are in the correct positions after which glue is dispensed by opening the valves 337V, 339V. The encoders EN1T, EN1L, will close the valves when the ends of the grooves reach the glue applicators. The conveyors are stopped to stop forward progress of the chords 3, 5, the glue applicators are retracted, the centering rollers are retracted after which the conveyors are started again for forward progress of the chord to the OSB insertion station.

The chords 3, 5 encounter limit switches LS17, LS18 downstream of the glue applicators and upstream of the OSB insertion station. The limit switches stop the respective conveyor and close respective centering devices 628 by activating cylinders 640BT, 640BB, under control of valves 64OBTV, 64OBBV and limit switches LS17, LS18 respectively, and if a board is not already in position for insertion in the grooves G1, G2 the conveyors will remain off until a board 9 is available for insertion.

A sensor is provided to commence operation of the OSB inserter device. Any of the switches LS1–LS15 could be used depending on the time necessary to move a board 9 from the stack thereof into the path of the grooves G1, G2 as described above. Preferably, either or both of the switches LS3, LS4 can generate the inserter activation signal so that a board 9 will be in place when the chords arrive at the inserter for capturing the board in the grooves. A sensor is provided to indicate whether or not a board is present for insertion into the chord grooves. Preferably, a proximity switch PRS10 indicates the presence of a board retained by the clamp 510. If a board is not present, the sensor will provide a signal to stop the conveyor and provide a signal such as an audible alarm to alert an operator to put a board in place for insertion or to send a signal to the cylinder 362 under control of valve 362V to provide another board for insertion. A board is fed off the stack by the cylinder 362 against the stop 364 which is down by operation of the cylinder 364B under control of the encoder EN2, limit switch LS20 and proximity switch PRS10. The cylinder 375 under control of the proximity switch PRS10, switches 499, 501, 503 and timer T1 will effect clamping of the board and provide a signal from a read switch RS25. The cylinder 366B then moves the board forward on the table under control of switches 368S, PRS10, 499, 501, 503, LS3, LS4 and RS25. The cylinder 368 is then activated to upright the board under control of switches 368S, LS3, LS4, PRS10 and RS25.

A monitor (display screen) MON is connected to the PLC and is operable to display information about the operation of the apparatus and whether or not the various components are properly functioning and where any malfunction has occurred.

The switches 499, 501, 503 at the gates 485, 487, as described above, provide signals that the chords 3, 5 and board 9 are in proper vertical alignment and when they are, a timer T1 is activated providing a time delay of about ½ second before the gates are opened to release the chords 3, 5 for further movement along the apparatus for additional assembly operations. The gates are operated by the cylinders 491 under control of the valves 491V and switches 499, 501, 503 and timer T1. The timer T1 can be a component part of the PLC 505. Just downstream of the nail plate applicator, there is a sensor operable to generate a signal indicative of the truss location at the vertical web inserter and the nail plate applicator as it progresses thru those stations. The lower chord 5 encounters a sensor arrangement that provides a signal about how far along the conveyor the chords have progressed to effect insertion of the vertical webs 11 and the application of the nailing plates to secure the webs in place at predetermined locations. The sensor arrangement is also operable to send a signal indicating when to intermittently stop forward progress of the unfinished truss for an assembly operation to be performed during a dwell in forward motion. The sensor includes an encoder EN2, like the encoders EN1T, EN1L, such as a model 845HSJDZ22FLY2 sold by Allen Bradley of 1201 South Second Street, Milwaukee, Wis., that provides data indicating the forward progress of the workpiece (unfinished truss). Just downstream of the encoder EN2, the lower chord 5 will encounter a sensor such as a limit switch LS20 positioned to engage a leading end of the chord 5. When the limit switch LS20 is activated, a signal is sent to the encoder EN2 to set it to zero and measurement of the forward progress of the chords 3, 5 is started. At predetermined locations along the chords 3, 5, they are stopped thru control of the lower drive 231L and similar upper drive by the PLC and the vertical webs 11 are inserted and then the nail plates 13 are applied at a subsequent stop or pause.

The webs 11 are inserted by extension of the cylinder 609 under control of the valve 609V, encoder EN2, it limit switch LS20 and a vacuum switch VS1 that indicates a web 11 is retained on the vacuum cup 615. Vacuum applied to the vacuum cup is under control of a valve 619, a timer T2, a read switch RS14 which indicates the web upender cylinder 579 has upended a web, and a read switch RS15 indicates the cylinder 609 is retracted. Prior to inserting a web between the chords, and after the truss has stopped, the chord spreader cylinders 639 are activated under control of valve 639V, encoder EN2 and limit switch LS20 to spread the chords apart. With the web in place as indicated by a read switch RS16 indicating the cylinder 609 has extended, the spreaders are released allowing the web to be captured between the chords and the vacuum is released. The truss will then advance to the nail plate applying station.

The truss with captured web is fed forward to the nail plate applying station and is stopped with the web 11 in line with the cylinders 695, 697. The cylinder 690 under control of valve 690V, encoder EN2 and limit switch LS20 applies a downward force on the paused truss to hold it in position. The motor 691 under control of encoder EN2, limit switch LS20 and limit switches LS32L and LS32R showing both the left and right cylinders 695 have retracted, will feed lengths of nail plate strips. Likewise, the motor 693 under control of encoder EN2, limit switch LS20 and limit switches LS33L, LS33R showing both the left and right cylinders 697 have retracted will feed lengths of nail plate strips. The cylinders 695 will extend to apply the nail plates under control of encoder EN2, limit switch LS20, pressure switch PS1 (showing the presser cylinder is holding the truss) and proximity switch PRS 12L (indicating the left strip has been fed) and PRS12R (indicating the right hand strip has been fed). Likewise, the cylinders 697 will extend to apply nail plates under control of encoder EN2, limit switch LS20, pressure switch PS1 (showing the presser cylinder is holding the truss) and proximity switch PRS13L (indicating the left strip has been fed) and PRS13R (indicating the right hand strip has been fed). The cylinders 695, 697 will retract when the respective pressure switches PS4, PS5 indicate the cylinders have extended and applied the nail plates.

A series of sensors are positioned along the staging conveyor C5 to provide information about space available for the unfinished trusses to move into along the staging conveyor. The sensors include a plurality, e.g., five, of limit switches LS22–LS26 (like the described switch 759) are positioned along the staging conveyor providing signals to the PLC 505 from which the PLC determines how much space is available for an upstream unfinished truss to move into. If space is available, the unfinished truss will then be conveyed into the staging conveyor. If space is not available, the unfinished truss will be held upstream of the staging conveyor until space is available and then will be conveyed forward for further processing. A plurality of drives 748-2 through 748-6, e.g., are positioned along the staging conveyor and have motors 753-2 through 753-6 and cylinders 757-2 through 757-6 respectively, each under control of a respective limit switch LS22–LS26 and in addition, the valves 758-2 through 758-6 for the cylinders. The last two motors 753-5, 753-6 are also under control of an encoder EN3 and its limit switch LS21 for indexing movement of the truss through the web applicator. The last two drives also control operation of the first three drives via their limit switches LS25, LS26 when indexing movement is needed.

An unfinished truss is moved forward to the web inserter. A sensor is provided to generate a signal indicative of the truss location in the web inserter. Preferably the bottom chord encounters encoder EN3 and its limit switch LS21 (a sensor arrangement) that will provide a signal about how far along the conveyor the chords have progressed to effect insertion of the webs at predetermined locations on either or both sides as described above. The encoder EN3, like the encoders EN1T, EN1L and EN2, provides data indicating the forward progress of the chords (workpiece). Just downstream of the encoder EN3, the lower chord 5 will encounter the limit switch LS21 that is positioned to engage a leading end of the chord. When the limit switch LS21 is activated, a signal is sent to the encoder EN3 to set it to zero and measurement of the forward progress of the chords is started. At predetermined locations on the chords as programmed in the PLC, they are stopped thru control of the drives 748-2 through 6 by the PLC and webs are installed on the chords as described above. Limit switches LS29, LS30.are also provided to generate signals that the cylinders 797 and their platens are retracted and that the truss may now move forward for further web installation or that the truss is completed and can move to the outfeed conveyor. Limit switches LS29, LS30 are mounted for engagement by the platens at the end of their retracting movement. When signals from the switches say both platens are retracted, the PLC will then signal the conveyor to again move the truss forward. When the truss is paused at the V-web inserter, the cylinders 797 are retracted and the carriage cylinder 875 is up as indicated by read switch RS21. Signals are sent as appropriate, depending on whether a left or right web or both are needed, to the web release cylinders 826F (left and/or right sides as needed) and release cylinders 826R (left and/or right sides as needed) (there is a total of eight such cylinders, only four being shown for brevity since all operate in the same manner). The cylinders on the left side are under control of encoder EN3, limit switch LS21, read switch RS21 showing the carriage is up and read switch RS10 showing the fingers 861 on the left side are up. The cylinders on the right side are under control of encoder EN3, limit switch LS21, read switch RS21 showing the carriage is up and read switch RS 11 showing the fingers 861 on the right side are up. The appropriate webs are released after which the carriage cylinder moves the carriage and web(s) down between the platens upon a signal from a time delay timer T2 (a component part of the PLC after the signal to the cylinders 826F to release the web(s). When the carriage is down as indicated by a read switch RS22, the fingers 861 will release the web(s) by operation of the cylinders 863 under control of the valve 863V. When the fingers 861 are down as indicated by a read switch RS23 the magnets 883 are activated to retain the web(s) on the platen(s) and the cylinders 797 are extended to press in the web(s) (both cylinders always extending to apply balanced forces to the truss in between). The carriage will also move up by retraction of the cylinder 875 upon receipt of a signal to the valve 875V from under control of the read switch RS 23 indicating that the fingers 861 are down and after a time delay from a timer T3, a part of PLC 505. A read switch RS24 indicates the cylinders 797 have extended and applied the web(s) and signals the cylinder to retract and turns off the magnets.

The finished truss is fed to the exit conveyor and is fed out by operation of the drive 748-7 and its motor 753-7 under control of its limit switch LS31 and the encoder EN3 and its limit switch LS21. When the truss exits the conveyor, a sensor, such as the limit switch LS31 of drive 748-7, sends a signal to the PLC which in turn stops the exit conveyor until another truss is ready for conveying from the web inserter.

The PLC can be pre-programmed with truss construction and configuration information such as web and post locations to facilitate truss manufacture. It is preferred that all sensor signals be sent to the PLC which in turn will send signals to the various controlled elements to control their operations in a pre-programmed manner.

It is also contemplated that various safety devices such as interlock switches and stop switches, not shown, can be utilized on the apparatus as is known in the art to provide for further operating control. For example, when guards are used guard interlock switches would be used so the machine will not operate if a guard is open. If a malfunction occurs, stop switches can be used by an operator to stop machine operation. Guards (not shown) may also be provided. for operator safety.

In view of the above, it will be seen that the several objects of the invention are achieved and other advantageous results attained.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions without departing from the scope of the invention, it is intended that all matter contained in the above description and shown in the accompanying drawings shall be interpreted as illustrative and not in a limiting sense.

What is claimed is:

1. Apparatus for fabricating composite wood and metal flat trusses with each truss having generally parallel top and bottom chords, and a first and a second series of metal web members, the first series on one side and the second on the other side of the truss, the web members of each series being spaced at intervals along the length of the truss, said apparatus comprising:

a conveyor comprising an upper chord conveying run for the feeding endwise in a forward direction the upper chords of trusses to be fabricated, and a lower chord conveying run for the feeding endwise in said forward direction corresponding lower chords of trusses to be fabricated, each upper chord being paired in lengthwise registry with a lower chord thereby constituting a pair serving as the upper and lower chords of a truss, each of the upper chord and lower chord being of generally rectangular cross-section having top, bottom, and side surfaces, said conveyor being operable intermittently to feed each pair of said chords forward a distance corresponding to said intervals to and past a station for application of web members to opposite side surfaces of the pair at said intervals, said pair dwelling at said station for a dwell period between each forward feed of said pair, a first web member applicator at said station for applying a web member to each pair of chords on one side thereof during a dwell period of said pair at said station, a second web member applicator at said station for applying a web member to each said pair on the other side thereof during a dwell period of the pair at said station, each said web member applicator comprising a holder on the respective side of the conveyor for holding a supply of web members, and mechanism for transferring a web member from the supply into position on the respective side of said pair at said station, said web members having fasteners for being driven into the sides of each of the chords constituting said pair, each applicator having a driver for effecting driving of said fasteners into each of the chords constituting said pair on opposite sides thereof to fasten the web members to said pair.

2. Apparatus as set forth in claim 1 wherein said upper chord conveying run is directly above the lower chord conveying run, said runs being in a generally vertical plane.

3. Apparatus as set forth in claim 2 wherein each said web member applicator is for application to each said pair of chords of V-shaped metal web members with a pair of branches forming the V, each said holder comprising an inclined rack for holding a supply of said V-shaped members in inverted position thereon, said apparatus having mechanism including a carriage for carrying a web member for transfer from the rack to said position on the respective side of said pair at said station.

4. Apparatus as set forth in claim 3 wherein the fasteners comprise nails integral with the V-shaped web members at ends of the branches and also at an apex of the V, the drivers being operative to drive the nails into said chords of the pair dwelling at said station.

5. Apparatus as set forth in claim 4 wherein each said driver includes a press platen, said platens each having a retracted position on opposite sides of the pair of chords dwelling at said station, and being movable inward from the respective said retracted position to press in the nails.

6. Apparatus as set forth in claim 5 wherein said racks are above the platens and have inner ends on opposite sides of the plane of the pair of chords at said station, said carriage being movable generally vertically from a raised position between the inner ends of the racks and a lowered position between the platens.

7. Apparatus as set forth in claim 6 wherein each said rack has a stop at its inner end for holding back the supply of web members and a lifter for lifting the leading web member of the supply over the stop for transfer to the carriage.

8. Apparatus asset forth in claim 7 wherein the carriage has retractable arms for carrying web members.

9. Apparatus as set forth in claim 8 wherein the web members are magnetically grippable and the platens have electromagnets for gripping a web member.

10. Apparatus for fabricating composite flat trusses with each truss having parallel top and bottom chords, a first and a second series of metal first web members, the first series on one side and the second series on the other side of the truss, the first web members of each series being spaced at intervals along the length of the truss, each truss further comprising at least at one end thereof a trimmable second web member comprising material which may be sawn through for trimming of the truss at said one end thereof thereby to shorten its length, said second web member being secured at the top to the upper chord and at the bottom to the lower chord, said apparatus comprising:

a conveyor comprising an upper chord conveying run and a lower chord conveying run for the feeding endwise in a forward direction the upper and lower chords of trusses to be fabricated with the chords in a predetermined plane, each upper chord being paired in lengthwise registry with a lower chord and thereby constituting a pair serving as the upper and lower chords of a truss, each of the upper and lower chords being of generally rectangular cross-section having top, bottom, and side surfaces, a second web member applying station including a second web member transfer device for transferring a second web member from a supply of second web members to a position in said plane for being engaged by said chords as they are fed forward by said conveyor, first devices for effecting securement of the second web member to said chords, a first web member applying station for application of first web members to opposite side surfaces of the pair at said intervals, said pair dwelling at said first web member applying station for a dwell period between each forward feed of said pair by said conveyor to feed said pair with the second web member in place in between them, a first web member first applicator at said station for applying a first web member to each pair of chords on one side thereof during a dwell period of said pair at said station, a first web member second applicator at said station for applying a first web member to each said pair on the other side thereof during a dwell period of each pair at said station, each said applicator comprising a holder on the respective side of the conveyor for holding a supply of first web members, and mechanism for transferring a first web member from the supply into position on the respective side of said pair at said station, said first web members having fasteners for being driven into the sides of each of the chords constituting said pair, each said applicator having a driver for effecting driving of said fasteners into each of the chords constituting said pair on opposite sides thereof to fasten the first web members to said pair.

11. Apparatus as set forth in claim 10 wherein said upper chord conveying run is directly above the lower chord conveying run, said runs being in a generally vertical plane, and wherein the said position of the second web member is a generally vertical position with the second web member extending lengthwise in said plane.

12. Apparatus as set forth in claim 11 wherein the first devices include a cutter for cutting a second web member receiving groove in the bottom surface of the upper chord of each pair and a cutter for cutting a second web member receiving groove in the top surface of the bottom chord of each pair as the chords are fed toward said position wherein the second web member is engageable by said paired chords whereby lengthwise margins of the second web member become engaged in the grooves.

13. Apparatus as set forth in claim 12 wherein the lengthwise margins of the second web member are tapered and each said cutter comprises a rotary circular saw-type cutter for milling the groove in the respective chord correspondingly tapered.

14. Apparatus as set forth in claim 13 wherein the first devices further include adhesive applicators for applying adhesive for bonding the chords and the second web member with the second web member in the grooves.

15. Apparatus as set forth in claim 12 wherein the cutters are operable to cut second web member receiving grooves in a trailing end portion of the chords and the apparatus has means movable forward for insertion of a second web member in the grooves in said trailing end portion.

16. Apparatus as set forth in claim 11 wherein said upper chord conveying run is directly above the lower chord conveying run, said runs being in a generally vertical plane, and wherein the position of the second web member is a generally vertical position with the second web member extending lengthwise in said plane and wherein the conveyor has a first reach in which the runs are spaced a distance greater than the truss height, a second reach in which the runs converge to a third reach where the runs are parallel and spaced a distance corresponding to the truss height, said second web member position being such that the second web member is engageable by said chords as they are fed forward and converge in said second reach.

17. Apparatus as set forth in claim 16 having a cutter below said upper chord run for cutting a second web member receiving groove in the bottom surface of the upper chord of each pair and a cutter above said lower chord run for cutting a second web member receiving groove in the top surface of the bottom chord of each pair as the chords are fed toward said position wherein the second web member is engageable by convergence thereon of said paired chords, the lengthwise margins of the second web member becoming engaged in the grooves.

18. Apparatus as set forth in claim 17 wherein the lengthwise margins of the second web member are tapered and each cutter comprises a rotary circular saw-type cutter for milling the groove in the respective chord correspondingly tapered.

19. Apparatus as set forth in claim 18 having adhesive applicators for applying adhesive for bonding the chords and the second web member with the second web member in the grooves.

20. Apparatus as set forth in claim 17 wherein the cutters are operable to cut second web member receiving grooves in a trailing end portion of the chords and the apparatus has means movable forward for insertion of a second web member in the grooves in said trailing end portion.

21. Apparatus for fabricating composite flat trusses with each truss having generally parallel top and bottom chords, and a first and a second series of metal first web members, the first series on one side and the second series on the other side of the truss, the first web members of each said series being spaced at intervals along the length of the truss, said truss further comprising generally vertical second web members each extending generally vertically between the upper and lower chords and fastened thereto, said second web members being spaced at intervals along the length of the truss, said apparatus comprising:

a conveyor comprising an upper chord conveying run for the feeding endwise in a forward direction the upper chords of trusses to be fabricated, and a lower chord conveying run for the feeding endwise in said forward direction corresponding lower chords of trusses to be fabricated, each upper chord being paired in lengthwise registry with a lower chord thereby constituting a pair serving as the upper and lower chords of a truss, each of the upper and lower chords being of generally rectangular cross-section having top, bottom, and side surfaces, said conveyor being operable intermittently to feed a said pair forward a distance corresponding to said first web member and second web member intervals first to and past a station for application of second web members between the chords of said pair, then to and past a station for fastening the inserted second web members to the chords, and subsequently to and past a station for application of first web members to opposite side surfaces of said pair at the said intervals, said pair dwelling at said stations for a dwell period between each forward feed of said pair, a pair of first applicators at the first web member station with one said first applicator being positioned for applying a first web member to said pair on one side thereof during a dwell period of said pair thereat, and the other first applicator being positioned for applying a first web member to said pair on the other side thereof during a dwell period of a pair at said station, each said first applicator comprising a holder on the respective side of the conveyor for holding a supply of first web members, and mechanism for transferring a first web member from the supply thereof into position on the respective side of said pair at said station, said first web members having fasteners for being driven into the sides of each of the chords constituting said pair, each first applicator having a driver for effecting driving of said fasteners into each of the chords constituting said pair on opposite sides thereof to fasten the first web members to said pair, a second applicator for second web members at said second web member applying station for taking second web members from a supply and inserting them between the chords, first devices at the second web member applying station on opposite sides of the conveyor for fastening the second web members to the chords.

22. Apparatus as set forth in claim 21 having at least one spreader at said station for the application of the second web members for spreading apart the lengths of lumber of said pair for the insertion of said second web members.

23. Apparatus as set forth in claim 22 wherein each of the first devices on opposite sides of the conveyor for fastening the second web members to said chords comprises a feeder for feeding continuous strips of nailing plates to bring nailing plates into position for being driven into the sides of the second web member adjacent its upper end and the sides of the upper chord, a feeder for feeding continuous strips of nailing plates to bring nailing plates into position for being driven into the sides of the second web member adjacent its lower end and the sides of the lower chord, and pressers for shearing nailing plates from the strips and pressing them in.

24. Apparatus as set forth in claim 21 wherein the second applicator for the second web members has vacuum grippers for gripping the second web members for their being taken from the supply and inserted between the chords.

25. Apparatus for fabricating composite flat trusses with each truss having generally parallel top and bottom chords, each of said chords comprising a length of lumber, a first and a second series of metal first web members, the first series on one side and the second series on the other side of the truss, the first web members of each series being spaced at intervals along the length of the truss, each truss further comprising at least at one end thereof a trimmable second web member which may be sawn through for trimming of the truss at said one end thereof thereby to shorten its length, said second web member being secured at the top to the upper chord and at the bottom to the lower chord, and said truss further comprising generally vertical third web members extending generally vertically between the upper and lower chords and fastened thereto, said second web members being spaced at intervals along the length of the truss, said apparatus comprising:

a conveyor comprising an upper chord conveying run and a lower chord conveying run for the feeding endwise in a forward direction in a predetermined plane the upper and lower chords of trusses to be fabricated with the chords, each upper chord being paired in lengthwise registry with a lower chord and thereby constituting a pair serving as the upper and lower chords of a truss, each of the upper and lower chords being of generally rectangular cross-section having top, bottom, and side surfaces, said conveyor being operable to feed a pair of the chords to and past a second web member applying station where there is a transfer device for transferring a second web member from a supply of second web members to a position in said plane for being engaged by said chords as they are fed forward, said apparatus having devices for effecting securement of the second web member to a pair of said chords, said conveyor being operable intermittently to feed a said pair with the second web member in place in said pair forward a distance corresponding to said first web member and third web member intervals to and past a station for application of third web members between the lengths of lumber of said pair then to and past a station for fastening the inserted third web members to the chords, and subsequently to and past a station for application of first web members to opposite side surfaces of said pair at said intervals, said pair dwelling at said stations for a dwell period between each forward feed of said pair, a first applicator for third web members at said station for application thereof for taking said third web members from a supply and inserting them between the chords so they are generally vertical, devices at the fastening station on opposite sides of the conveyor for fastening the third web members to the chords, a pair of second applicators at the station for application of first web members each comprising a holder on the respective side of the conveyor for holding a supply of first web members, and mechanism for transferring a first web member from the supply thereof into position on the respective side of said pair at said station, said first web members having fasteners for being driven into each of the chords constituting said pair, each second applicator having a driver for effecting driving of said fasteners into the chords constituting said pair on opposite sides thereof to fasten the first web members to said pair.

26. Apparatus as set forth in claim 25 wherein said upper chord conveying run is directly above the lower chord conveying run, said runs being in a generally vertical plane, and wherein said position of the second web member is a generally vertical position with the second web member extending lengthwise in said plane and wherein the conveyor has a first reach in which the runs are spaced a distance greater than the truss height, a second reach in which the runs converge to a third reach where the runs are generally parallel and spaced a distance corresponding to the truss height, said second web member position being such that the board is engageable by said chords as they are fed forward and converge in said second reach.

27. Apparatus as set forth in claim 26 wherein the upper chord conveying run comprises an upper series of fixed-axis rollers and a lower series of vertically movable rollers for holding the upper chords up against the rollers of the upper series, and the lower chord conveying run comprises a lower series of fixed-axis rollers and an upper series of movable rollers for holding the lower chords down against the rollers of the lower series.

28. Apparatus as set forth in claim 26 wherein each said second applicator is for application to each said pair of chords of V-shaped first web members with branches forming the V-shape and an apex, each said holder comprising an inclined rack for holding a supply of said V-shaped first web members in inverted position thereon said apparatus having mechanism including a carriage for carrying a first web member for transfer from the rack to said position on the respective side of said pair at said station.

29. Apparatus as set forth in claim 28 wherein the fasteners comprise nails integral with the V-shaped first web members at the ends of the branches and also at the apex of the V, the drivers being operative to drive the nails into said chords of the pair dwelling at said station.

30. Apparatus as set forth in claim 26 wherein said second web member is generally rectangular and said position of the second web member is a generally vertical position with the long dimension of the rectangle extending lengthwise in said plane.

31. Apparatus as set forth in claim 26 having a cutter for cutting a second web member receiving groove in the bottom surface of the upper chord of each pair and a cutter for cutting a second web member groove in the top surface of the bottom chord of each pair as the chords are fed toward said position wherein the board is engageable by said paired chords, the lengthwise margins of the second web member becoming engaged in the grooves.

32. Apparatus as set forth in claim 31 wherein lengthwise margins of the second web member are tapered and each cutter comprises a rotary circular saw-type cutter for milling the groove in the respective chord correspondingly tapered.

33. Apparatus as set forth in claim 32 having adhesive applicators for applying adhesive for bonding the chords and the second web member with the second web member in the grooves.

34. Apparatus as set forth in claim 31 wherein the cutters are operable to cut second web member receiving grooves in a trailing end portion of the chords and the apparatus has means movable forward for insertion of a second web member in the grooves in said trailing end portion.

35. Apparatus as set forth in claim 25 having spreaders at said station for the application of the generally vertical third web members for spreading apart the chords of said pair for the insertion of said generally vertical third web members.

36. Apparatus as set forth in claim 35 wherein each of the first devices on opposite sides of the conveyor for fastening the third web members to said chords comprises a feeder for feeding a continuous strip of nailing plates to bring a nailing plate into position for being driven into the side of the third web member adjacent its upper end and the side of the upper chord, a feeder for feeding a continuous strip of nailing plates to bring a nailing plate into position for being driven into the side of the third web member adjacent its lower end and the side of the lower chord, and pressers for pressing in said nailing plates.

37. Apparatus for fabricating truss components each comprising generally parallel upper and lower chords, each of said chords being of generally rectangular cross-section thereby having top, bottom, and side surfaces, with at least at one end of each truss having a trimmable first web member which may be sawn through for trimming of the truss ultimately formed thereby to shorten the length of said truss, said first web member being secured at the top to the upper chord and at the bottom to the lower chord, said apparatus comprising:

a conveyor comprising an upper chord conveying run and a lower chord conveying run for the feeding endwise in a forward direction chords constituting the upper and lower chords of trusses to be fabricated with the chords in a predetermined plane, each upper chord being paired in lengthwise registry with a lower chord and thereby being a pair constituting the upper and lower chords of a truss, each of the upper and lower chords being of generally rectangular cross-section having top, bottom, and side surfaces, said conveyor being operable to feed a pair of the chords to and past a first web member applying station where there is a first web member transfer device for transferring a first web member from a supply of first web members to a position in said plane for being engaged by a said pair of chords as the pair is fed forward, and said apparatus having devices for effecting securement of the first web member to said pair of chords and a cutter for cutting a first web member receiving groove in the bottom surface of the upper chord of each pair and a cutter for cutting a first web member receiving groove in the top surface of the bottom chord of each pair as the chords are fed toward said position wherein the first web member is engageable by said pair of chords, and wherein lengthwise margins of the first web member become engaged in the grooves.

38. Apparatus as set forth in claim 37 wherein said upper chord conveying run is above the lower chord conveying run, said runs being in a generally vertical plane, and wherein the position of the first web member is a generally vertical position when between said pair of chords with the first web member extending lengthwise in said plane.

39. Apparatus as set forth in claim 37 wherein the lengthwise margins of the first web member are tapered and each cutter comprises a rotary circular saw-type cutter for milling the groove in the respective chord correspondingly tapered.

40. Apparatus as set forth in claim 39 having adhesive applicators for applying adhesive for bonding the chords and the first web member with the first web member in the grooves.

41. Apparatus as set forth in claim 37 wherein the cutters are operable to cut first web member receiving grooves in a trailing end portion of each of the chords and wherein the apparatus further comprises means movable for insertion of a first web member in the grooves in said trailing end portions.

42. Apparatus for fabricating composite flat trusses with each truss having generally parallel top and bottom chords, a first and a second series of metal first web members, the first series on one side and the second on the other side of the truss, the first web members of each series being spaced at intervals along the length of the truss, each truss further comprising at least at one end of the truss a trimmable second web member comprised of material which may be sawn through for trimming of the truss at said one end thereof thereby to shorten its length, said second web member being fastened at its top to the upper chord and at its bottom to the lower chord said truss further comprising generally vertical third web members each extending generally vertically between the upper and lower chords and fastened thereto, said third web members being spaced at intervals along the length of the truss, said apparatus comprising:

a conveyor comprising an upper chord conveying run and a lower chord conveying run for the feeding endwise in a forward direction the upper and lower chords of trusses to be fabricated with the chords in a predetermined plane, each upper chord being paired in lengthwise registry with a lower chord and thereby being a pair constituting the upper and lower chords of a truss, the conveyor having a first section constituting an infeed section where the runs are spaced a distance greater than the truss height, second section constituting a chord preparation section where the runs are spaced as in the infeed section, a third section constituting a tapering section where the runs converge to truss height, a fourth section constituting a third web member applying section, a fifth section constituting a staging section, and a sixth section constituting an exit section, the runs being generally parallel and spaced a distance corresponding to the truss height in said fourth, fifth, and sixth sections, a set of first devices in the second section for preparing the chords fed therethrough for reception of a second web member, a second web member transfer device for transferring a second web member from a supply thereof to a position in said third section for being engaged by said chords as they are fed forward and converge in said third section, an applicator for taking third web members from a supply thereof and inserting them between the chords during a dwell in said fourth section, and a set of applicators between the fifth and sixth sections for applying first web members to opposite sides of the chords during dwell therein.

43. Apparatus as set forth in claim 42 wherein the first devices in the second section include means for milling a groove in the bottom of the upper chord and a groove in the top of the lower chord for receiving the board.

44. Apparatus as set forth in claim 43 wherein the first devices in the second section include means for applying adhesive in the grooves.

45. Apparatus as set forth in claim 42 having means for spreading the chords apart in the fourth section during dwell therein.

46. Apparatus as set forth in claim 42 having means for effecting fastening of the third web members in place in the truss being fabricated in the fourth section during dwell therein.

47. Apparatus as set forth in claim 42 wherein said supply of second web members is a stack of second web members and the second web member transfer device comprises means for picking up the top second web member of the stack, turning it to generally vertical position, and then moving it to said position in the third section.

48. Apparatus as set forth in claim 47 having means supporting the stack of second web members for indexing upward of the stack to bring the top second web member to a pick-up position.

49. Apparatus as set forth in claim 48 having means for bringing a fresh stack of second web members into position for pick-up of the top second web member on exhaustion of a stack.

50. Apparatus for fabricating flat trusses having generally parallel top and bottom chords, with at least one generally vertical web member between the chords and fastened thereto, said apparatus comprising:

a conveyor comprising an upper chord conveying run for endwise feeding in a forward direction the upper chords of trusses to be fabricated, and a lower chord conveying run for the feeding endwise in said forward direction corresponding lower chords of trusses to be fabricated, each upper chord being paired in lengthwise registry with a lower chord thereby constituting a pair which ultimately become chords of a truss, each of the upper chord and lower chords being of generally rectangular cross-section having top, bottom, and side surfaces, an applicator for web members at a station along the length of the conveyor for taking web members from a supply thereof and inserting them between the chords during dwell of said chords at said station whereby said web members are generally vertical between said chords.

51. Apparatus as set forth in claim 50 having means for effecting fastening of the web member in place between the chords.

52. Apparatus as set forth in claim 51 wherein the supply comprises a conveyor carrying a row of the web members movable to advance the leading web member of the row over an upender, and a pick-up for taking the web member upended by the upender and inserting it between the chords.

53. Apparatus as set forth in claim 52 having means for replenishing said row when exhausted.

54. Apparatus as set forth in claim 51 having a spreader for spreading apart the chords for the insertion.

55. Apparatus for fabricating trusses each comprising parallel upper and lower chords with a plurality of web members secured to and extending between the chords, said apparatus comprising:

a conveyor comprising an upper chord conveying run and a lower chord conveying run for the feeding endwise in a forward direction the upper and lower chords of trusses to be fabricated, each chord traveling in a generally horizontal plane with the upper chords being above the lower chords in a generally vertical plane, each upper chord being paired in lengthwise registry with a respective lower chord and thereby being a pair constituting the upper and lower chords of a truss, said conveyor being operable to feed a pair of the chords to and past a web applying station where there is a web transfer device for transferring a web from a supply of webs to a position in a plane generally parallel to said generally vertical plane for being secured to said chords at said web applying station, and a device at said web applying station for effecting securement of webs to said chords.

56. Apparatus as set forth in claim 55 wherein a said device is positioned on each side of the pair of chords for effecting securement of a web to each side of the chords.

57. Apparatus as set forth in claim 56 wherein said devices move the webs generally horizontally.

58. Apparatus as set forth in claim 57 wherein web members are metal with nails thereon and said devices include platens each adapted to carry a web member to a respective side of the chord and press the nails into the chords to thereby secure the web member to the chords.

59. Apparatus as set forth in claim 58 said devices secure the web members to the chords at intervals along the length of the chords on both sides of the chords during dwell of the chords.

60. Apparatus as set forth in claim 59 including an applicator for second web members at a station along the length of the conveyor for taking second web members from a supply and positioning said second web members in a generally vertical plane and inserting them between the chord members during dwell of said chord members and having means for effecting fastening of the second web members in place between the chord members with connector plates secured to both the second web members and the chords.

61. Apparatus as set forth in claim 60 including a transfer device for transferring a third web member from a supply to a position for being engaged by said chords and secured thereto, said third web member being generally vertical when positioned between said chords.

62. Apparatus for fabricating trusses each comprising first and second chords with a plurality of web members secured to and extending between the chords, each said chord having first and second opposite sides, said apparatus comprising:

a conveyor comprising a first chord conveying run and a second chord conveying run for the feeding endwise in a forward direction the first and second chords of trusses to be fabricated, said conveyor being operable to feed a pair of the chords along respective paths of movement to and past a web applying station where there is a web transfer device for transferring a web from a supply of webs for being secured to said chords at said web applying station, a device adjacent said web applying station for effecting securement of webs to said chords, and a drive mechanism operable to engage said opposite sides of at least one of the chords to feed said engaged chord forward thru at least a portion of the apparatus, the drive mechanism including a side drive mechanism including a pair of wheels mounted on opposite sides of the respective path of movement for engaging a respective side of the chord, a drive motor connected to at least one of the wheels to effect rotation thereof, said wheels being mounted to move toward and away from said path in response to a signal indicative of a chord being present between the wheels.

63. An apparatus as set forth in claim 62 wherein both said wheels are driven in unison by said drive motor and said signal is generated by a sensor operable to sense presence of a chord adjacent said wheels.

64. An apparatus as set forth in claim 63 wherein said wheels are each mounted on a respective pivoting arm, said arms are operably connected to a device to effect pivoting of said arms to thereby simultaneously move said wheels toward and away from one another in response to a signal from a sensor operable to sense presence of a chord adjacent said wheels.

65. An apparatus as set forth in claim 64 wherein said wheels have teeth thereon for engaging the chord.

66. An apparatus as set forth in claim 65 wherein said device includes an air cylinder.

67. An apparatus as set forth in claim 66 wherein said signal for effecting operation of said drive motor and said signal for effecting pivoting of said arms are the same signal and said sensor includes a limit switch.

68. Apparatus for fabricating trusses each comprising first and second chords with a plurality of web members secured to and extending between the chords, each said chord having first and second opposite sides, said apparatus comprising:

a conveyor comprising a first chord conveying run and a second chord conveying run for the feeding endwise in a forward direction the first and second chords of trusses to be fabricated, said conveyor being operable to feed a pair of the chords along respective paths of movement to and past a web applying station where there is a web transfer device for transferring a web from a supply of webs for being secured to said chords at said web applying station, a device adjacent said web applying station for effecting securement of webs to said chords, and a chord centering mechanism operable to engage said opposite sides of at least one of the chords to position said engaged chord in said path of movement whereby said chord is generally centered at a centerline of said path of movement, said centering mechanism including a pair of followers each mounted on an opposite side of the respective path of movement for engaging a respective side of the chord, said followers being mounted to move toward and away from said path in response to a signal indicative of a chord being present between the followers, a device connected to said followers to effect the movement of the followers toward and away from one another and to retain said followers in engagement with a chord therebetween during movement of the chord between the followers.

69. An apparatus as set forth in claim 68 wherein said followers each include a rotatable wheel mounted on a pivoted arm.

70. An apparatus as set forth in claim 69 wherein said device includes a gear operably connected to each said pivoted arm with said gears being meshed whereby rotation of one said gear in one direction will effect rotation of the other gear in the opposite direction such that the arms move toward and away from one another in unison.

71. An apparatus as set forth in claim 70 wherein said device further includes an air cylinder connected to one of said gears whereby extension and retraction of the cylinder effects selective rotation of said gear in one of two directions and the other gear in the opposite direction, said wheels being spaced substantially equidistant from said centerline.

72. An apparatus as set forth in claim 71 wherein said sensor includes a limit switch mounted for engagement of a chord adjacent said followers.

73. Apparatus for fabricating truss components each comprising generally parallel upper and lower chords, each of said chords being of generally rectangular cross-section thereby having top, bottom, and side surfaces, with at least at one end of each truss having a trimmable first web member which may be sawn through for trimming of the truss ultimately formed thereby to shorten the length of said truss, said first web member being secured at the top to the upper chord and at the bottom to the lower chord, said apparatus comprising:

a conveyor comprising an upper chord conveying run and a lower chord conveying run for the feeding endwise in a forward direction chords constituting the upper and lower chords of trusses to be fabricated with the chords in a predetermined plane, each upper chord being paired in lengthwise registry with a lower chord and thereby being a pair constituting the upper and lower chords of a truss, each of the upper and lower chords being of generally rectangular cross-section having top, bottom, and side surfaces, said conveyor being operable to feed a pair of the chords to and past a first web member applying station where there is a first web member transfer device for transferring a first web member from a supply of first web members to a position in said plane for being engaged by a said pair of chords as the pair is fed forward, said upper chord conveying run is above the lower chord conveying run, said runs being in a generally vertical plane, and wherein the position of the first web member is a generally vertical position when between said pair of chords with the first web member extending lengthwise in said plane, and said apparatus having devices for effecting securement of the first web member to said pair of chords.

* * * * *